(12) United States Patent
Fang

(10) Patent No.: US 10,142,911 B2
(45) Date of Patent: *Nov. 27, 2018

(54) WIRELESS RELAY BACKHAUL SELECTION IN A DATA COMMUNICATION NETWORK

(71) Applicant: Sprint Communications Company L.P., Overland Park, KS (US)

(72) Inventor: Zheng Fang, McLean, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,786

(22) Filed: Nov. 28, 2017

(65) Prior Publication Data

US 2018/0084482 A1 Mar. 22, 2018

Related U.S. Application Data

(63) Continuation of application No. 15/015,814, filed on Feb. 4, 2016, now Pat. No. 9,867,114.

(51) Int. Cl.
*H04W 40/22* (2009.01)
*H04W 52/46* (2009.01)
(Continued)

(52) U.S. Cl.
CPC ........... *H04W 40/22* (2013.01); *H04W 52/46* (2013.01); *H04W 76/00* (2013.01);
(Continued)

(58) Field of Classification Search
CPC ...... H04W 40/22; H04W 52/46; H04W 88/04
See application file for complete search history.

(56) References Cited

U.S. PATENT DOCUMENTS 7,385,973 B1 6/2008 Johnson et al.
7,869,394 B1 1/2011 Boden, Jr. et al.
(Continued)

FOREIGN PATENT DOCUMENTS

EP 2485564 8/2012
EP 2645780 10/2013
(Continued)

OTHER PUBLICATIONS

Samsung: "Introduction of Relay GW", 3GPP TSG RAN WG3 Meeting #65, R3-091681, 3rd Generation Partnership Project (3GPP), Shezhen, China Aug. 24-28, 2009, Agenda Item: 13.1.2.6; 3 pages.
(Continued)

*Primary Examiner* — Ashley Shivers

(57) ABSTRACT

A wireless base station establishes a wireless backhaul link for a wireless relay to a data network core. A network gateway establishes a wireline backhaul link for the wireless relay to the data network core. The data network core transfers backhaul status data for the backhaul links to the wireless relay. The wireless relay uses the backhaul status data to select the wireless backhaul link or the wireline backhaul link for user data. The wireless base station exchanges wireless user data with the wireless relay when the wireless relay selects the wireless backhaul link. The network gateway exchanges wireline user data with the wireless relay when the wireless relay selects the wireline backhaul link. The data network core exchanges the wireless user data with the wireless base station and exchanges the wireline user data with the network gateway.

20 Claims, 28 Drawing Sheets

(51) Int. Cl.
*H04W 88/04* (2009.01)
*H04W 84/04* (2009.01)
*H04W 84/12* (2009.01)
*H04W 88/10* (2009.01)
*H04W 92/02* (2009.01)
*H04W 76/00* (2018.01)

(52) U.S. Cl.
CPC ....... *H04W 84/045* (2013.01); *H04W 84/047* (2013.01); *H04W 84/12* (2013.01); *H04W 88/04* (2013.01); *H04W 88/10* (2013.01); *H04W 92/02* (2013.01)

(56) References Cited

U.S. PATENT DOCUMENTS

| | | | |
|---|---|---|---|
| 8,150,397 | B2 | 4/2012 | Khetawat et al. |
| 8,565,129 | B1 | 10/2013 | Bertz et al. |
| 8,699,461 | B2 | 4/2014 | Qian et al. |
| 8,699,462 | B2 | 4/2014 | Spinelli et al. |
| 8,724,648 | B2 | 5/2014 | Zeng et al. |
| 8,787,331 | B2 | 7/2014 | Liu et al. |
| 8,831,679 | B2 | 9/2014 | Bajj et al. |
| 8,976,690 | B2 | 3/2015 | Akyildiz et al. |
| 9,065,533 | B2 | 6/2015 | Teyeb et al. |
| 9,084,150 | B2 | 7/2015 | Kazmi et al. |
| 9,094,814 | B1 | 7/2015 | Kullman et al. |
| 9,882,803 | B2 | 1/2018 | Xie et al. |
| 2003/0174713 | A1 | 9/2003 | Linden |
| 2006/0198356 | A1 | 9/2006 | Mayernick |
| 2008/0261596 | A1 | 10/2008 | Khetawat et al. |
| 2008/0285492 | A1 | 11/2008 | Vesterinen |
| 2008/0307114 | A1 | 12/2008 | Ooshima et al. |
| 2009/0109858 | A1 | 4/2009 | Yamasaki et al. |
| 2009/0161538 | A1 | 6/2009 | McGuire |
| 2010/0046418 | A1 | 2/2010 | Horn et al. |
| 2010/0322151 | A1 | 12/2010 | Racz et al. |
| 2011/0007706 | A1 | 1/2011 | Shaikh |
| 2011/0075675 | A1 | 3/2011 | Koodli et al. |
| 2011/0103296 | A1 | 5/2011 | Ji et al. |
| 2011/0113250 | A1 | 5/2011 | Li et al. |
| 2011/0128908 | A1 | 6/2011 | Lee et al. |
| 2012/0020278 | A1 | 1/2012 | Moberg et al. |
| 2012/0044908 | A1 | 2/2012 | Spinelli et al. |
| 2012/0076027 | A1 | 3/2012 | Akyildiz et al. |
| 2012/0084840 | A1 | 4/2012 | Higuchi et al. |
| 2012/0120831 | A1 | 5/2012 | Gonsa et al. |
| 2012/0124229 | A1 | 5/2012 | Sahu et al. |
| 2012/0224536 | A1 | 9/2012 | Hahn et al. |
| 2013/0010686 | A1 | 1/2013 | Shatzkamer et al. |
| 2013/0010753 | A1 | 1/2013 | Chen et al. |
| 2013/0028139 | A1 | 1/2013 | Sanneck et al. |
| 2013/0044608 | A1 | 2/2013 | Qiang et al. |
| 2013/0061034 | A1 | 3/2013 | Walheim, Sr. |
| 2013/0176934 | A1 | 7/2013 | Malladi et al. |
| 2013/0188481 | A1 | 7/2013 | Maehara et al. |
| 2013/0189994 | A1 | 7/2013 | Maehara et al. |
| 2013/0310052 | A1 | 11/2013 | Timus et al. |
| 2013/0315134 | A1 | 11/2013 | Halfmann et al. |
| 2013/0324125 | A1 | 12/2013 | Bachmann et al. |
| 2013/0336202 | A1 | 12/2013 | Oh et al. |
| 2014/0098671 | A1 | 4/2014 | Raleigh et al. |
| 2014/0098741 | A1 | 4/2014 | Joyce |
| 2014/0106709 | A1 | 4/2014 | Palamara et al. |
| 2014/0153542 | A1 | 6/2014 | Diachina et al. |
| 2014/0162544 | A1 | 6/2014 | Edge |
| 2014/0195655 | A1 | 7/2014 | Jha |
| 2014/0204903 | A1 | 7/2014 | Kim et al. |
| 2014/0254471 | A1 | 9/2014 | Fang et al. |
| 2015/0010010 | A1 | 1/2015 | Xie et al. |
| 2015/0029947 | A1 | 1/2015 | Gundavelli et al. |
| 2015/0029956 | A1 | 1/2015 | Moses et al. |
| 2015/0049663 | A1 | 2/2015 | Mukherjee et al. |
| 2015/0078173 | A1 | 3/2015 | Javed |
| 2015/0092743 | A1 | 4/2015 | Ji et al. |
| 2015/0111580 | A1 | 4/2015 | Wu |
| 2015/0140965 | A1 | 5/2015 | Qiang et al. |
| 2015/0155930 | A1 | 6/2015 | Liu et al. |
| 2015/0195858 | A1 | 7/2015 | Jin et al. |
| 2015/0327114 | A1 | 11/2015 | Gupta et al. |
| 2015/0365414 | A1 | 12/2015 | Liang et al. |
| 2016/0036771 | A1 | 2/2016 | Yadav et al. |
| 2016/0135072 | A1 | 5/2016 | Wang et al. |
| 2016/0142321 | A1 | 5/2016 | Gage |
| 2016/0173262 | A1 | 6/2016 | Davydov et al. |
| 2016/0192403 | A1 | 6/2016 | Gupta et al. |
| 2016/0234825 | A1 | 8/2016 | Axmon et al. |
| 2016/0255021 | A1 | 9/2016 | Renfrew |
| 2017/0064579 | A1 | 3/2017 | Park et al. |
| 2017/0086165 | A1 | 3/2017 | Tarradell et al. |
| 2017/0163685 | A1 | 6/2017 | Schwartz et al. |
| 2017/0164137 | A1 | 6/2017 | Duval et al. |
| 2017/0231020 | A1 | 8/2017 | Tomici et al. |
| 2018/0007212 | A1 | 1/2018 | Sirotkin et al. |

FOREIGN PATENT DOCUMENTS

| | | |
|---|---|---|
| WO | 2011087407 | 7/2011 |
| WO | 2012092966 | 7/2012 |
| WO | 2015005900 | 1/2015 |
| WO | 2015126999 | 8/2015 |

OTHER PUBLICATIONS

"3rd Generation Partnership Project; Technical Specification Group Radio Access Network; Evolved Universal Terrestrial Radio Access (E-UTRA); Study on mobile relay (Release 12)", 3GPP draft; 36836-C00, 3rd Generation Partnership Project (3GPP), Mobile Competence Centre; 650, Route Des Lucioles; F-06921 Sophia-Antipolis Cedex; France, Jun. 27, 2014, XP050907468, Retrieved from the Internet: URL:http//www.3gpp.org/ftp/Specs/2014-12/Rel-12/36_series/[retreived on Jun. 27, 2014].

CATT (Rapporteur: "Offline discussion on mobile relay architecture options", 3GPP Draft; R3-120423, 3RD Generation Partnership Project (3GPP), Mobile Competence Centre; 650, Route Des Lucioles; F-06921 Sophia-Antipolis Cedex; France, vol. RAN WG3, no. Dresden, Germany; Feb. 6, 2012-Feb. 10, 2012, Feb. 10, 2012, XP050566838, retrieved on Feb. 10, 2012, pp. 1-7.

"3rd Generation Partnership Project; Technical Specification Group Radio Access Network; Evolved Universal Terrestrial Radio Access (E-UTRA); Relay Architectures for E-UTRA (LTE-Advanced) (Release 9)", 3GPP Standard; TR 36.806, 3rd Generation Partnership Project (3GPP), Mobile Competence Centre; 650, Route Des Lucioles; F-06921 Sophia-Antipolis Cedex; France, vol. RAN WG2, No. VO.3.1 Jun. 23, 2010, pp. 1-34, XP050553703.

D. Farinacci, et al., Generic Routing Encapsulation (GRE), Network Working Group, Request for comments: 2784; category: Standard Tracks, Mar. 2000, p. 1-9.

Yingrong Coral Sung, et al., "An efficient robust header compression mechanism for Long Term Evolution Advanced Relay Architecture", Network Operations and Management Symposium (APNOMS), 2012 14th Asia-Pacific, IEEE, Sep. 25, 2012, p. 1-4, XP032270869, ISBN: 978-1-4673-4494-4.

Giuseppe Ruggeri, et al.; "802.11-Based Wireless-LAN and UMTS interworking: requirements, proposed solutions and open issues;" Computer Networks, Feb. 4, 2005; pp. 151-166; vol. 47, No. 2; Elsevier; Amsterdam, Netherlands.

Jamshid Khun-Jush; "Integration of WLAN and Wide Area Mobile Networks;" IEEE; Jan. 2002; pp. 1-19; vol. 802.11, No. 02/106; IEEE; Piscataway, New Jersey, U.S.A.

Fumio Teraoka, et al.; "PNEMO: a Network-Based Localized Mobility Management Protocol for Mobile Networks;" IEEE; Jun. 15, 2011; pp. 168-173; IEEE.

S. Alexander, et al.; "DHCP Options and BOOTP Vendor Extensions;" Network Working Group; Mar. 1997; pp. 1-34; Request for Comments: 2132.

WIRELESS RELAY BACKHAUL SELECTION IN A DATA COMMUNICATION NETWORK

RELATED CASES

This patent application is a continuation of U.S. patent application Ser. No. 15/015,814 that was filed on Feb. 4, 2016 and is entitled "WIRELESS RELAY BACKHAUL SELECTION IN A DATA COMMUNICATION NETWORK." U.S. patent application Ser. No. 15/015,814 is hereby incorporated by reference into this patent application.

TECHNICAL BACKGROUND

Wireless communication networks exchange user data between communication devices to facilitate various data services, like internet access, voice calling, media streaming, data messaging, and the like. Wireless communication networks allow users to move about as they communicate. A popular form of wireless communication network is Long Term Evolution (LTE). Wireless relays are used to extend the coverage area of wireless networks including LTE networks.

The wireless relays serve user devices and exchange user data with wireless base stations or another network gateway. In LTE networks, femtocell relays and picocell relays exchange user data and user signaling over the air between User Equipment (UE) and eNodeBs. The wireless relays also exchange data and signaling between the UEs and a Secure Gateway (Se-GW) over a Local Area Network/Wide Area Network (LAN/WAN). These wireless relay communications use various combinations of Ethernet, Data over Cable System Interface Specification (DOCSIS), Wave Division Multiplex (WDM), Wireless Fidelity (WIFI), Long Term Evolution (LTE), WIFI/LTE Aggregation (LWA), or some other data communication protocol.

The typical wireless relay automatically establishes a backhaul connection upon power up. If the backhaul connection goes down, then the wireless relay loses network connectivity. To provide reliability, some wireless relays have dual backhaul connections. For example, some WIFI hotspots have dual WIFI backhaul links to separate WIFI aggregation nodes. Smart phones that offer tethering to other devices offer dual backhaul over both a WIFI/DOCSIS connection and an LTE link.

Unfortunately, wireless relays are not effective when selecting backhaul connections for individual UEs. Both the data and the intelligence to perform more effective backhaul selection in wireless relays is lacking.

TECHNICAL OVERVIEW

A wireless base station establishes a wireless backhaul link for a wireless relay to a data network core. A network gateway establishes a wireline backhaul link for the wireless relay to the data network core. The data network core transfers backhaul status data for the backhaul links to the wireless relay. The wireless relay uses the backhaul status data to select the wireless backhaul link or the wireline backhaul link for user data. The wireless base station exchanges wireless user data with the wireless relay when the wireless relay selects the wireless backhaul link. The network gateway exchanges wireline user data with the wireless relay when the wireless relay selects the wireline backhaul link. The data network core exchanges the wireless user data with the wireless base station and exchanges the wireline user data with the network gateway.

DETAILED DESCRIPTION

Figure 1:
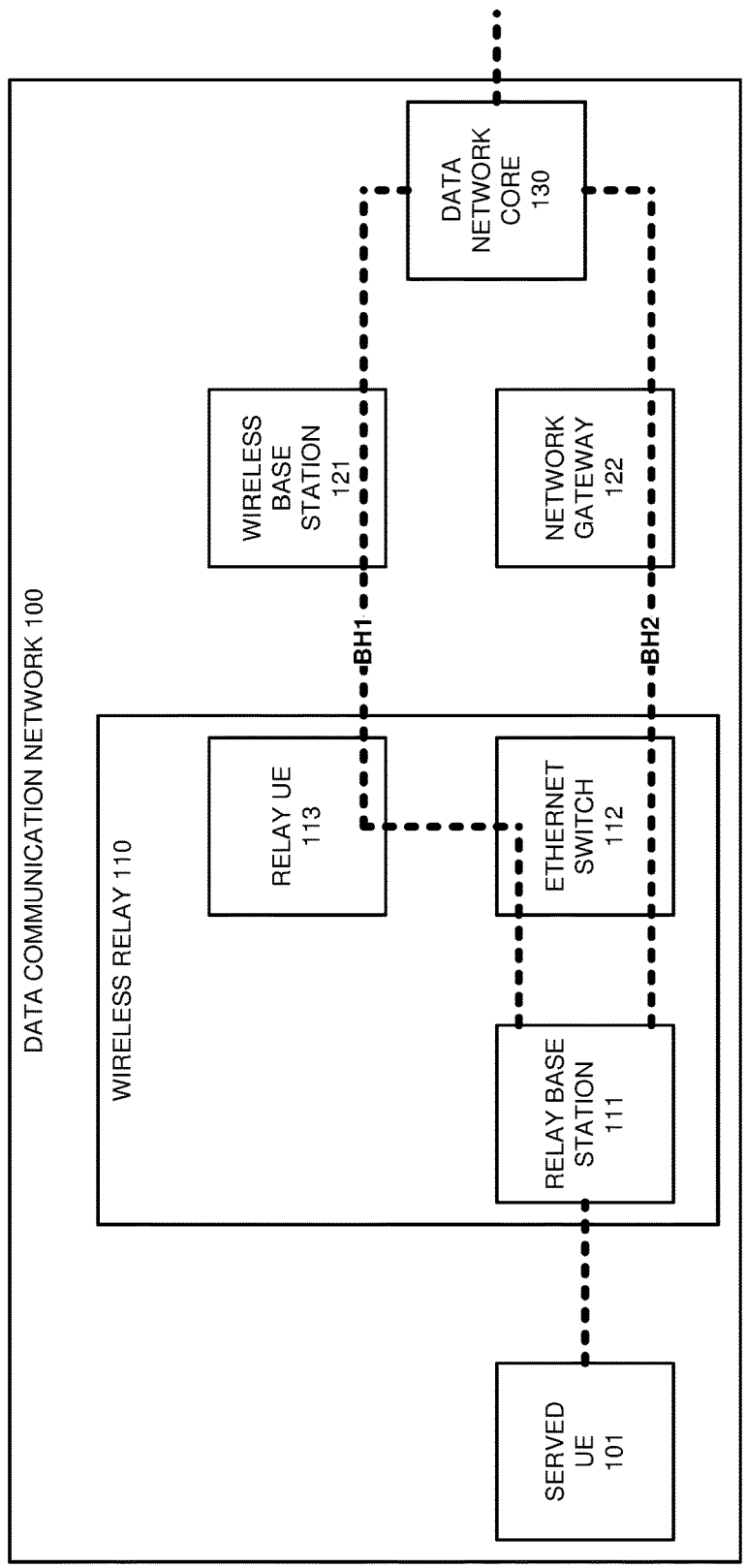
FIGS. 1-3 illustrates a data communication network to select backhaul connections for data and media services that are delivered over a wireless relay.
Figure 2:
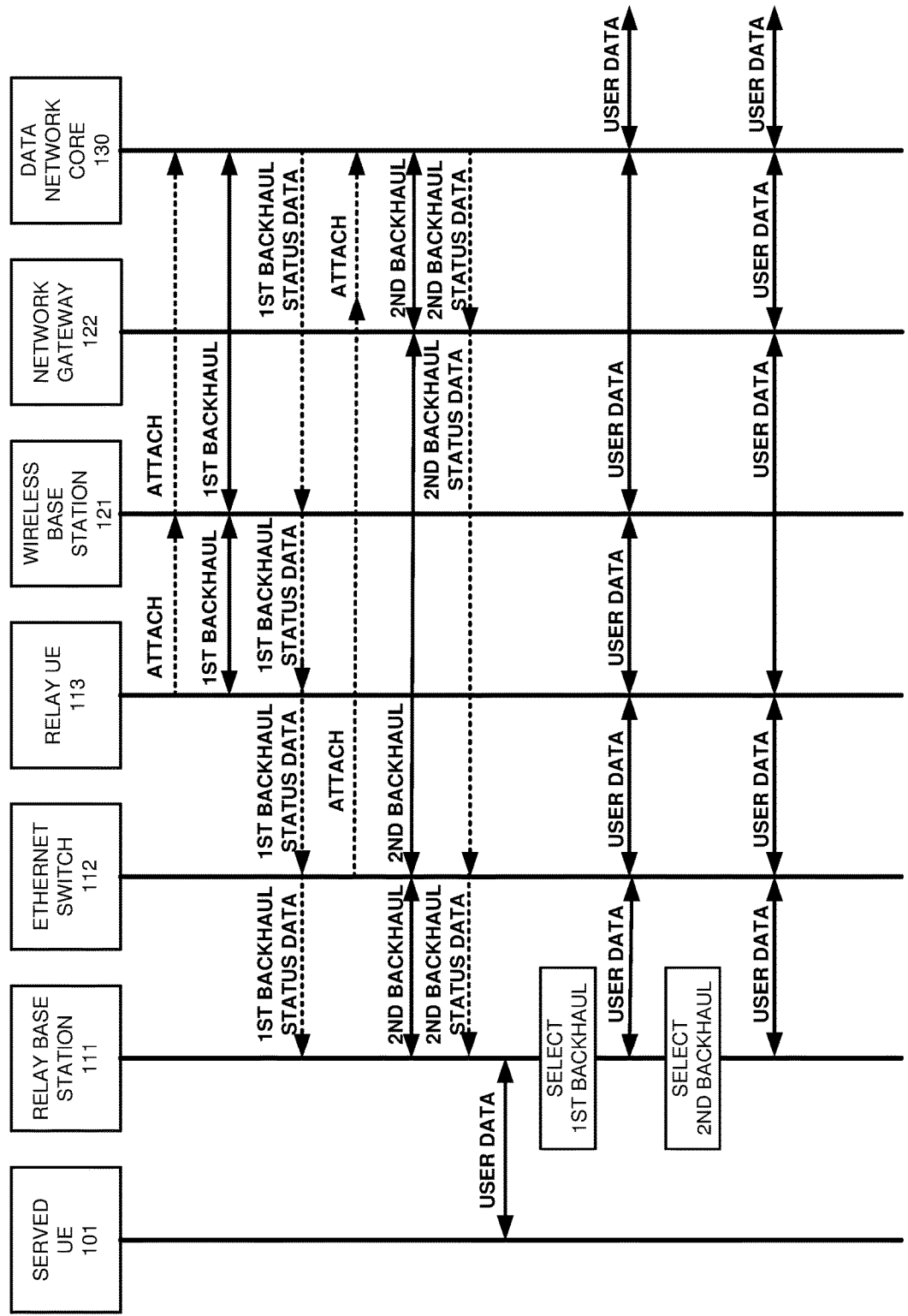
Figure 3:
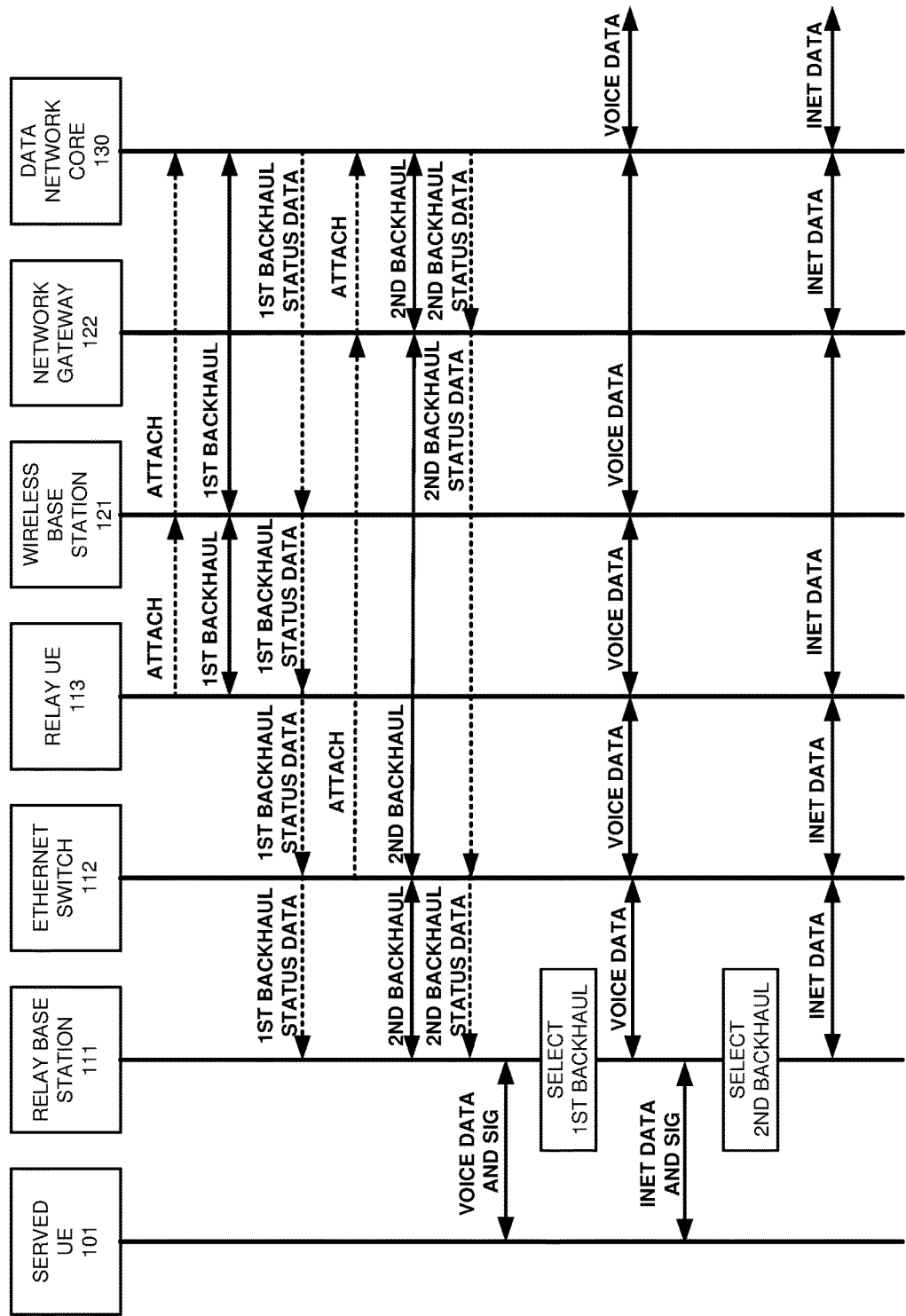

FIGS. 1-3 illustrates data communication network 100 to select backhaul connections for data and media services that are delivered over wireless relay 110. Referring to FIG. 1, data communication network 100 comprises User Equipment (UE) 101, wireless relay 110, wireless base station 121, network gateway 122, and data network core 130. Wireless relay 110 comprises relay base station 111, Ethernet switch 112, and relay UE 113. UE 101 might be a computer, phone, media player, machine transceiver, and the like.

The dotted lines between relay base station 111 and data network core 130 represent dual backhaul options. The first backhaul connection (BH1) traverses Ethernet switch 112, relay UE 113, and wireless base station 121. BH1 uses Ethernet, Long Term Evolution (LTE), Wireless Fidelity/LTE Aggregation (LWA), or some other wireless communication protocol. BH1 is compressed in between relay UE 113 and wireless base station 121. For user data, relay UE 113 and wireless base station 121 may use Robust Header Compression (RoHC). The second backhaul connection (BH2) traverses Ethernet switch 112 and network gateway 122. BH2 uses Ethernet, Data over Cable System Interface Specification (DOCSIS), Wave Division Multiplex (WDM), Time Division Multiplex (TDM), or some other data communication protocol.

In operation, relay UE 113 attaches to wireless base station 121. Wireless base station 121 might be a macrocell eNodeB that is coupled to data network core 130. In response to attachment, relay UE 113 receives BH1 through wireless base station 121 to data network core 130. Relay UE 113 extends BH1 to relay base station 111. Relay UE 113 receives status data for BH1 and transfers the BH1 status data to relay base station 111 over Ethernet switch 112.

Ethernet switch 112 attaches to network gateway 122. Network gateway 122 might be a Secure Gateway (Se-GW) that is coupled to data network core 130. In response to attachment, Ethernet switch 112 receives BH2 through network gateway to data network core 130. Ethernet switch 112 extends BH2 to relay base station 111. Ethernet switch 112 receives BH2 status data through network gateway 130 and transfers the BH2 status data to relay base station 111.

Relay base station 111 exchanges wireless user data with served UE 101. Relay base station 111 selects BH1 or BH2 for the user data based on the BH1 status data and exchanges the user data with data network core 130 over the selected BH1 or BH2. If BH1 has capacity, then BH1 is typically used—especially for compressed media streams like voice and video. If BH1 does not have capacity, then BH2 is typically used—especially for generic internet data like web browsing.

Relay base station 111 may receive the BH1 status data and/or the BH2 status data over BH1 and/or BH2. In some examples, relay base station 111 establishes signaling links over BH1 and/or BH2. The signaling links may comprise X2 links between relay base station 111 and wireless base station 121 over BH1 or BH2. The signaling links may comprise an S1-MME links between relay base station 111 and a Mobility Management Entity (MME) in data network core 130 over BH1 or BH2. The S1-MME link may use multi-home Stream Control Transmission Protocol (SCTP).

The network elements of data communication network 100 (110, 111-113, 121-122, and 130) comprise computer and communication platforms that include data Input/Output (I/O) transceivers, digital processing circuitry, data storage memories, and various software components. The communication bearers of data communication network 100 comprise data networking media, nodes, and protocols that transport user data and network signaling. The media comprises metal, glass, air, and/or space. The nodes comprise modems, routers, and firewalls. The protocols comprise LTE, WiFi, Ethernet, IP, PMIP, DOCSIS, WDM, and TDM.

FIG. 2 illustrates the operation of data communication network 100 to select backhaul connections for user data services that are delivered over wireless relay 110. Relay UE 113 attaches to wireless base station 121. Wireless base station 121 extends the attachment to data network core 130. In response to attachment, relay UE 113 receives BH1. BH1 might be a default data bearer in an LTE network. Data network core 130 transfers BH1 status data to relay UE 113 over wireless base station 121, and relay UE 113 transfers the BH1 status data to relay base station 111. The status data from network core 130 may be delivered over a Non-Access Stratum (NAS) link to relay UE 113 or an S1-MME link to relay base station 111. Wireless base station 121 may also transfer BH1 status data to relay base station 111. Wireless base station 121 may deliver this BH1 status data over an X2 link to relay base station 111.

Ethernet switch 112 attaches to network gateway 122. Network gateway 122 extends the attachment to data network core 130. In response to attachment, Ethernet switch 112 receives BH2. BH2 might be a public internet connection to an LTE network. Data network core 130 transfers BH2 status data to Ethernet switch 112 over network gateway 122, and Ethernet switch 112 transfers the BH2 status data to relay base station 111.

Relay base station 111 exchanges wireless user data with served UE 101. Relay base station 111 selects BH1 for the user data based on the BH1 status data. Relay base station 111 exchanges the user data with data network core 130 over the selected BH1 that traverses Ethernet switch 112, relay UE 113, and wireless base station 120. Relay base station 111 uses BH1 if it has capacity. If the BH1 status data indicates that BH1 capacity falls below a threshold, then, Relay base station 111 selects BH2.

FIG. 3 illustrates the operation of data communication network 100 to select backhaul connections for media services that are delivered over wireless relay 110. Relay UE 113 attaches to wireless base station 121. Wireless base station 121 extends the attachment to data network core 130. In response to attachment, relay UE 113 receives BH1. BH1 comprises a data bearer in an LTE network that uses RoHC between relay UE 113 and wireless base station 121. Data network core 130 transfers BH1 status data to relay UE 113 over wireless base station 121, and relay UE 113 transfers the BH1 status data to relay base station 111. The status data from network core 130 may be delivered over a Non-Access Stratum (NAS) link to relay UE 113 or an S1-MME link to relay base station 111. Wireless base station 121 may also transfer BH1 status data to relay base station 111 over an X2 link.

Ethernet switch 112 attaches to network gateway 122. Network gateway 122 extends the attachment to data network core 130. In response to attachment, Ethernet switch 112 receives BH2. BH2 is a public internet connection to an LTE network. Data network core 130 transfers BH2 status data to Ethernet switch 112 over network gateway 122, and Ethernet switch 112 transfers the BH2 status data to relay base station 111.

Relay base station 111 exchanges wireless signaling and voice data with served UE 101. Relay base station 111 selects BH1 for the voice data based on the BH1 status data showing adequate capacity. Relay base station 111 exchanges the voice data with data network core 130 over the selected BH1 that traverses Ethernet switch 112, relay UE 113, and wireless base station 120. If the BH1 status data indicates that BH1 capacity falls below a threshold, then relay base station 111 may use BH2 for the voice data.

Relay base station 111 exchanges wireless signaling and internet data with served UE 101. Relay base station 111 selects BH2 for the internet data based on the BH2 status data showing adequate credits under a tariff. Relay base station 111 exchanges the internet data with data network core 130 over the selected BH2 that traverses Ethernet switch 112 and network gateway 122. If the BH2 status data indicates that BH2 credits falls below a threshold, then relay base station 111 may use BH1 for the internet data. Thus, the BH2 status data would include available data transfer amounts under the tariff or indications of when and when not to use BH2 based on actual data usage against a tariff threshold.

Media types other than voice could be handled in a similar manner. For example, uncompressed media types may be transported over BH2 while compressed media types are transported over BH1. Audio and video streaming services could be identified implement a service-specific backhaul logic in wireless relay 110. Wireless capacity thresholds and network tariffs thresholds could be used by wireless relay 110 to move individual and specific media types back and forth between BH1 and BH2.

Figure 4:
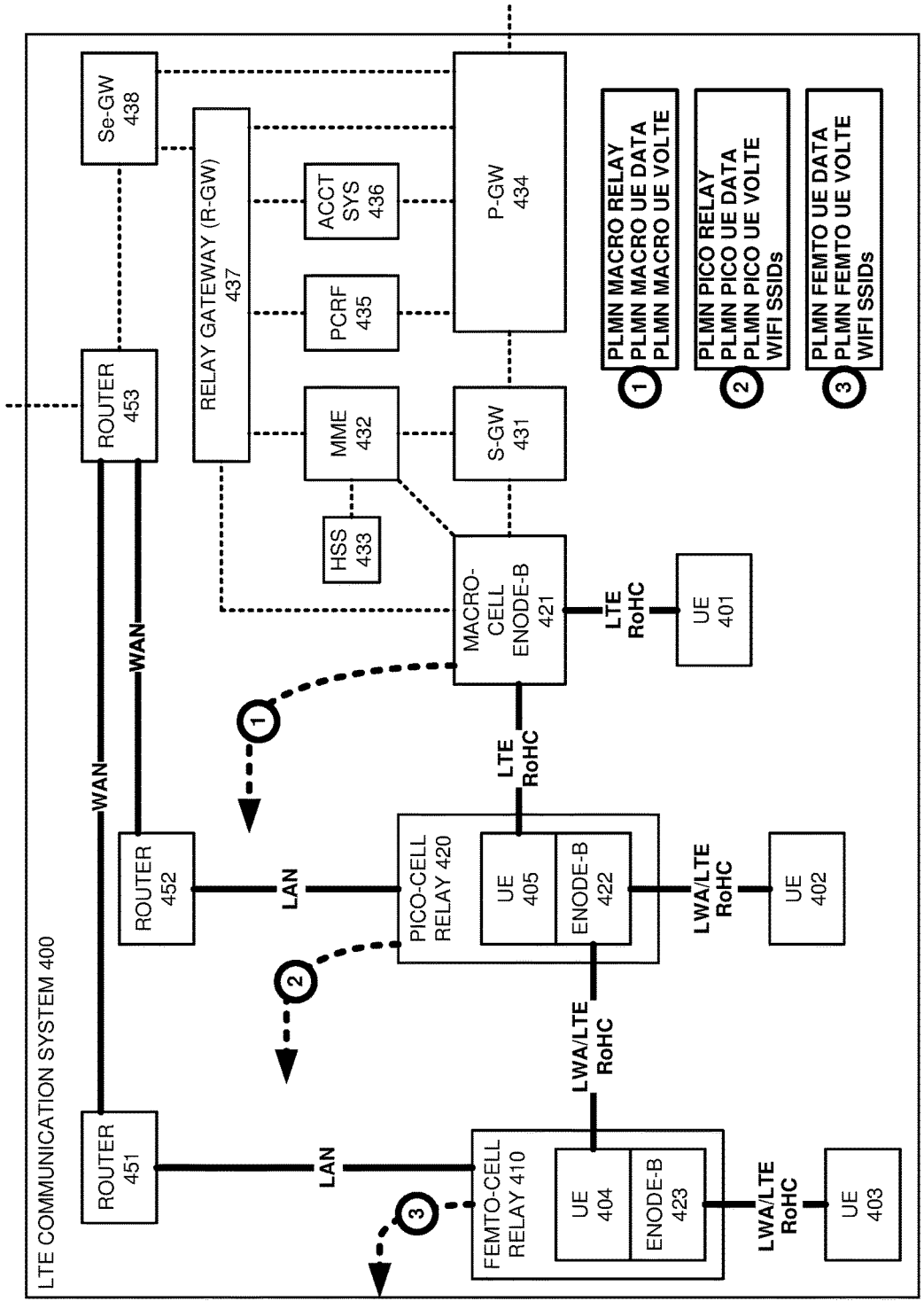
FIG. 4 illustrates a Long Term Evolution (LTE) data communication system having a Relay Gateway (R-GW) to proxy signaling for picocell relays and femtocell relays.

FIG. 4 illustrates Long Term Evolution (LTE) communication system 400 that comprises Relay Gateway (R-GW) 437 to proxy LTE signaling for femtocell relay 410 and picocell relay 420. LTE communication system 400 comprises: User Equipment (UEs) 401-403, femtocell relay 410, picocell relay 420, macrocell eNodeB 421, Serving Gateway (S-GW) 431, Mobility Management Entity (MME) 432, Home Subscriber System (HSS) 433, Packet Data Network Gateway (P-GW) 434, Policy and Charging Rules Function (PCRF) 435, Accounting system (ACCT) 436, R-GW 437, Security Gateway (Se-GW) 438, and routers 451-453. Femtocell relay 410 comprises UE 404 and eNodeB 423. Picocell relay 420 comprises UE 405 and eNodeB 422.

Femtocell relay 410 is coupled to router 451 over a Local Area Network (LAN) such as an Ethernet LAN. Router 451 is coupled to router 453 over a Wide Area Network (WAN) such as a Data Over Cable Service Information Specification (DOCSIS) system, Time Division Multiplex (TDM), Wave Division Multiplexing (WDM), Ethernet, or some other data network. Picocell relay 420 is coupled to router 452 over a LAN. Router 452 is coupled to router 453 over a WAN. Router 453 is coupled to Se-GW 438. The number and configuration of routers illustrated is representative and may vary.

To attract UEs using LTE, eNodeBs 421-423 broadcast various Public Land Mobile Network Identifiers (PLMN IDs). UEs 401-405 receive the PLMN broadcasts and identify their desired LTE network during LTE attachment using the broadcast PLMN IDs. Referring to the circled number one on FIG. 4, macrocell eNodeB 421 broadcasts a PLMN ID of MACRO RELAY to attract relays like femtocell relay 410 and picocell relay 420. Macrocell eNodeB 421 broadcasts PLMN IDs for MACRO UE DATA and MACRO UE VOLTE to attract UEs like UE 401. Likewise, picocell eNodeB 422 broadcasts PLMN IDs for PICO UE DATA, PICO UE VOLTE, and PICO RELAY. Femtocell eNodeB 421 broadcasts PLMN IDs for FEMTO UE DATA and FEMTO UE VOLTE. A PLMN ID is typically associated with one or more Access Point Names (APNS) that are selected by MME 432 and HSS 433 when a UE attaches using that PLMN ID.

To attract UEs using WiFi, eNodeBs 422-423 also broadcast various WiFi Service Set Identifiers (SSIDs). UEs 402-404 receive the SSID broadcasts and identify their desired WiFi network during WiFi attachment using the broadcast SSIDs. For example, a picocell SSID might be as simple as "PICO 420" or be more complex like "PICO 420 RELAY", "PICO 420 UE DATA", or "PICO 420 UE VOLTE." Using Packet Data Convergence Protocol (PDCP), eNodeBs 422-423 convert between the Wifi data and the LTE data.

UEs 402-404 and eNodeBs 422-423 exchange wireless data communications using LTE/WiFi Aggregation (LWA). With LWA, eNodeBs 422-423 expose both WiFi and LTE access interfaces to UEs 402-404 over unlicensed spectrum at 2.4 GHz, 5 GHz, or some other band. In addition, eNodeBs 422-423 expose LTE access interfaces to UEs 402-404 over licensed spectrum between 0.3 GHz-3 GHz or some other band. Thus, UEs 402-404 may use LTE or WiFi over licensed or unlicensed spectrum. UE 404 may use LWA to exchange compressed user data and LTE signaling with eNodeB 422 by using WiFi over unlicensed spectrum. UE 405 may use LTE to exchange compressed user data and LTE signaling with eNodeB 421—perhaps over unlicensed spectrum.

To facilitate LWA, UEs 402-404 and eNodeBs 422-423 perform PDCP aggregation for the WiFi user data and signaling. The LTE PDCP layer handles user data and LTE signaling between the LTE IP layer and the LTE Radio Link Control (RLC) layer. The LTE RLC layer handles user data and signaling between the PDCP layer and the LTE Medium Access Control (MAC) Layer. With PDCP aggregation, an LTE/WiFi RLC layer is adapted to exchange user data between the WiFi MAC layer and the LTE PDCP layer. The LTE/WiFi RLC layer interworks between WiFi and LTE.

UEs 401-405 and eNodeBs 421-423 perform compression/decompression on the user data and signaling to wirelessly exchange compressed user data and LTE signaling over the air. The PDCP layers in UEs 401-405 and in eNodeBs 421-423 perform user data compression/decompression using Robust Header Compression (RoHC) at the Real-time Transfer Protocol (RTP) layer, User Datagram Protocol (UDP) layer, and Internet Protocol (IP) layer. The PDCP layers in UEs 401-405 and in eNodeBs 421-423 perform LTE signaling compression/decompression using general compression at the User Datagram Protocol (UDP) layer and the Internet Protocol (IP) layer.

UEs 402-404 exchange WiFi and/or LTE data with eNodeBs 422-423. Relays 410 and 420 have the option of exchanging the user data with the Internet over the LAN/WAN using their Local Internet Protocol Access (LIPA) interfaces. Relays 410 and 420 may also exchange their user data with P-GW 434 over the backhaul provided by the LWA/LTE interfaces. In addition, Relays 410 and 420 may exchange the user data with P-GW 434 over the backhaul provided by the LAN/WAN interfaces.

To backhaul their user data, eNodeBs 421-423 generate S1-U General Packet Radio Service Transfer Protocol User (GTP-U) data tunnels to their respective S-GWs. The S-GWs terminate these S1-U GTP-U data tunnels from eNodeBs 421-423. In femtocell relay 410, a Local S-GW (L-SGW) terminates the S1-U GTP-U tunnel from eNodeB 423. UE 404 and eNodeB 422 may exchange this user data using LWA/LTE and RoHC. In picocell relay 420, an L-SGW terminates the S1-U GTP-U tunnel from eNodeB 422. UE 405 and eNodeB 421 may exchange the user data using LTE and RoHC.

To service the user data, relays 410 and 420 generate LTE signaling (S1-MME, S11, S15, X2, and Gy/Gz). Relays 410 and 420 exchange the LTE signaling with R-GW 437 over the backhaul provided by the LWA/LTE interfaces or the backhaul provided by the LAN/WAN interfaces. R-GW 437 exchanges the LTE signaling with eNodeB 421 (X2), MME 432 (S1-MME and S11), P-GW 434 (PMIP), PCRF 435 (S15), and ACCT 436 (Gz/Gy). At the macro layer, eNodeB 421 and MME 432 exchange S1-MME signaling. S-GW 431 and MME 432 exchange S11 signaling. P-GW 434 and PCRF 435 exchange Gx signaling. P-GW 434 and ACCT 436 exchange Gz/Gy signaling. Macro eNodeB 421 and S-GW 431 exchange S1-U data. S-GW 431 and P-GW 434 exchange S5 data. P-GW 434 exchanges SGi data with various systems including R-GW 437.

Figure 5:
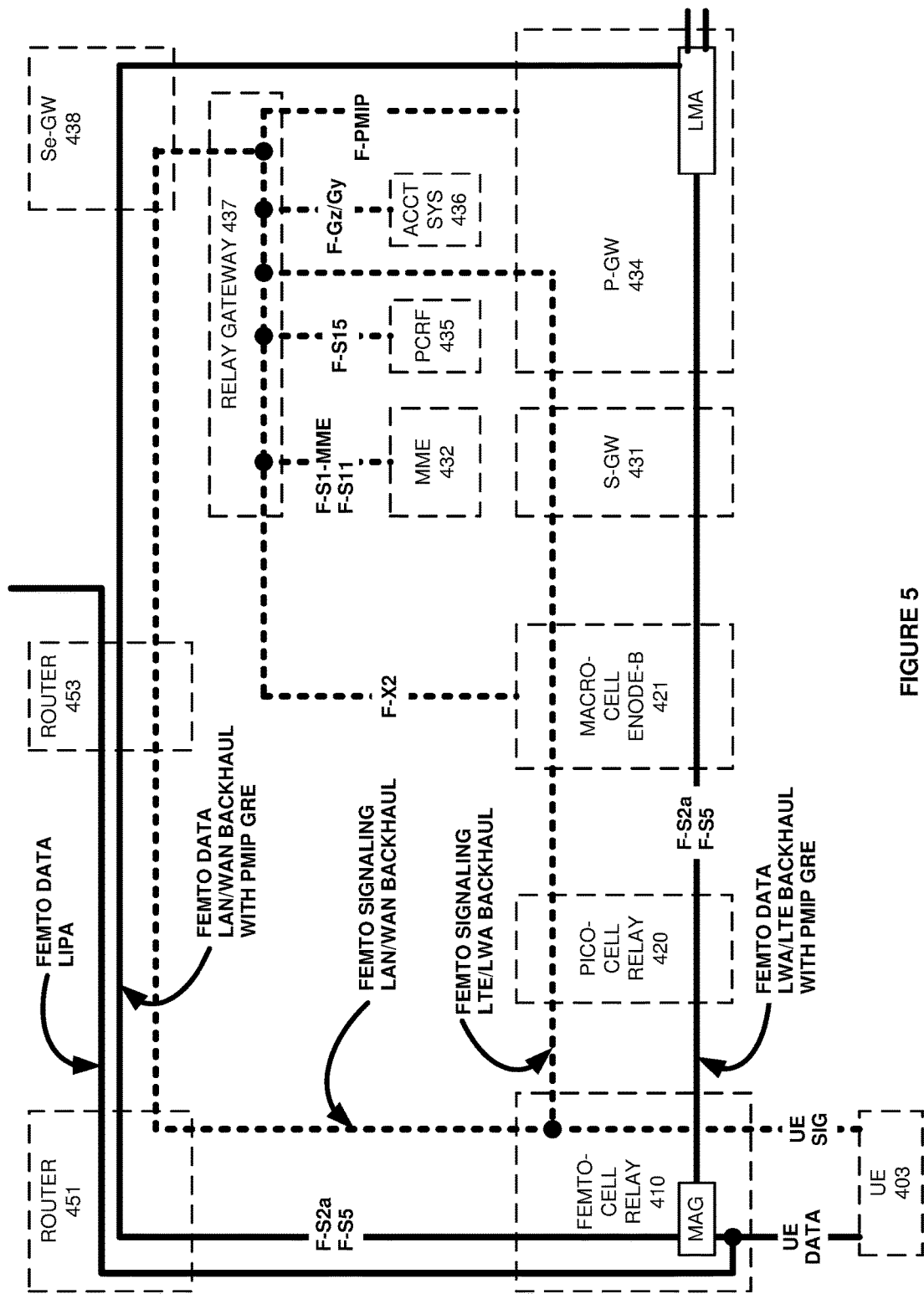
FIGS. 5-17 illustrate a variant of the LTE data communication system that uses Proxy Mobile Internet Protocol (PMIP) Generic Routing Encapsulation (GRE) tunnels between Local Serving Gateways (L-SGWs) in the relays and macro Packet Data Security Gateways (P-GWs).

FIGS. 5-17 illustrate a variant of the LTE data communication system 400 that uses Proxy Mobile Internet Protocol (PMIP) Generic Routing Encapsulation (GRE) tunnels between Local Serving Gateways (L-SGWs) in relays 410 and 420 and macro P-GW 434. The use of the PMIP GRE tunnels facilitates UE IP address continuity when UE 403 is mobile. Referring to FIG. 5, a Local Mobility Anchor (LMA) in P-GW 434 is coupled to a Mobile Access Gateway (MAG) in the Local S-GW (L-SGW) of femtocell relay 410.

UE 403 has a data bearer and a signaling bearer with femtocell relay 410. The L-SGW in femtocell relay 410 may exchange some of this user data with the Internet over routers 451 and 453 in a LIPA data service. The MAG in femtocell relay 410 may exchange some of the user data with the LMA in P-GW 434 over a PMIP GRE tunnel through picocell relay 420, eNodeB 421, and S-GW 431. The MAG in femtocell relay 410 may also exchange some of the UE data with the LMA in P-GW 434 over a PMIP GRE tunnel through router 451, router 453, and Se-GW 438.

For Voice over LTE (VoLTE) or other Internet Multimedia Subsystem (IMS) services, the MAG in femtocell relay 410 and the LMA in a VoLTE P-GW (not shown) establish VoLTE PMIP GRE tunnels upon femtocell relay attachment. The VoLTE PMIP GRE tunnels traverse both the LAN/WAN and LWA/LTE interfaces. The VoLTE PMIP GRE tunnels each transport F-S2a and F-S5 user data flows that carry user audio/video data and Session Initiation Protocol (SIP) signaling.

Femtocell relay 410 terminates the UE signaling and transfers Non-Access Stratum (NAS) messages between UE 403 and MME 432 in its own LTE Femtocell (F) signaling. Femtocell relay 410 may exchange its F-signaling with R-GW 437 in an LTE signaling tunnel through picocell relay 420, eNodeB 421, S-GW 431, and P-GW 434. Femtocell relay 410 may also exchange its F-signaling with R-GW 437 in another LTE signaling tunnel through router 451, router 453, and Se-GW 438. R-GW 437 exchanges the F-signaling with eNodeB 421 (F-X2), MME 432 (F-S1-MME and F-S11), P-GW 434 (F-PMIP), other P-GWs (F-PMIP), PCRF 435 (F-S15), and ACCT 436 (F-Gz/Gy).

Femtocell relay 410 has associated LTE Access Point Names (APNs) to establish its user data and signaling bearers. A femto data APN supports the F-S5/2a user data flows in the PMIP GRE tunnel between the MAG in femtocell relay 410 and the LMA in P-GW 434 through picocell relay 420, eNodeB 421, and S-GW 431. For IMS services like VoLTE, the femto data APN also supports F-S5/2a user data flows in a VoLTE PMIP GRE tunnel between the MAG in femtocell relay 410 and the LMA in a VoLTE P-GW (not shown) through picocell relay 420, eNodeB 421, and S-GW 431. A femto signaling APN supports the LTE signaling tunnel (F-X2, F-S1-MME, F-S11, F-S15, F-PMIP, and F-Gz/Gy) between femtocell relay 410 and R-GW 437 through picocell relay 420, eNodeB 421, S-GW 431, and P-GW 434. R-GW 437 supports the femto signaling APN by exchanging the LTE signaling with eNodeB 421 (F-X2), MME 432 (F-S1-MME, F-S11), P-GW 434 (F-PMIP), other P-GWs (F-PMIP), PCRF 435 (F-S15), and ACCT 436 (F-Gz/Gy).

Figure 6:
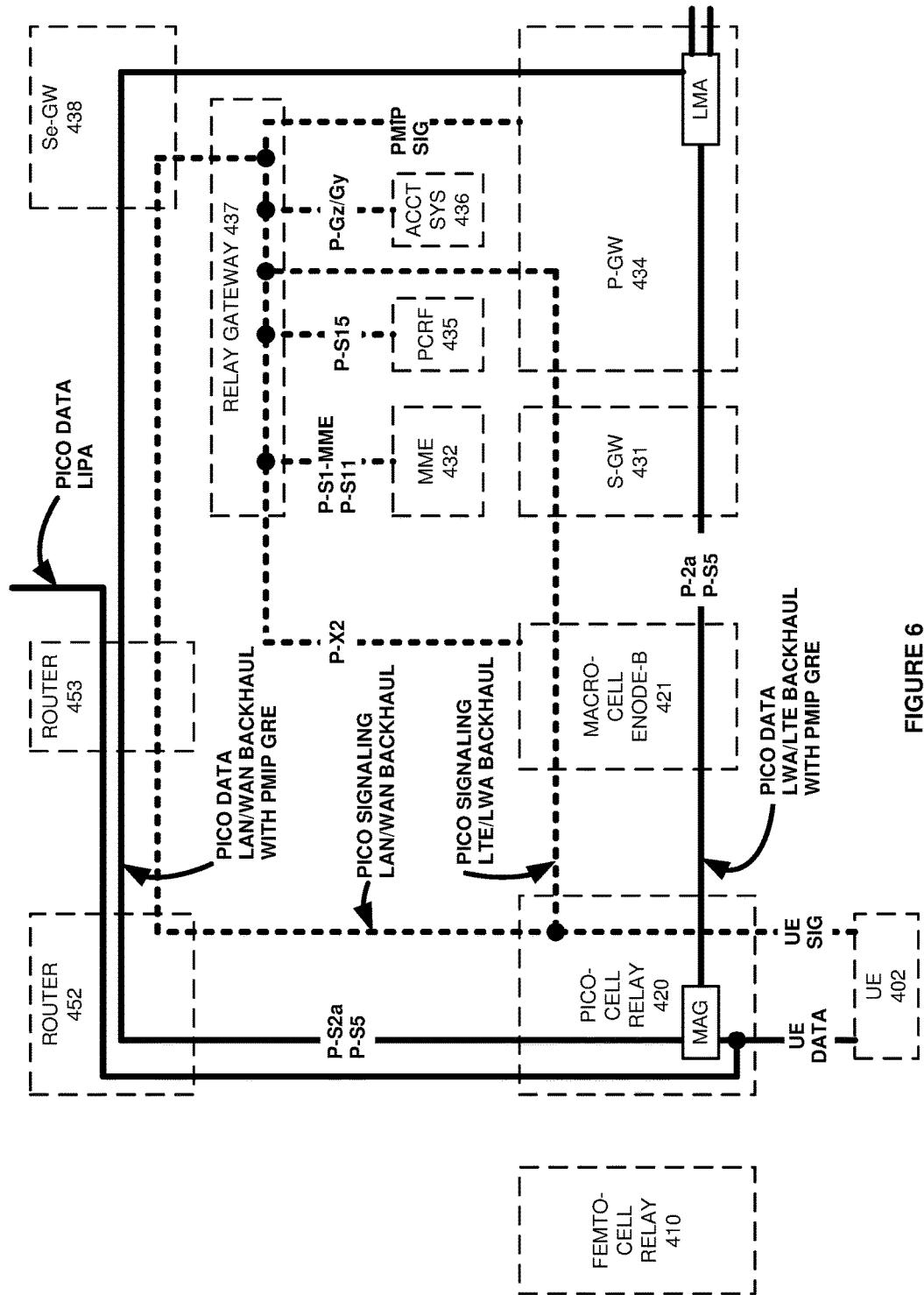

Referring to FIG. 6, a Local Mobility Anchor (LMA) in P-GW 434 is coupled to a Mobile Access Gateway (MAG) in the L-SGW of picocell relay 420. UE 402 has a UE data bearer and a UE signaling bearer with picocell relay 420. The L-SGW in picocell relay 420 may exchange some of the user data with the Internet over routers 452-453 in a LIPA data service. The MAG in picocell relay 420 may exchange some of the user data with the LMA in P-GW 434 over a PMIP GRE tunnel through eNodeB 421 and S-GW 431. The MAG in picocell relay 420 may also exchange some of the user data with the LMA in P-GW 434 over a PMIP GRE tunnel through routers 452-453 and Se-GW 438.

For VoLTE or other IMS services, the MAG in picocell relay 420 and the LMA in a VoLTE P-GW (not shown) establish VoLTE PMIP GRE tunnels upon picocell relay attachment. The VoLTE PMIP GRE tunnels traverse both the LAN/WAN and LWA/LTE interfaces. The VoLTE PMIP GRE tunnels transport P-S2a and P-S5 user data flows that carry user voice data and Session Initiation Protocol (SIP) signaling.

Picocell relay 420 terminates the UE signaling and transfers Non-Access Stratum (NAS) messages between UE 402 and MME 432 in its own LTE Picocell (P) signaling. Picocell relay 420 may exchange its P-signaling with R-GW 437 over eNodeB 421, S-GW 431, and P-GW 434. Picocell relay 420 may also exchange its P-signaling with R-GW 437 over routers 452-453 and Se-GW 438. R-GW 437 exchanges the P-signaling with eNodeB 421 (P-X2), MME 432 (P-S1-MME and P-S11), P-GW 434 and others (PMIP), PCRF 435 (P-S15), and ACCT 436 (F-Gz/Gy).

Picocell relay 420 has associated LTE APNs to establish its user data and signaling bearers. A pico data APN supports the F-S5/2a user data in the PMIP GRE tunnel between the MAG in picocell relay 420 and the LMA in P-GW 434 through eNodeB 421 and S-GW 431. For IMS services like VoLTE, the pico data APN also supports F-S5/2a user data flows in a VoLTE PMIP GRE tunnel between the MAG in picocell relay 420 and the LMA in a VoLTE P-GW (not shown) through eNodeB 421 and S-GW 431. A pico signaling APN supports the LTE signaling tunnel (P-X2, P-S1-MME, P-S11, P-S15, P-PMIP, and P-Gz/Gy) between picocell relay 420 and R-GW 437 through eNodeB 421, S-GW 431, and P-GW 434. R-GW 437 supports the pico signaling APN by exchanging the picocell LTE signaling with eNodeB 421 (P-X2), MME 432 (P-S1-MME, P-S11), P-GW 434 and others (PMIP), PCRF 435 (P-S15), and ACCT 436 (F-Gz/Gy).

Figure 7:
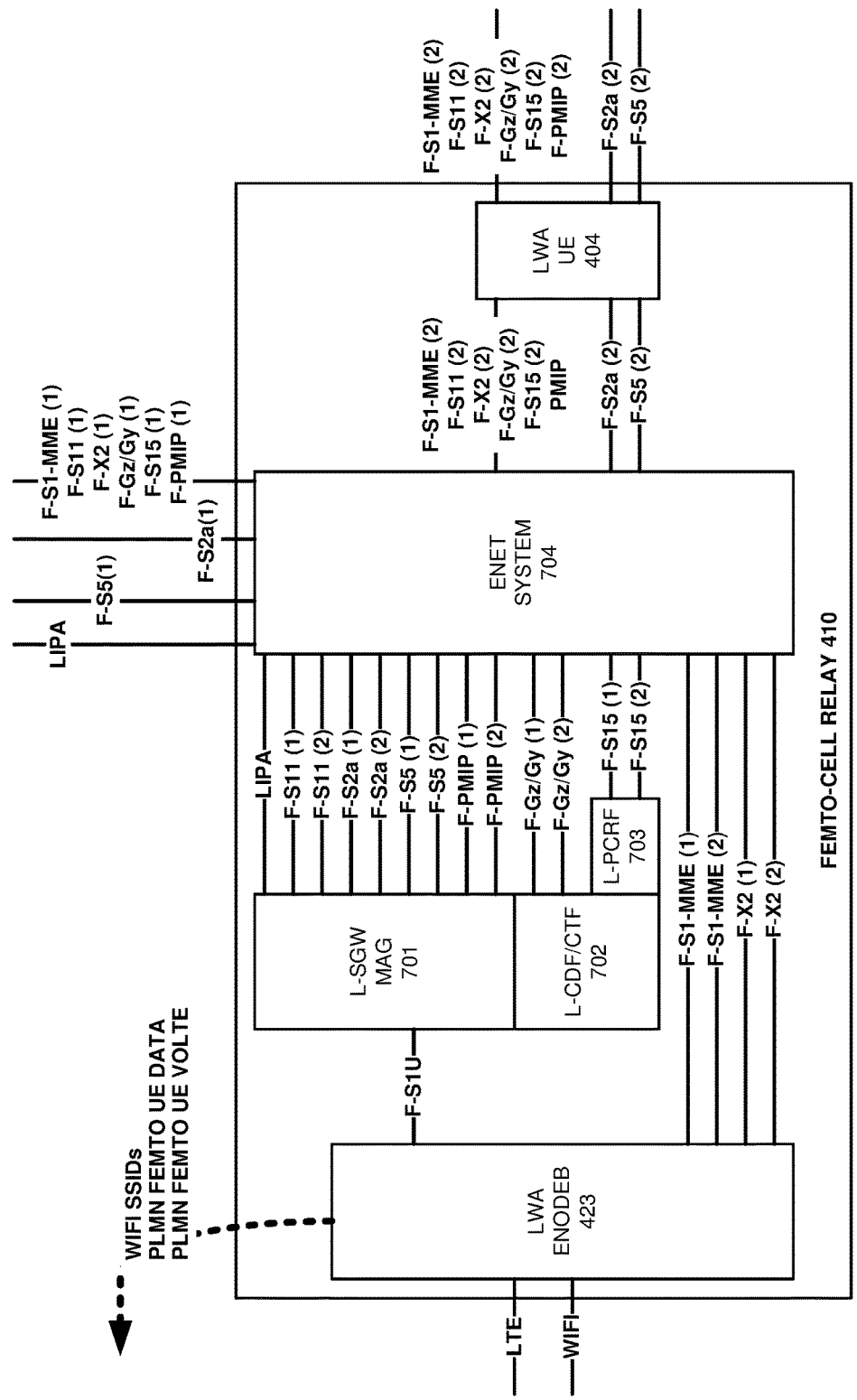

FIG. 7 illustrates femtocell relay 410. Femtocell relay 410 comprises LWA eNodeB 423, L-SGW/MAG 701, Local Charging Data Function and Charging Trigger Function (L-CDF/CTF) 702, Local Policy and Charging Rules Function (L-PCRF) 703, Ethernet system 704, and LWA UE 404. LWA eNodeB 423 exposes LTE and WiFi interfaces to UEs and broadcasts WiFi SSIDs and LTE PLMN IDs for FEMTO UE DATA and FEMTO UE VOLTE.

LWA eNodeB 423 applies RoHC compression/decompression to the user data exchanged with UEs over the LTE and WiFi links. LWA eNodeB 423 applies general compression/decompression to the LTE signaling exchanged with the UEs over the WiFi and LTE links. LWA UE 404 also applies RoHC compression/decompression to the F-S5/2a user data exchanged over the LWA/LTE links. UE 404 applies general compression/decompression to the LTE signaling exchanged over the LWA/LTE links. UE 404 and eNodeB 423 apply LTE QCIs as directed.

For user data, eNodeB 423 exchanges the user data over the F-S1U with L-SGW/MAG 701. L-SGW/MAG 701 terminates the F-S1U user data from eNodeB 423. L-SGW/MAG 701 forms an endpoint for the PMIP GRE tunnels to P-GW 434 over the LAN/WAN and LWA/LTE interfaces. L-SGW/MAG 701 performs bridging, formatting, and filtering on the user data from the F-S1U to form F-S2a and F-S5 user data.

L-SGW/MAG 701 and Ethernet system 704 exchange some user data F-S2a(1) and F-S5(1) over the PMIP GRE tunnels that traverse the LAN/WAN. L-SGW/MAG 701 and Ethernet system 704 exchange other user data F-S2a(2) and F-S5(2) over the other PMIP GRE tunnels that traverse LWA/LTE. L-SGW/MAG 701 and Ethernet system 704 may also exchange user data with the Internet over the LAN/WAN for a LIPA service.

For femtocell signaling, eNodeB 423 and Ethernet system 704 exchange some LTE signaling (F-S1-MME(1) and F-X2 (1)) for LAN/WAN backhaul and exchange other signaling (F-S1-MME(2) and F-X2(2)) for LWA/LTE backhaul. L-SGW/MAG 701 and Ethernet system 704 exchange some LTE signaling (F-S11(1) and F-PMIP (1)) for LAN/WAN backhaul and exchange other signaling (F-S11(2) and F-PMIP (2)) for LWA/LTE backhaul. Likewise, L-CDF/CTF 703 and Ethernet system 704 exchange some LTE signaling (F-Gz/Gy(1)) for LAN/WAN backhaul and exchange other signaling (F-Gz/Gy(2)) for LWA/LTE backhaul. L-PCRF 703 and Ethernet system 704 exchange some LTE signaling (F-S15(1)) for LAN/WAN backhaul and exchange other signaling (F-S15 (2)) for LWA/LTE backhaul.

Advantageously, L-SGW 701 has multiple backhaul options for its LTE signaling and user data through Ethernet system 704. Ethernet system 704 obtains LTE network access over the LAN/WAN. LWA UE 404 obtains LTE network access over LWA/LTE for Ethernet system 704. Ethernet system 704 aggregates and routes femtocell signaling and user data over these interfaces. Like eNodeB 423, L-SGW/MAG 701, and UE 404, Ethernet system 704 applies LTE Quality-of-Service (QoS) to its bearers as indicated by the specified LTE QoS Class Identifiers (QCIs).

To translate between LTE and Ethernet QoS, Ethernet system 704 applies Differentiated Services (DS) to its bearers to match its QoS to the corresponding LTE QCI metrics. Thus, Ethernet system 704 exchanges LTE signaling using DS Point Codes (DSCPs) that correspond to QCI 5. Ethernet system 704 exchanges F-S5/2a user data using DSCPs that correspond to QCI 1, QCI 5, QCI 9, or some other QoS. For VoLTE, L-SGW 701 maps between QCI 1 (voice) and QCI 5 (signaling) on the F-S1U interface and corresponding DSCPs for voice and signaling in the F-S5/S2a PMIP GRE tunnels. The other elements of femtocell relay 410 (423, 702, 703, 404) may also use DSCP in a similar manner for their traffic and QCIs.

L-SGW/MAG 701 has a Children's Internet Protection Act (CIPA) filter application to filter user data. Macrocell PCRF 435 has a CIPA pitcher that transfers CIPA filter flags and configuration data to L-PCRF 703 over the F-S15 links. L-PCRF 703 transfers the CIPA filter flags and configuration data to the CIPA application in L-SGW 701. L-SGW 701 filters the F-S1U user data using in the CIPA filter application as configured by macro PCRF 435.

Figure 8:
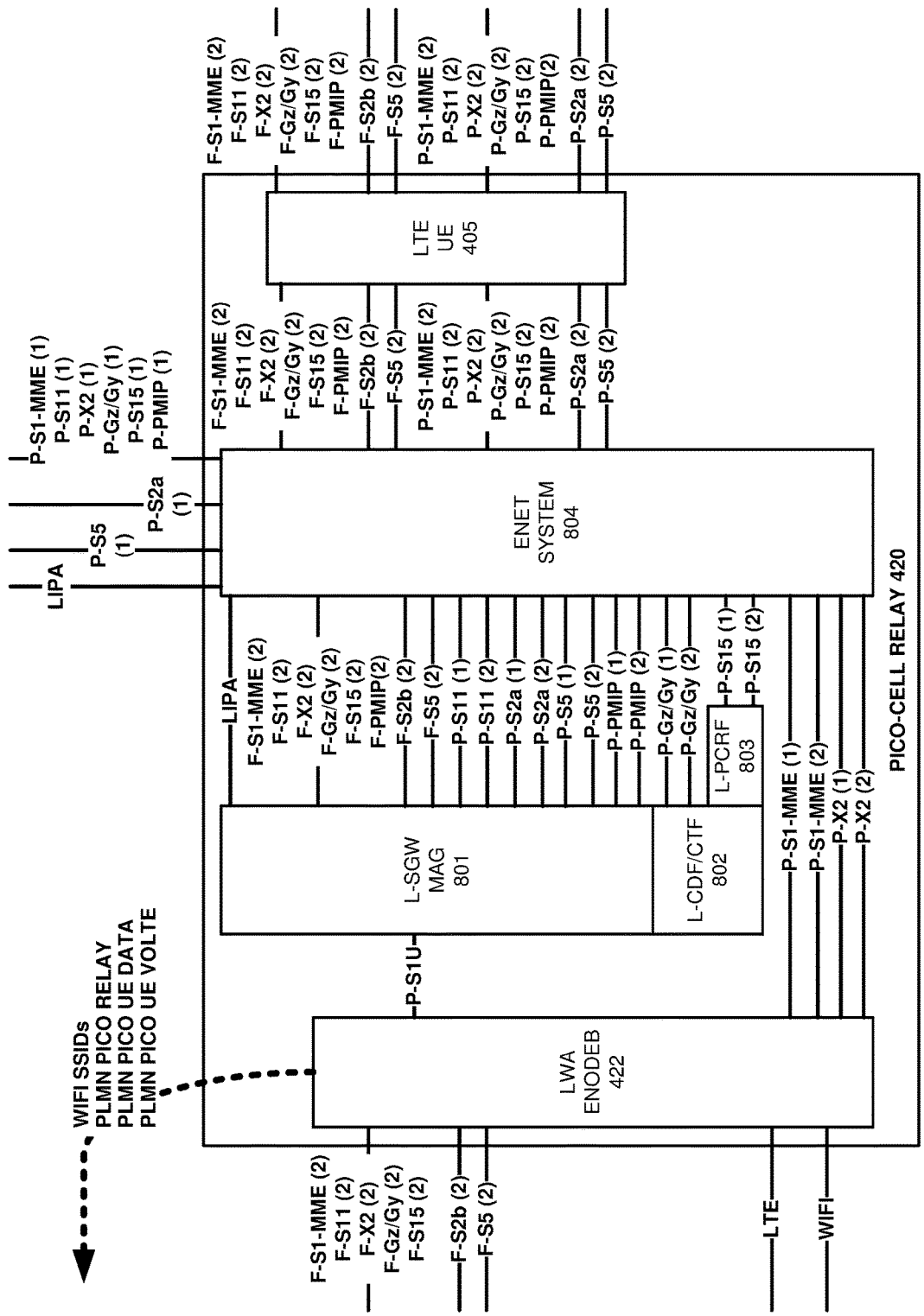

FIG. 8 illustrates picocell relay 420. Picocell relay 420 comprises LWA eNodeB 422, L-SGW/MAG 801, L-CDF/CTF 802, L-PCRF 803, Ethernet system 804, and LTE UE 405. LWA eNodeB 422 exposes LTE and WiFi interfaces to UEs and broadcasts WiFi SSIDs and LTE PLMN IDs for PICO RELAY, PICO UE DATA, and PICO UE VOLTE.

LWA eNodeB 422 applies RoHC compression/decompression to the user data exchanged over the LTE and WiFi links. LWA eNodeB 422 applies general compression/decompression to the LTE signaling exchanged over the LTE and WiFi links. UE 405 applies RoHC compression/decompression to the user data exchanged over the LTE links. UE 405 applies general compression/decompression to the LTE signaling exchanged over the LTE links. UE 405 and eNodeB 422 apply LTE QCIs as directed.

For user data, eNodeB 422 exchanges the user data over the P-S1U with L-SGW/MAG 801. L-SGW/MAG 801 terminates the P-S1U user data from eNodeB 422. L-SGW/MAG 801 forms an endpoint for the PMIP GRE tunnels to P-GW 434. L-SGW/MAG 801 performs bridging, formatting, and filtering on the user data from the P-S1U to form P-S2a and P-S5 user data. L-SGW/MAG 801 and Ethernet system 804 exchange user data P-S2a(1) and P-S5(1) for the PMIP GRE tunnels that traverse the LAN/WAN. L-SGW/MAG 801 and Ethernet system 804 exchange user data P-S2a(2) and P-S5(2) for the PMIP GRE tunnels that traverse LWA/LTE. L-SGW/MAG 801 and Ethernet system 804 may also exchange user data with the Internet over the LAN/WAN for a LIPA service.

For picocell signaling, eNodeB 422 and Ethernet system 804 exchange some LTE signaling (P-S1-MME(1) and P-X2 (1)) for LAN/WAN backhaul and exchange other signaling (P-S1-MME(2) and P-X2(2)) for LTE backhaul. L-SGW/MAG 801 and Ethernet system 804 exchange some LTE signaling (P-S11(1) and P-PMIP (1)) for LAN/WAN backhaul and exchange other signaling (P-S11(2) and P-PMIP (2)) for LTE backhaul. Likewise, L-CDF/CTF 803 and Ethernet system 804 exchange some LTE signaling (P-Gz/Gy(1)) for LAN/WAN backhaul and exchange other signaling (P-Gz/Gy(2)) for LTE backhaul. L-PCRF 804 and Ethernet system 804 exchange some LTE signaling (P-S15(1)) for LAN/WAN backhaul and exchange other signaling (P-S15 (2)) for LTE backhaul.

Advantageously, L-SGW 801 has multiple backhaul options for its signaling and user data through Ethernet system 804. Ethernet system 804 obtains network access over the LAN/WAN. LTE UE 405 obtains network access over LTE for Ethernet system 804. Ethernet system 804 aggregates and routes picocell signaling and user data. Like eNodeB 422, L-SGW 801, and UE 405, Ethernet system 804 applies LTE QoS to its bearers as indicated by the specified LTE QCIs.

To translate between LTE and Ethernet QoS, Ethernet system 804 applies Diff Serv (DS) to its bearers to match its QoS to the corresponding LTE QCI metrics. Thus, Ethernet system 804 exchanges LTE signaling using DS Point Codes (DSCPs) that correspond to QCI 5. Ethernet system 804 exchanges F-S2a user data using DSCPs that correspond to QCI 1, QCI 5, QCI 9, or some other QoS. For VoLTE, L-SGW 801 maps between QCI 1 (voice) and QCI 5 (signaling) on the P-S1U interface and corresponding DSCPs for voice and signaling in the P-S5/S2a PMIP GRE tunnels. The other elements of picocell relay 420 (422, 802, 803, 405) may also use DSCP in a similar manner for their traffic and QCIs.

For the femtocell signaling and user data, LWA eNodeB 422 applies RoHC compression/decompression to the user data (F-S2a(2) and F-S5(2)) that traverses the femtocell's PMIP GRE tunnels. LWA eNodeB 422 applies general compression/decompression to the femtocell LTE signaling (F-S1-MME(2), F-X2(2), F-S11(2), F-S15(2), F-PMIP (2), and F-Gz/Gy(2)) that traverses the signaling tunnel. L-SGW/MAG 801 terminates the P-S1U having picocell user data, femtocell user data, and femtocell signaling. L-SGW 801, Ethernet system 804, and LTE UE 405 exchange the femtocell data over the F-S5 and F-S2a PMIP GRE tunnels using the requisite QCI/DSCP QoS. L-SGW 801, Ethernet system 804, and LTE UE 405 exchange the femtocell signaling over the femto signaling tunnel using the requisite QCI/DSCP QoS.

L-SGW/MAG 801 has a Children's Internet Protection Act (CIPA) filter application to filter user data. Macrocell PCRF 435 has a CIPA pitcher that transfers CIPA filter flags and configuration data to L-PCRF 803 over the P-S15 links. L-PCRF 803 transfers the CIPA filter flags and configuration data to the CIPA application in L-SGW 801. L-SGW 801 filters the P-S1U using in the CIPA filter application as configured by macro PCRF 435.

Figure 9:
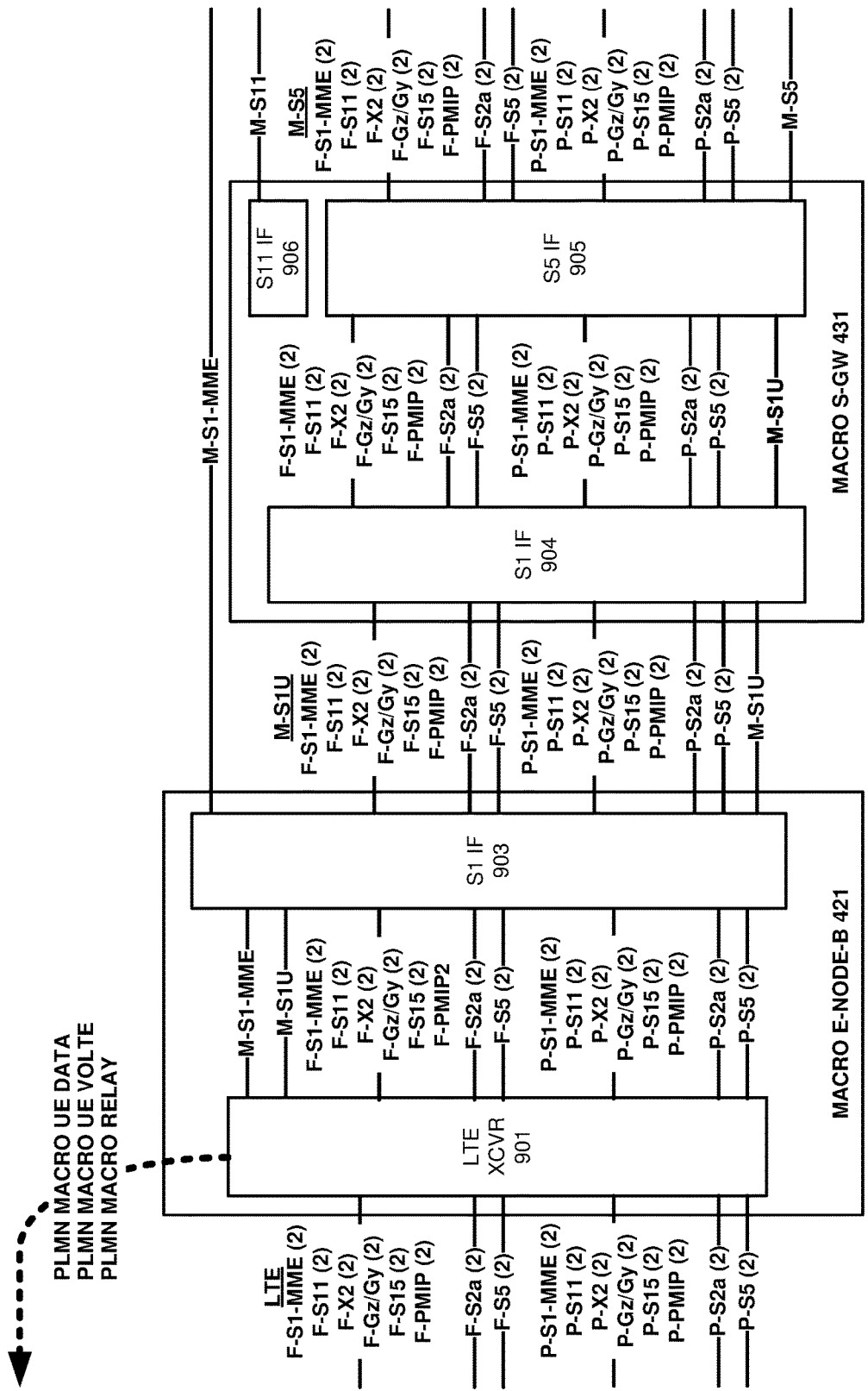

FIG. 9 illustrates macrocell eNodeB 421 and S-GW 431. Macrocell eNodeB 421 comprises LTE transceiver 901 and S1 interface 903. S-GW 431 comprises S1 interface 904, S5 interface 905, and S11 interface 906. LTE transceiver 901 exposes LTE interfaces to UEs, femtocell relays, and picocell relays. LTE transceiver 901 broadcasts LTE PLMN IDs for MACRO UE DATA, MACRO UE VOLTE, and MACRO RELAY.

For the typical UE, LTE transceiver 901 exchanges its LTE signaling and user data (M-S1-MME and M-S1U) with S1 interface 903. For femtocell and picocell relays, LTE transceiver 901 applies RoHC compression/decompression to the user data that traverses F-S5(2), F-S2a(2), P-S5(2), and P-S2a(2) PMIP GRE tunnels. LTE transceiver 901 applies general compression/decompression to the femtocell and picocell signaling (F-S1-MME(2), F-S11(2), F-PMIP (2), F-X2(2), F-Gz/Gy(2), F-S15(2), P-S1-MME(2), P-S11 (2), P-PMIP (2), P-X2(2), P-Gz/Gy(2), and P-S15(2)) exchanged over the LTE signaling tunnels. LTE transceiver 901 and S1 interface 903 exchange the femtocell and picocell signaling and user data.

S1 interface 903 exchanges macro signaling (M-S1-MME) with MME 432. S1 interface 903 exchanges user data (M-S1U) with S1 interface 904 of S-GW 431. The M-S1U interface transports the femtocell and picocell signaling and user data (F-S1-MME(2), F-S11(2), F-PMIP (2), F-X2(2), F-Gz/Gy(2), F-S15(2), P-S1-MME(2), P-S11(2), P-PMIP (2), P-X2(2), P-Gz/Gy(2), P-S15(2), F-S5(2), F-S2a(2), P-S5(2), and P-S2a(2)). S1 interface 904 exchanges the femtocell and picocell signaling and user data with S5 interface 905. S5 interface 905 exchanges user data (M-S5) with P-GW 434. The M-S5 interface transports the femtocell and picocell signaling and user data. S11 interface 906 exchanges macro signaling (M-S11) with MME 432.

Macro eNodeB 421 and S-GW 431 apply LTE QoS to the bearers as indicated by the specified QCIs. Macro eNodeB 421 and S-GW 431 exchange the LTE signaling using QCI 5. Macro eNodeB 421 and S-GW 431 exchange the F-S5/2a and P-S5/2a user data using QCI 1, QCI 5, QCI 9, or some other data QoS.

Figure 10:
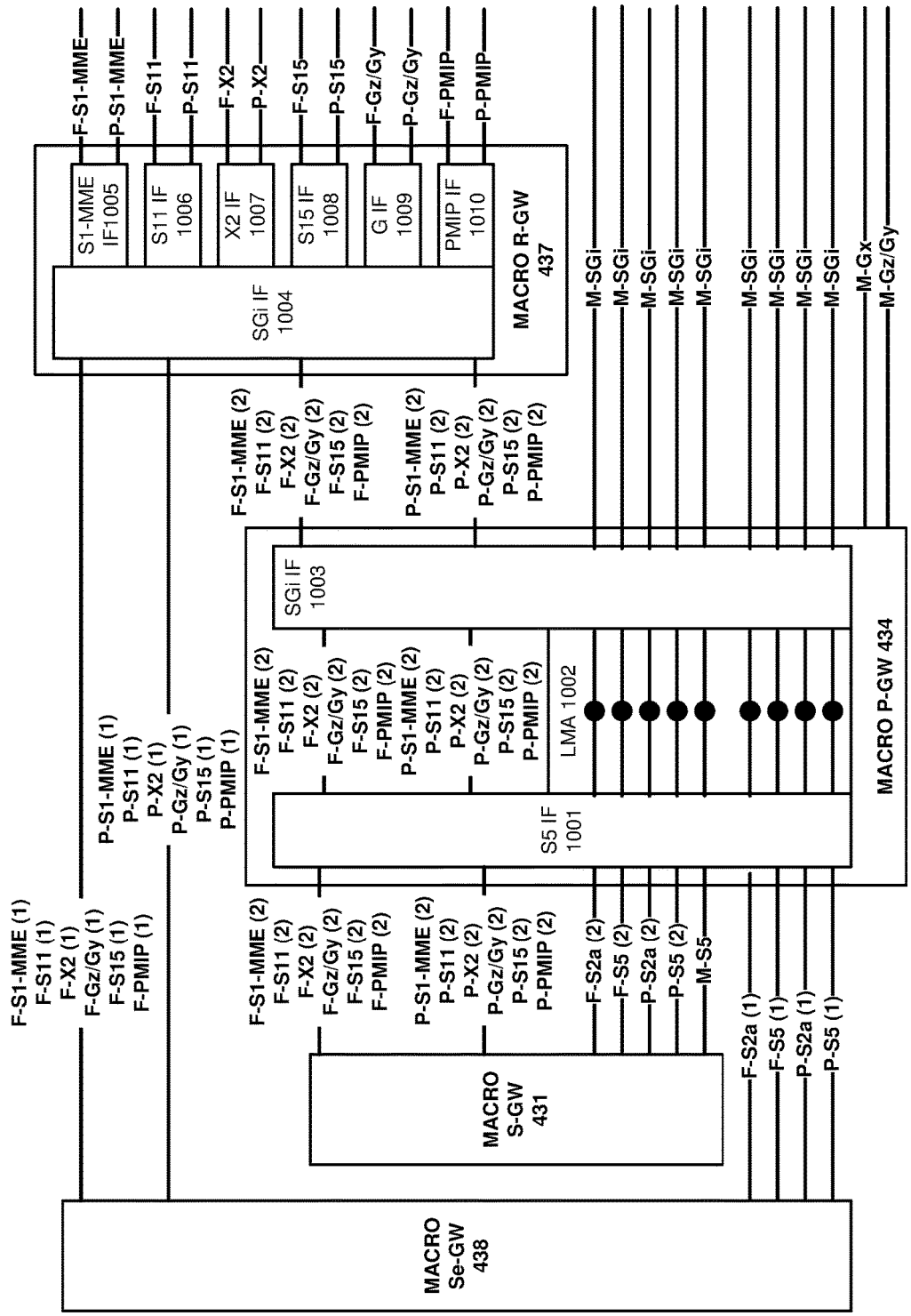

FIG. 10 illustrates macrocell P-GW 434 and R-GW 437. Macro S-GW 431 and Se-GW 438 are shown again for reference. Macrocell P-GW 434 comprises S5 interface 1001, Local Mobility Anchor (LMA) 1002, and SGi interface 1003. R-GW 437 comprises SGi interface 1004, S1-MME interface 1005, S11 interface 1006, X2 interface 1007, S15 interface 1008, G interface 1009, and PMIP interface 1010. Macrocell P-GW 434 exchanges its M-Gx data with PCRF 435 and exchanges its M-Gz/Gy data with ACCT 436.

In P-GW 434, S5 interface 1001 exchanges the user data (F-S2a(1)(2), F-S5(1)(2), P-S2a(1)(2), and P-S5(1)(2)) with LMA 1002 for PMIP GRE tunnel termination. LMA 1002 exchanges the user data with SGi interface 1003. SGi interface 1003 performs functions like routing and filtering on the user data for exchange with the Internet, IMS, or some other system over the SGi links.

In P-GW 434, S5 interface 1001 exchanges LTE signaling (F-S1-MME(2), F-S11(2), F-PMIP (2), F-X2(2), F-Gz/Gy (2), F-S15(2), P-S1-MME(2), P-S11(2), P-PMIP (2), P-X2 (2), P-Gz/Gy(2), and P-S15(2)) with SGi interface 1003. SGi interface 1003 exchanges the LTE signaling with SGi interface 1004 in R-GW 437. In R-GW 437, SGi interface 1004 also receives LTE signaling (F-S1-MME(1), F-S11(1), F-X2(1), F-Gz/Gy(1), F-S15(1), F-PMIP (1), P-S1-MME (1), P-S11(2), P-X2(1), P-Gz/Gy(1), P-S15(1), and P-PMIP (1)) from Se-GW 438. SGi interface 1004 performs functions like routing and filtering on the LTE signaling.

SGi interface 1004 exchanges the LTE signaling with proxy interfaces 1005-1010, and proxy interfaces 1005-1010 exchange the LTE signaling with various systems. Proxy interfaces 1005-1010 aggregate the LTE signaling that was exchanged over the LAN/WAN backhaul and over the LWA/LTE backhaul. S1-MME interface 1005 exchanges the F-S1-MME and P-S1-MME signaling with MME 432. S11 interface 1006 exchanges F-S11 and P-S11 signaling with MME 432. X2 interface 1007 exchanges F-X2 and P-X2 signaling with macrocell eNodeB 421. S15 interface 1008 exchanges F-S15 and P-S15 signaling with PCRF 435. G interface 1009 exchanges F-Gz/Gy and P-Gz/Gy signaling with ACCT 436. PMIP interface 1010 exchanges F-PMIP and P-PMIP signaling with P-GW 434 and other P-GWs.

Macro P-GW 434 applies LTE QoS to the bearers as indicated by the specified QCIs. Macro P-GW 434 exchanges the LTE signaling using QCI 5. P-GW 434 exchanges the user data using a QCI 1, QCI 5, QCI 9, or some other data QoS. R-GW 437 applies a QCI 5 type QoS to its signaling data.

The VoLTE P-GWs are configured in a similar manner to P-GW 434. The VoLTE P-GWs comprise S5 interfaces, LMAs, and SGi interfaces. The VoLTE P-GWs terminate the PMIP GRE tunnels to the femtocell and pico cell relays for user voice data and SIP/IMS signaling. The VoLTE P-GWs perform functions like routing and filtering on the user voice data and signaling for exchange over their SGi links. Typically, the VoLTE P-GWs do not backhaul femtocell and picocell LTE signaling. The VoLTE P-GWs apply LTE QoS to the bearers as indicated by the specified QCIs/DSCPs. The VoLTE P-GWs exchanges the IMS/SIP signaling using QCI 5. The VoLTE P-GWs exchanges the user voice data using a QCI 1.

Figure 11:
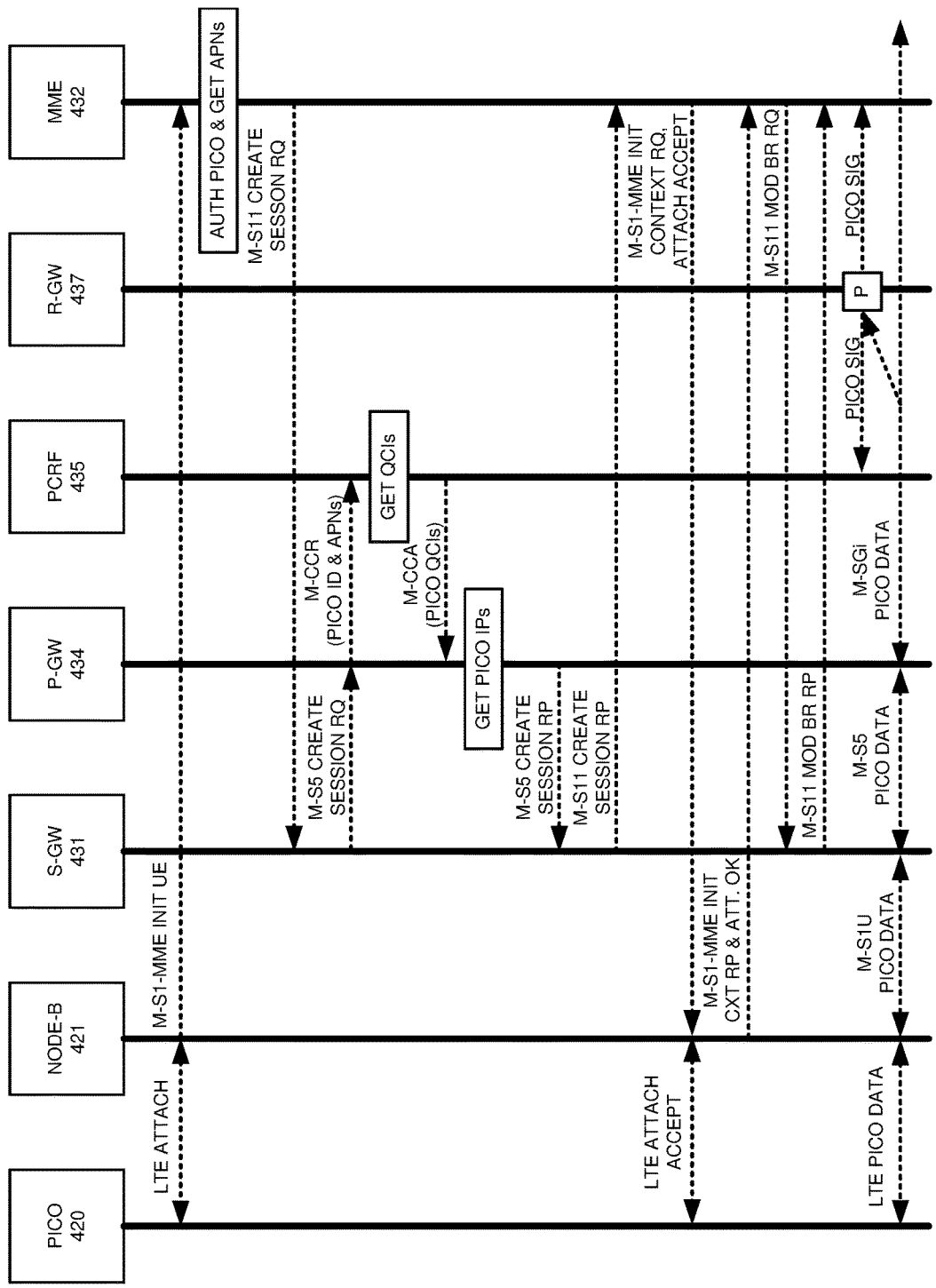

FIG. 11 illustrates picocell relay 420 attachment to macrocell eNodeB 421 to establish the picocell LTE data bearers and the picocell LTE signaling bearer. Picocell relay 420 may also attach to the LAN/WAN and Se-GW 437. These LAN/WAN/LTE attachments could be standard and are not shown for clarity. Picocell relay 420 responds to the PLMN ID of MACRO-RELAY from eNodeB 421 during an LTE attachment session. Picocell relay 420 transfers information for MME 432 to eNodeB 421 in a Non-Access Stratum (NAS) message during the attachment. In response to the LTE attachment, eNodeB 423 transfers a Macro (M) S1-MME initial UE message containing the NAS message to MME 432. MME 432 authorizes picocell relay 420 and retrieves the picocell DATA APN and the picocell signaling (SIG) APN from HSS 433.

MME 432 selects P-GW 434 and a VoLTE P-GW based on the picocell DATA APN and transfers an M-S11 create session request (RQ) having the picocell APNs to S-GW 431. Responsive to the M-S11 create session request, S-GW 431 transfers a corresponding M-S5 create session request having the picocell APNs to P-GW 434. P-GW 434 transfers a Macro (M) Credit Control Request (CCR) with the picocell ID and APNs DATA and SIG to PCRF 435. PCRF returns a Macro Credit Control Answer (M-CCA) that indicates QCI 9 for the DATA APN and QCI 5 for the SIG APN. P-GW 434 selects IP addresses for picocell relay 420 and transfers the pico IP addresses, APNs, and QCIs to S-GW 431 in an M-S5 create session response (RP). S-GW 431 transfers the pico IP addresses, APNs, and QCIs for picocell relay 420 to MME 432 in an M-S11 create session response.

In response to the M-S11 create bearer request for QCIs 9 and 5, MME 432 transfers an M-S1-MME message to eNodeB 421. The M-S1-MME message has an initial context set-up request and Attach (ATT) acceptance that indicate the pico IP addresses, APNs, and QCIs for picocell relay 420. In response to the S1-MME message, eNodeB 421 and picocell 420 perform an LTE attach acceptance session that delivers the pico IP addresses, APNs, and QCIs to picocell relay 420. In response to the LTE attach acceptance, eNodeB 421 transfers an S1-MME initial context response and attach complete (OK) message to MME 432. In response, MME 432 transfers an M-S11 modify bearer request to S-GW 431 which returns an M-S11 modify bearer response to MME 432.

Picocell relay 420 may now exchange picocell user data with P-GW 434 over the PMIP GRE tunnel that traverses the LTE/M-S1U/M-S5 interfaces of eNodeB 421 and S-GW 431. P-GW 434 exchanges the user data with external systems. Picocell relay 420 may now exchange picocell signaling with R-GW 437 over the signaling bearer that traverses the LTE/M-S1U/M-S5/M-SGi interfaces of eNodeB 421, S-GW 431, and P-GW 434. R-GW 437 exchanges this picocell signaling with eNodeB 421, MME 432, P-GW 434, PCRF 435, and ACCT 436.

Figure 14:
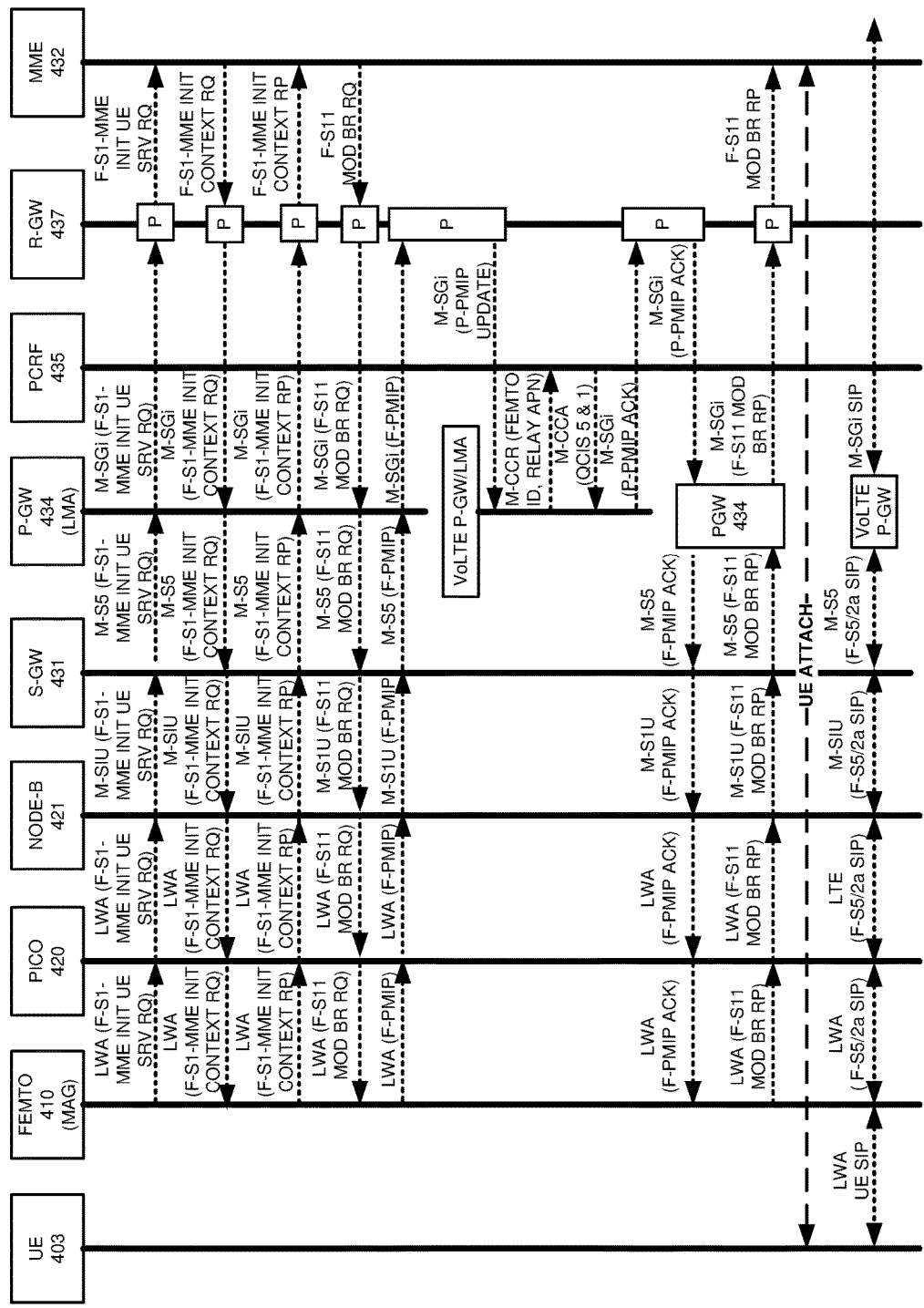

Although not shown for clarity, picocell relay 420 uses its P-S1-MME interface to initiate a VoLTE service request to MME 432 after its LTE attachment is complete. MME 432 and picocell relay 420 then interact to establish VoLTE PMIP GRE tunnels between picocell L-SGW/MAG 801 and the VoLTE P-GW/LMA over the LTE/S1U/S5 interface. Typically, picocell L-SGW/MAG 801 and the VoLTE P-GW/LMA establish another VoLTE PMIP GRE tunnel over the LAN/WAN. FIG. 14 shows this service request procedure for femtocell relay 410.

Figure 12:
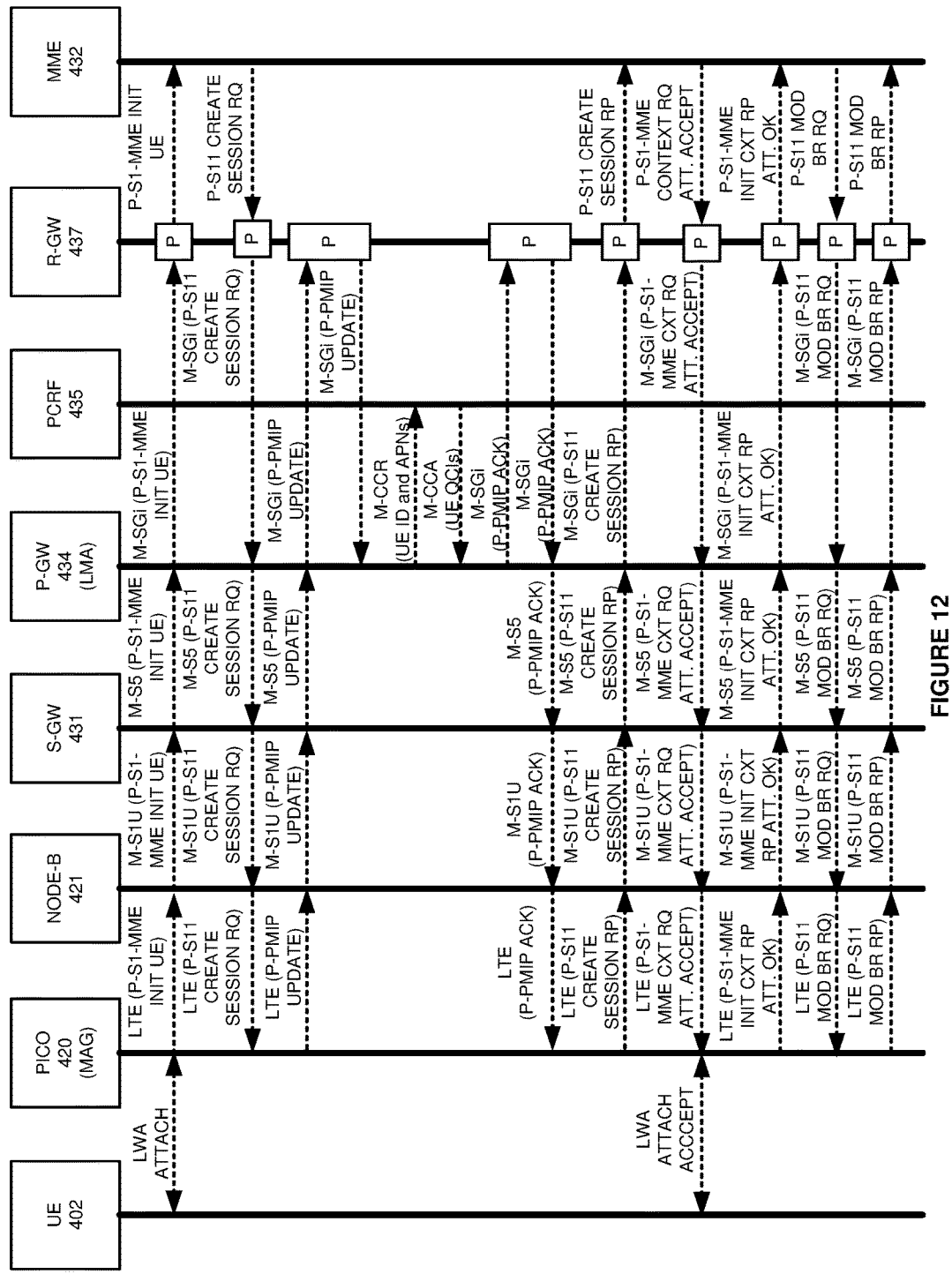

FIG. 12 illustrates UE 402 attachment to picocell 420 to use the PMIP GRE data tunnel. UE 402 responds to the SSIDs or PLMN IDs of PICO UE DATA and PICO UE VoLTE from picocell relay 420 (eNodeB 422) during an LWA attachment session. UE 402 transfers information for MME 432 in a NAS message during LWA attachment. In response to the UE attachment, picocell relay 420 selects R-GW 437 and transfers a Picocell (P) S1-MME initial UE message containing the NAS message to R-GW 437. The P-S1-MME message uses the picocell signaling bearer that traverses the LTE/S1U/S5/SGi interfaces of eNodeB 421, S-GW 431, and P-GW 434. The P-S1-MME initial UE message indicates the IP address for picocell relay 420. R-GW 437 transfers the P-S1-MME initial UE message to MME 432.

MME 432 authorizes UE 402 and retrieves UE APNs DATA and VOLTE from HSS 433 based on the UE ID and the SSID/PLMN IDs. In some examples, additional UE APNs are implemented like VIDEO. MME 432 responds to R-GW 437 with the UE APNs in a P-S 11 create session request. R-GW 437 transfers the P-S11 create session request with the UE 402 APNs to picocell relay 420 (L-SGW 801) over the picocell signaling bearer that traverses the SGi/S5/S1U/LTE interfaces of P-GW 434, S-GW 431, and eNodeB 421.

In response to the P-S11 create session message, picocell relay 420 (MAG 801) transfers a P-PMIP proxy binding update message to P-GW 434 (LMA 1002) over the picocell signaling bearer that traverses the LTE/S1U/S5/SGi interfaces of eNodeB 421, S-GW 431, P-GW 434, and R-GW 437. The P-PMIP proxy binding update indicates the IP address of picocell relay 420. In response to the P-PMIP proxy binding update, P-GW 434 (LMA 1002) selects IP addresses for UE 402 and binds UE 402 to the picocell 420 IP address. P-GW 434 sends an M-CCR with the UE ID and APNs to PCRF 435. PCRF 435 returns a CCA for UE 402 that indicates QCI 9 the DATA APN and QCIs 5 and 1 for the VOLTE APN.

P-GW 434 (LMA 1002) returns a P-PMIP proxy binding acknowledgement (ACK) to picocell relay 420 over the picocell signaling bearer that traverses the SGi/S5/S1U/LTE interfaces of R-GW 437, P-GW 434, S-GW 431, and eNodeB 421. The PMIP acknowledgement indicates the UE 402 IP addresses, APNs, and QCIs. In response to the P-PMIP acknowledgement, picocell relay 420 (L-SGW 801) transfers a P-S11 create session response to R-GW 437 over the picocell signaling bearer that traverses the LTE/S1U/S5/SGi interfaces of eNodeB 421, S-GW 431, and P-GW 434. R-GW 437 transfers the P-S11 create session response to MME 432.

In response to the P-S11 create session response for the UE QCIs, MME 432 returns a P-S1-MME message to R-GW 437. The P-S1-MME message has an initial context request and attach acceptance and indicates the IP addresses, APNs, and QCIs for UE 402. R-GW 437 transfers the P-S1-MME message to picocell relay 420 over the picocell signaling bearer that traverses the SGi/S5/S1U/LTE interfaces of P-GW 434, S-GW 431, and eNodeB 421.

In response to the P-S1-MME message, UE 402 and picocell 420 (eNodeB 422) perform an LWA attach acceptance session over LTE or WiFi that delivers the UE IP addresses, APN DATA/QCI 9, and APN VOLTE/QCI 5 & 1 to UE 402. In response to the LTE attach acceptance, picocell relay 420 (eNodeB 422) transfers a P-S1-MME initial context response and attach complete message to R-GW 437 over the picocell signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 over the picocell signaling bearer that traverses the SGi/S5/S1U/LTE interfaces of P-GW 434, S-GW 431, and eNodeB 421. In response to the P-S11 modify bearer request, picocell relay 420 (L-SGW 801) transfers a modify bearer response to R-GW 437 over the picocell signaling bearer that traverses the LTE/S1U/S5 interfaces of eNodeB 421, S-GW 431, and P-GW 434. R-GW 437 transfers the P-S11 modify bearer response to MME 432.

Although not shown for clarity, UE 402 may exchange user data with picocell relay 420 over LWA based on QCIs 1, 5, and 9. Picocell relay 420 may exchange the user data with P-GW 434 over the PMIP GRE tunnel that traverses the LTE/S1U/S5 interfaces of eNodeB 421 and S-GW 431 based on QCI 9. Picocell relay 420 may exchange IMS signaling with the VoLTE P-GW (and IMS) over the VoLTE PMIP GRE tunnel that traverses the LTE/S1U/S5 interfaces of eNodeB 421 and S-GW 431 based on QCI 5. Picocell relay 420 may exchange voice data with the VoLTE P-GW over the VoLTE PMIP GRE tunnel that traverses the LTE/S1U/S5 interfaces of eNodeB 421 and S-GW 431 based on QCI 1.

Figure 13:
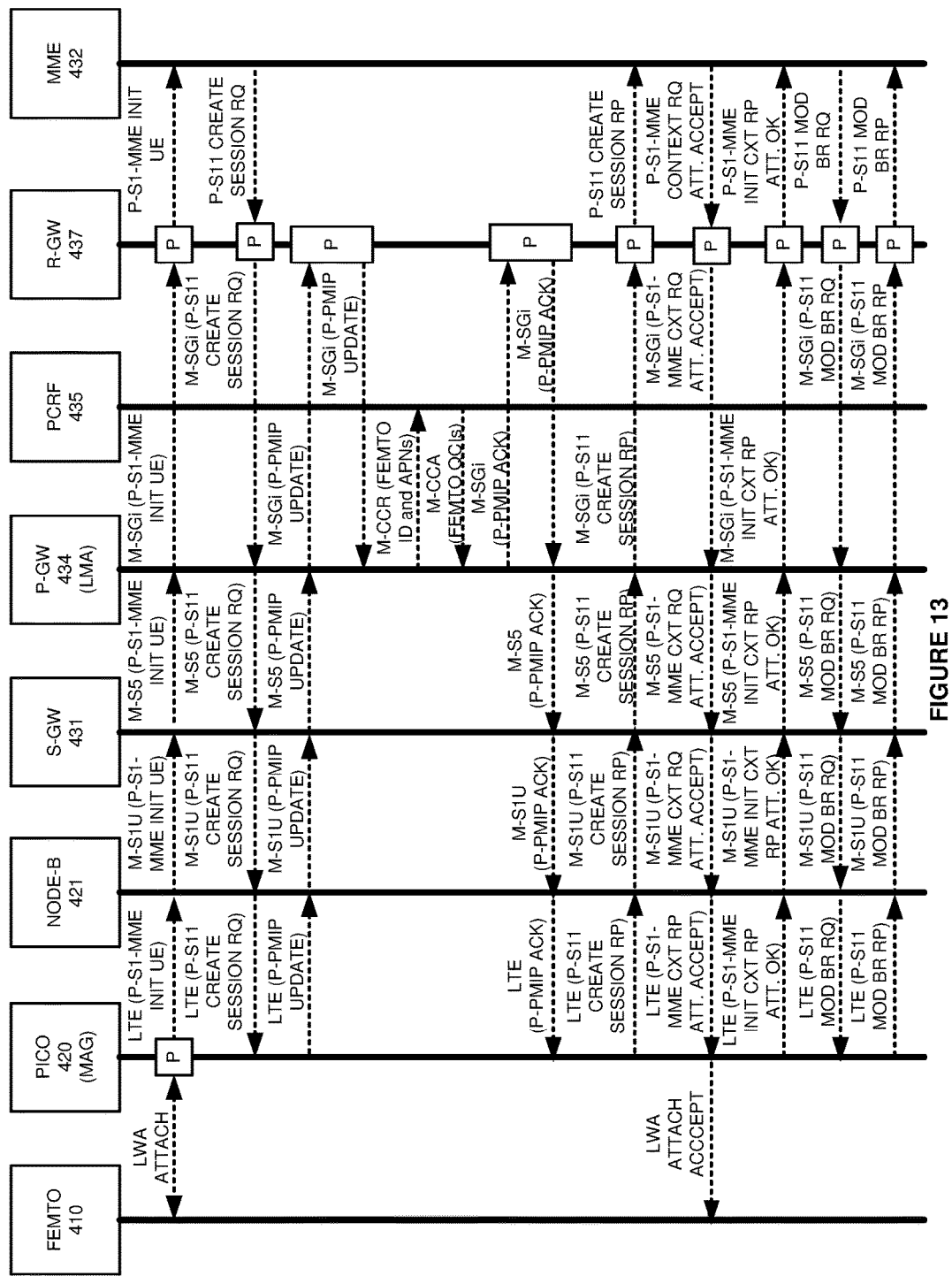

FIG. 13 illustrates femtocell relay 410 attachment to picocell relay 420 to establish the femtocell user data bearer and the femtocell signaling bearer. Femtocell relay 420 also attaches to the LAN/WAN and Se-GW 437. These LAN/WAN/LTE attachments could be standard and are not shown for clarity. Femtocell relay 410 responds to the SSID or PLMN ID of PICO-RELAY from picocell 420 (eNodeB 422) during an LWA attachment session using LTE or WiFi. Femtocell 410 transfers information for MME 432 in a NAS message during LWA attachment. In response to the femtocell attachment, picocell relay 420 transfers a P-S1-MME initial UE message containing the NAS message to R-GW 437. The P-S1-MME message uses the femtocell signaling bearer traverses the LTE/S1U/S5/SGi interfaces of eNodeB 421, S-GW 431, and P-GW 434. R-GW 437 transfers the P-S1-MME initial UE message to MME 432.

MME 432 authorizes femtocell relay 410 and retrieves the femtocell APNs DATA and SIG from HSS 433. MME 432 selects P-GW 434 and a VoLTE P-GW based on the femtocell DATA APN. MME 432 responds to R-GW 437 with the femtocell APNs in a P-S11 create session request. R-GW 437 transfers the P-S11 create session request with the femtocell APNs to picocell relay 420 (L-SGW 801) over the picocell signaling bearer that traverses the SGi/S5/S1U/LTE interfaces of P-GW 434, S-GW 431, and eNodeB 421. In response to the P-S11 create session request, picocell relay 420 (MAG 801) transfers a P-PMIP proxy binding update message to P-GW 434 (LMA 1002) over the picocell signaling bearer that traverses the LTE/S1U/S5/SGi interfaces through eNodeB 421, S-GW 431, P-GW 434, and R-GW 437. The P-PMIP proxy binding update indicates the IP address for picocell relay 420.

In response to the P-PMIP proxy binding update, P-GW 434 (LMA 1002) selects IP addresses for femtocell relay 410 and binds femtocell relay 410 to the IP address for picocell relay 420. P-GW 434 sends an M-CCR to PCRF 435 for the femtocell DATA and SIG APNs. PCRF 435 returns an M-CCA for femtocell relay 410 that typically indicates QCI 9 for the femtocell data APN and QCI 5 for the femtocell signaling APN.

P-GW 434 (LMA 1002) returns a P-PMIP proxy binding acknowledgement to picocell relay 420 over the picocell signaling bearer that traverses the SGi/S5/S1U/LTE interfaces of R-GW 437, P-GW 434, S-GW 431, and eNodeB 421. The PMIP acknowledgement indicates the femtocell relay IP addresses, APNs, and QCIs. In response to the P-PMIP acknowledgement, picocell relay 420 (L-SGW 801) transfers a P-S11 create session response to R-GW 437 over the picocell signaling bearer that traverses the LTE/S1U/S5/SGi interfaces of eNodeB 421, S-GW 431, and P-GW 434. R-GW 437 transfers the P-S11 create session response to MME 432.

In response to the P-S11 create bearer request for QCIs 5 and 9, MME 432 returns a P-S1-MME message to R-GW 437. The P-S1-MME message has an initial context request and attach acceptance that indicate the IP addresses, APNs, and QCIs for femtocell relay 410. R-GW 437 transfers the P-S1-MME message to picocell relay 420 over the picocell signaling bearer that traverses the SGi/S5/S1U/LTE interfaces of P-GW 434, S-GW 431, and eNodeB 421.

In response to the P-S1-MME message, femtocell relay 410 (UE 404) and picocell relay 420 (eNodeB 422) perform an LWA attach acceptance session over LTE or WiFi that delivers the IP addresses, APNs, and QCIs for femtocell relay 410 to femtocell relay 410. In response to the LWA attach acceptance, picocell relay 420 (eNodeB 422) transfers a P-S1-MME initial context response and attach complete (OK) message to R-GW 437 over the picocell signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 over the picocell signaling bearer that traverses the SGi/S5/S1U/LTE interfaces of P-GW 434, S-GW 431, and eNodeB 421. In response to the P-S11 modify bearer request, picocell relay 420 (L-SGW 801) transfers a modify bearer response to R-GW 437 over the picocell signaling bearer that traverses the LTE/S1U/S5/SGi interfaces of eNodeB 421, S-GW 431, and P-GW 434. R-GW 437 transfers the P-S11 modify bearer response to MME 432.

Although not shown for clarity, femtocell relay 410 may exchange user data with P-GW 434 over the PMIP GRE data bearer that traverses the LWA/LTE/S1U/S5 interfaces of picocell relay 420, eNodeB 421, and S-GW 431. Femtocell relay 410 may also exchange femtocell signaling with R-GW 437 over the femtocell signaling bearer that traverses the LWA/LTE/S1U/S5/SGi interfaces of picocell relay 420, eNodeB 421, S-GW 431, and P-GW 434. As shown below, femtocell relay 420 will send a F-S1-MME service request to establish a VoLTE PMIP GRE bearer to the selected VoLTE P-GW after the modify bearer messaging is complete.

FIG. 14 illustrates VoLTE service provisioning for femtocell relay 420. After LTE attachment, femtocell relay 420 (eNodeB 423), transfers an F-S1-MME initial UE service request containing a NAS message with a VoLTE request to R-GW 437. The F-S1-MME initial UE service request uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE service request for VoLTE to MME 432.

In response to the F-S1-MME initial UE service request for VoLTE, MME 432 selects a VoLTE P-GW/LMA for femtocell relay 410 to provide VoLTE QoS to attaching UEs. In response to the VoLTE service request, MME 432 also returns an F-S1-MME initial context request to R-GW 437. R-GW 437 transfers the F-S1-MME initial context request to femtocell relay 410 (eNodeB 423) over the femtocell signaling bearer that traverses the SGi/S5/S1U/LTE/LWA interfaces of P-GW 434, S-GW 431, eNodeB 421, and picocell relay 420.

In response to the F-S1-MME initial context request, femtocell relay 410 (eNodeB 423) returns an F-S1-MME initial context response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial context response to MME 432. In response to the F-S1-MME initial context response, MME 432 transfers an F-S11 modify bearer request indicating the VoLTE P-GW to R-GW 437. R-GW 437 transfers the F-S11 modify bearer request to femtocell relay 410 (L-SGW 701) over the femtocell signaling bearer that traverses the SGi/S5/S1U/LTE/LWA interfaces of P-GW 434, S-GW 431, eNodeB 421, and picocell relay 420.

In response to the F-S11 modify bearer request identifying the VoLTE P-GW, femtocell relay 410 (L-SGW 701) transfers an F-PMIP proxy binding update over the femtocell signaling bearer to the identified VoLTE P-GW/LMA. The F-PMIP proxy binding update traverses the LWA/LTE/S1U/S5/SGi interfaces of picocell relay 420, eNodeB 421, S-GW 431, P-GW 434, and R-GW 437. The F-PMIP proxy binding update indicates the IP address of femtocell relay 410 and APN DATA. In response to the F-PMIP update message, the VoLTE P-GW/LMA sends an M-CCR to PCRF 435 with the femto APN DATA and obtains an M-CCA for femtocell relay 410. The M-CCA is for one or more QCI 5 signaling bearers and QCI 1 voice bearers over the VoLTE PMIP GRE tunnel between femtocell relay 410 and the VoLTE P-GW/LMA.

The VoLTE P-GW/LMA returns an F-PMIP acknowledgement to femtocell relay 410 over the femtocell signaling bearer that traverses the SGi/S5/S1U/LTE/LWA interfaces of R-GW 437, P-GW 434, S-GW 431, eNodeB 421, and picocell relay 420. In response to the F-PMIP acknowledgement, femtocell relay 410 (L-SGW 701) transfers an F-S11 modify bearer response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S11 modify bearer response to MME 432.

After UE 403 performs LWA attachment (FIG. 15), UE 403 may then exchange Session Initiation Protocol (SIP) signaling with femtocell relay 410 over LWA using LTE or WiFi by using its VoLTE APN and QCI 5 signaling bearer. Femtocell relay 410 and the VoLTE P-GW exchange the SIP signaling over the VoLTE PMIP GRE tunnel based on QCI 5. The VoLTE P-GW/LMA typically exchanges the SIP signaling with an IMS (not shown) over an M-SGi link. If an IMS session is established (FIG. 17), then UE 403 may exchange voice data with femtocell relay 410 over LWA using LTE or WiFi by using its VoLTE APN and QCI 1 voice bearer. Femtocell relay 410 and the VoLTE P-GW exchange the voice data signaling over the VoLTE PMIP GRE tunnel based on QCI 1. The VoLTE P-GW/LMA typically exchanges the voice data with a data network over an M-SGi link.

Figure 15:
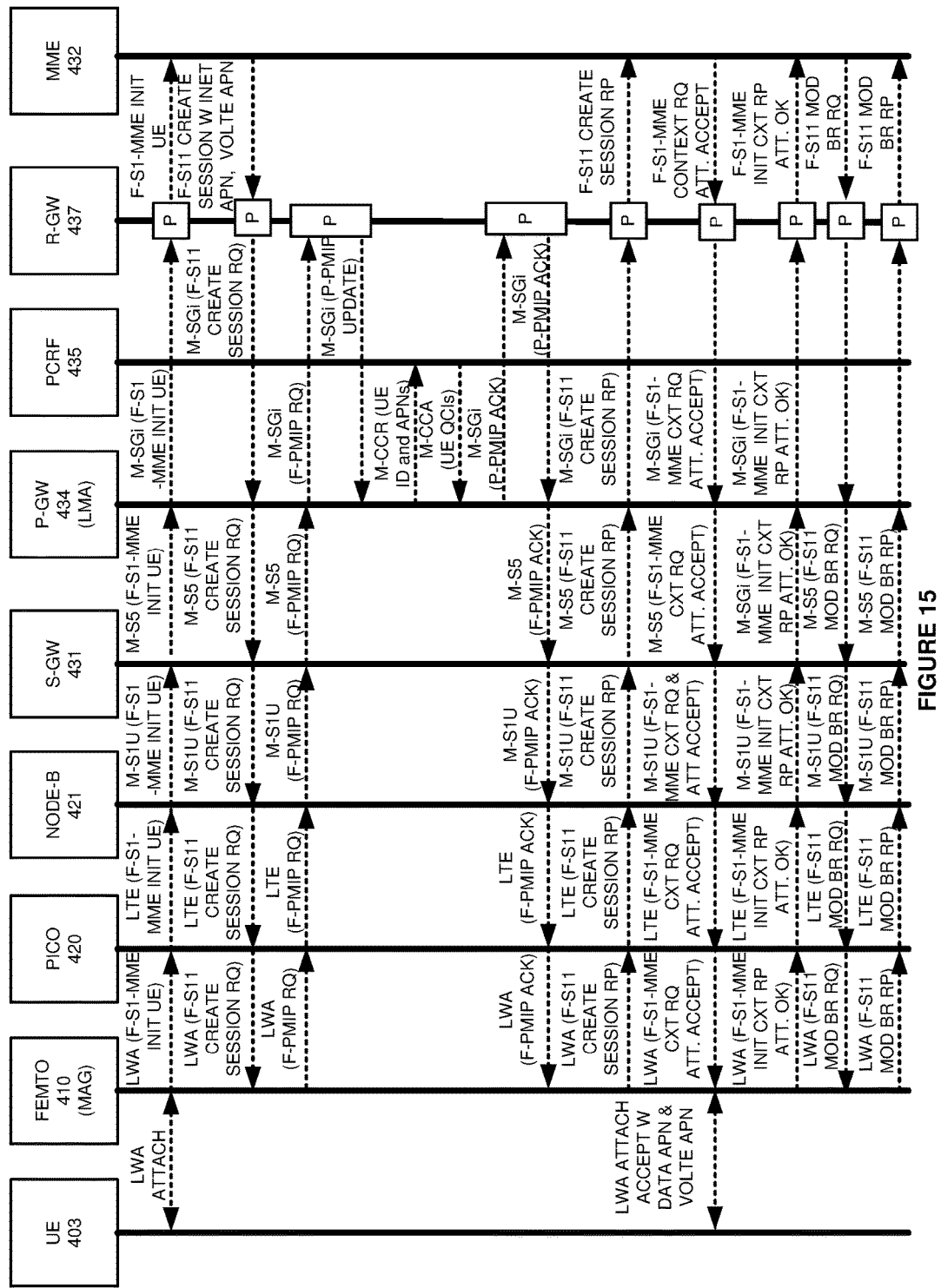

FIG. 15 illustrates UE 403 attachment to femtocell 420 to use the femtocell PMIP GRE data bearer. UE 403 responds to the SSIDs or PLMN IDs of FEMTO UE DATA and FEMTO UE VOLTE from femtocell relay 410 (eNodeB 423) during an LWA attachment session. UE 403 transfers information for MME 432 in a NAS message during LWA attachment. In response to UE 403 attachment, femtocell relay 410 transfers a Femto (F) S1-MME initial UE message containing the NAS message to R-GW 437. The F-S1-MME message uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE message to MME 432.

MME 432 authorizes UE 403 and retrieves UE APNs for DATA and VOLTE from HSS 433. MME 432 selects P-GW 434 for the DATA APN and a VoLTE P-GW for the VoLTE APN. MME 432 responds to R-GW 437 with the UE APNs and P-GW IDs in an F-S11 create session request. R-GW 437 transfers the F-S11 create session request with the UE APNs and P-GW IDs to femtocell relay 410 (L-SGW 701) over the femtocell signaling bearer that traverses the SGi/S5/S1U/LTE/LWA interfaces of P-GW 434, S-GW 431, eNodeB 421, and picocell relay 420.

In response to the P-S11 create session request, femtocell relay 410 (MAG 701) transfers an F-PMIP proxy binding update message to P-GW 434 (LMA 1002) over the femtocell signaling bearer that traverses the LWA/LTE/S1U/S5/SGi interfaces of picocell relay 420, eNodeB 421, S-GW 431, P-GW 434, and R-GW 437. The F-PMIP update indicates the IP address for femtocell relay 410 and the APN DATA for UE 403. In response to the F-PMIP proxy binding update message, P-GW 434 (LMA 1002) selects IP addresses for UE 403 and binds UE 403 to the IP address for femtocell relay 410. P-GW 434 sends an M-CCR to PCRF 435 having the UE 403 APNs. PCRF 435 returns an M-CCA for UE 403 that indicates QCI 9 for DATA and QCIs 5 and 1 for VOLTE.

P-GW 434 (LMA 1002) returns an F-PMIP acknowledgement to femtocell relay 410 over the femtocell signaling bearer that traverses the SGi/S5/S1U/LTE/LWA interfaces of R-GW 437, P-GW 434, S-GW 431, eNodeB, and pico-cell relay 420. The F-PMIP acknowledgement indicates the UE 403 IP addresses and QCIs, and in response to the F-PMIP acknowledgement, femtocell relay 410 (L-SGW 701) transfers an F-S11 create session response for the UE QCIs to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S11 create session response to MME 432.

In response to the F-S11 create session response with the UE QCIs, MME 432 returns an F-S1-MME message to R-GW 437. The F-S1-MME message has an initial context request and attach acceptance and indicates the IP addresses, APNs, QCIs, and P-GWs for UE 403. R-GW 437 transfers the F-S1-MME message to femtocell relay 410 over the femtocell signaling bearer that traverses the SGi/S5/S1U/LTE/LWA interfaces of P-GW 434, S-GW 431, eNodeB 421, and picocell relay 420.

In response to the F-S1-MME message, UE 403 and femtocell relay 420 (eNodeB 423) perform an LWA attach acceptance session over LTE or WiFi that delivers the UE IP addresses, P-GW IDs, APNs DATA and VOLTE, and QCIs 9, 5, and 1 to UE 403. In response to the LWA attach acceptance, femtocell relay 420 (eNodeB 423) transfers an F-S1-MME initial context response and attach complete message to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial context response and attach complete to MME 432.

In response to the F-S1-MME initial context response and attach complete, MME 432 transfers an F-S11 modify bearer request to R-GW 437. R-GW 437 transfers the F-S11 modify bearer request to femtocell relay 420 over the femtocell signaling bearer that traverses the SGi/S5/S1U/LTE/LWA interfaces of P-GW 434, S-GW 431, eNodeB 421, and picocell relay 420. In response to the F-S11 modify bearer request, femtocell relay 420 (L-SGW 701) transfers a modify bearer response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S11 modify bearer response to MME 432.

Although not shown for clarity, UE 403 may then exchange user data with femtocell relay 410 over LWA based on the DATA (QCI 9) and VoLTE APNs (QCI 5 and 1). Femtocell relay 410 may exchange user data with P-GW 434 over the PMIP GRE user data tunnel that traverses the LWA/LTE/S1U/S5 interfaces of picocell 420, eNodeB 421, and S-GW 431. Femtocell relay 410 may also exchange femtocell signaling for UE 403 with R-GW 437 over the signaling bearer that traverses the LWA/LTE/S1U/S5/SGi interfaces of picocell relay 420, eNodeB 421, S-GW 431, and P-GW 434.

Figure 16:
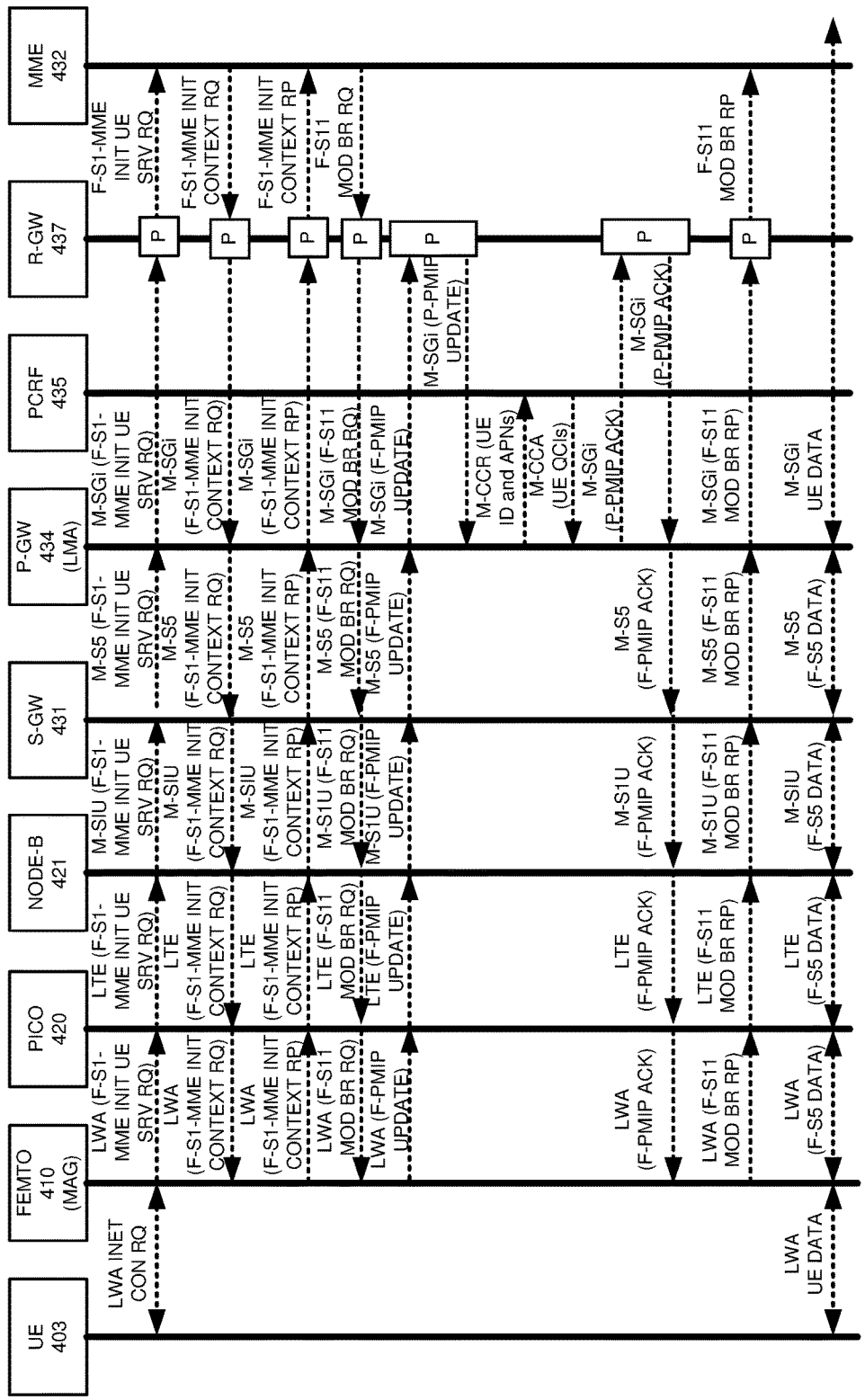

FIG. 16 illustrates UE 403 Internet service from femtocell relay 420. UE 403 transfers an LWA internet connection request to femtocell relay 410 (eNodeB 423). In response to the LWA internet connection request, femtocell relay 410 transfers an F-S1-MME initial UE service request containing a NAS message with the internet connection request to R-GW 437. The F-S1-MME message uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE service request to MME 432.

In response to the F-S1-MME initial UE service request for internet, MME 432 returns an F-S1-MME initial context request to R-GW 437. R-GW 437 transfers the F-S1-MME initial context request to femtocell relay 410 (eNodeB 423) over the femtocell signaling bearer that traverses the SGi/S5/S1U/lte/LWA interfaces of P-GW 434, S-GW 431, eNodeB 421, and picocell relay 420. In response to the F-S1-MME initial context request, femtocell relay 410 (eNodeB 423) returns an F-S1-MME initial context response to R-GW 437 over the femtocell signaling bearer that traverses the LWA/LTE/S1U/S5/M-SGi interfaces of picocell relay 420, eNodeB 421, S-GW 431, and P-GW 434. R-GW 437 transfers the F-S1-MME initial context response to MME 432.

In response to the F-S1-MME initial context response, MME 432 transfers an F-S11 modify bearer request to R-GW 437. R-GW 437 transfers the F-S11 modify bearer request to femtocell relay 410 (L-SGW 701) over the femtocell signaling bearer that traverses the SGi/S5/S1U/LTE/LWA interfaces of P-GW 434, S-GW 431, eNodeB 421, and picocell relay 420. In response to the F-S11 modify bearer request, femtocell relay 410 (L-SGW 701) transfers an F-PMIP proxy binding update over the femtocell signaling bearer that traverses the LWA/LTE/S1U/S5/SGi interfaces of picocell relay 420, eNodeB 421, S-GW 431, P-GW 434, and R-GW 437. The F-PMIP proxy binding update indicates the IP address for femtocell relay 410 and the UE APN DATA and the service request metrics. In response to the F-PMIP proxy binding update message, P-GW 434 (LMA 1002) selects IP addresses for UE 403 and binds UE 403 to the IP address for femtocell relay 410. P-GW 434 also sends an M-CCR with the APN DATA and the service request metrics for UE 403 to PCRF 435. PCRF returns an M-CCA for UE 403 that typically indicates QCI 9 for UE data, although the QCI may be upgraded based on the service request metrics or some other factor.

P-GW 434 (LMA 1002) returns an F-PMIP acknowledgement to femtocell relay 410 over the femtocell signaling bearer that traverses the SGi/S5/S1U/LTE/LWA interfaces of R-GW 437, P-GW 434, S-GW 431, eNodeB 421, and pico-cell relay 420. The F-PMIP acknowledgement indicates the UE 403 IP addresses and QCIs. In response to the F-PMIP acknowledgement, femtocell relay 410 (L-SGW 701) transfers an F-S11 modify bearer response to R-GW 437 over the femtocell signaling bearer that traverses the LTE/S1U/S5/SGi interfaces of picocell relay 420, eNodeB 421, S-GW 431, and P-GW 434. R-GW 437 transfers the F-S11 modify bearer response to MME 432.

UE 403 may then exchange user data with femtocell relay 410 over LWA based on the DATA APN and the specified QCI. Femtocell relay 110 exchanges the user data over the PMIP GRE tunnel with P-GW/MAG 434 based on QCI 9 or some other QCI as specified by PCRF 435.

Figure 17:
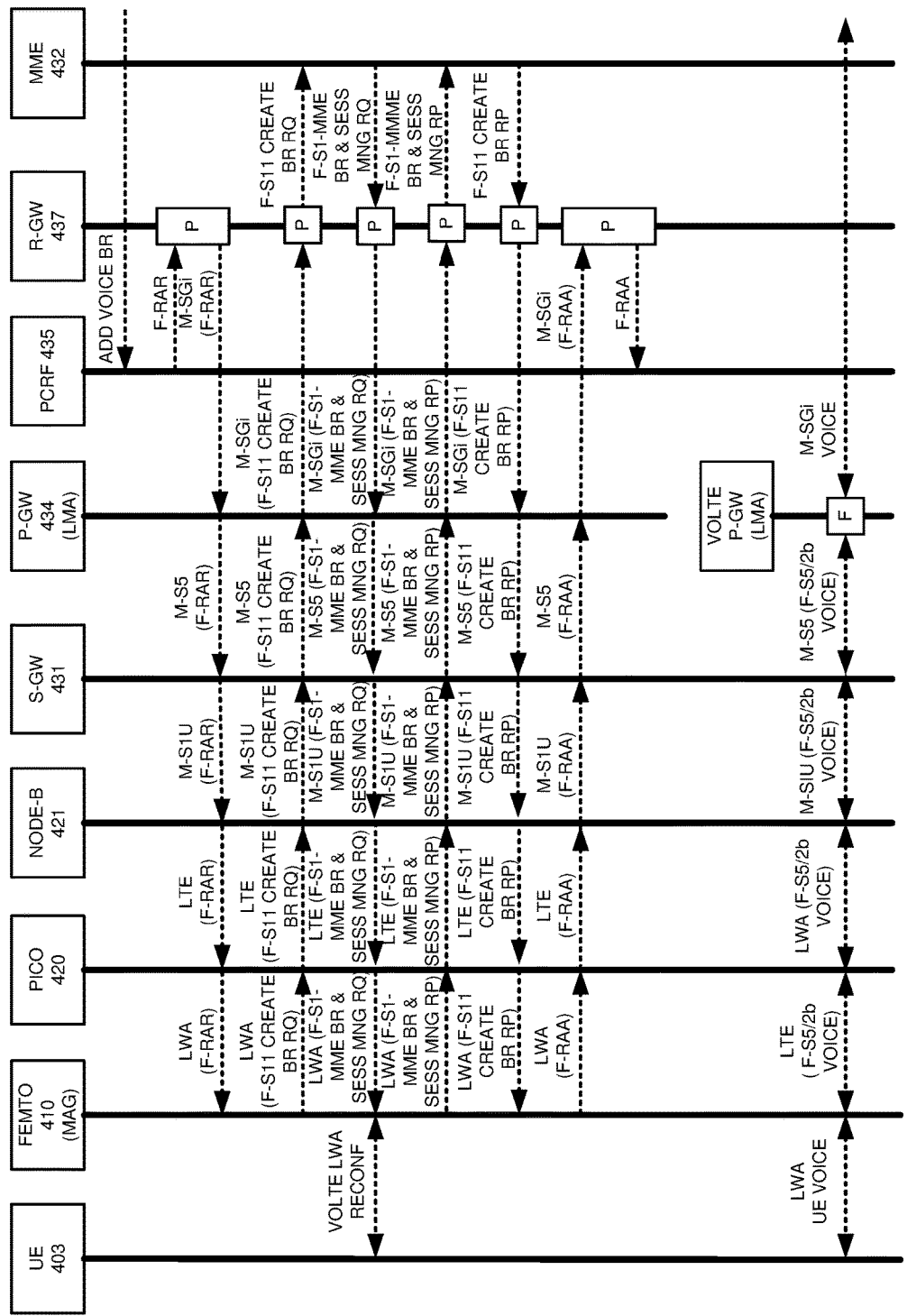

FIG. 17 illustrates UE 403 VoLTE service from femtocell relay 420. After LTE attachment, IMS registration, and SIP messaging by UE 403 (not shown), macro PCRF 435 receives an add VoLTE bearer request from IMS. In response to the VoLTE bearer request, macro PCRF 435 transfers a Femtocell Re-Authorization Request (F-RAR) for a VoLTE to R-GW 434. R-GW 434 transfers the F-RAR to femtocell relay 410 (L-PCRF 703) over the SGi/S5/S1U/LTE/LWA interfaces of P-GW 434, S-GW 431, eNodeB 421, and picocell relay 420.

In response to the F-RAR for VoLTE in femtocell relay 420, L-PCRF 703 transfers a gateway control request to L-SGW 701. In femtocell relay 420, L-SGW 701 responsively transfers an F-S11 create bearer request for VoLTE to MME 432. The F-S11 create bearer request traverses the LWA/LTE/S1U/S5/SGi interfaces of picocell relay 420, eNodeB 421, S-GW 431, and P-GW 434. R-GW 437 transfers the F-S11 create bearer request to MME 432.

In response to the M-S11 create bearer request for VoLTE, MME 432 transfers an F-S1-MME create bearer/session management request for VoLTE to R-GW 437 for eNodeB423. R-GW 437 transfers the F-S1-MME create bearer/session management request to femtocell relay 410 (eNodeB 423) over the femtocell signaling bearer that traverses the SGi/S5/S1U/LTE/LWA interfaces of P-GW 434, S-GW 431, eNodeB 421, and picocell relay 420. In response to the F-S1-MME create bearer/session management request for VoLTE, femtocell relay 410 (eNodeB 423) sends a VoLTE LWA reconfiguration request to UE 403 and UE 403 reconfigures itself for a QCI 1 voice bearer on the LWA access link.

After VoLTE LWA reconfiguration, femtocell relay 410 (eNodeB 423) returns an F-S1-MME create bearer/session management response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S1-MME create bearer/session management response to MME 432. In response to the F-S1-MME create bearer/session management response for VoLTE, MME 432 transfers an F-S11 create bearer response for VoLTE to R-GW 437. R-GW 437 transfers the F-S11 create bearer response to femtocell relay 410 (L-SGW 701) over the femtocell signaling bearer that traverses the SGi/S5/S1U/LTE/LWA interfaces of P-GW 434, S-GW 431, eNodeB 421, and picocell relay 420.

In response to the F-S11 modify bearer request for VoLTE in femtocell relay 410, L-SGW 701 transfers a gateway control response for VoLTE to L-PCRF 703. In femtocell relay 410, L-PCRF 703 responsively sends an F-RAA for VoLTE to PCRF 435 over the femtocell signaling bearer that traverses the LWA/LTE/S1U/S5/SGi interfaces of picocell relay 420, eNodeB 421, S-GW 431, P-GW 434, and R-GW 437.

UE 403 may now exchange user voice data with femtocell relay 410 over LWA using LTE or WiFi based on the VoLTE APN and QCI 1. Femtocell relay 410 and the VoLTE P-GW exchange the user voice over the VoLTE PMIP GRE tunnel based on QCI 1. In femtocell relay 410, L-SGW 701 maps the QCI 1 voice data on the LWA access link into a DSCP flow in the PMIP GRE tunnel that has a QCI 1-level QoS. The VoLTE P-GW/LMA exchanges the user voice data with external systems over its SGi interface. Other IMS services like video and audio data conferencing could be implemented in a similar manner.

Figure 18:
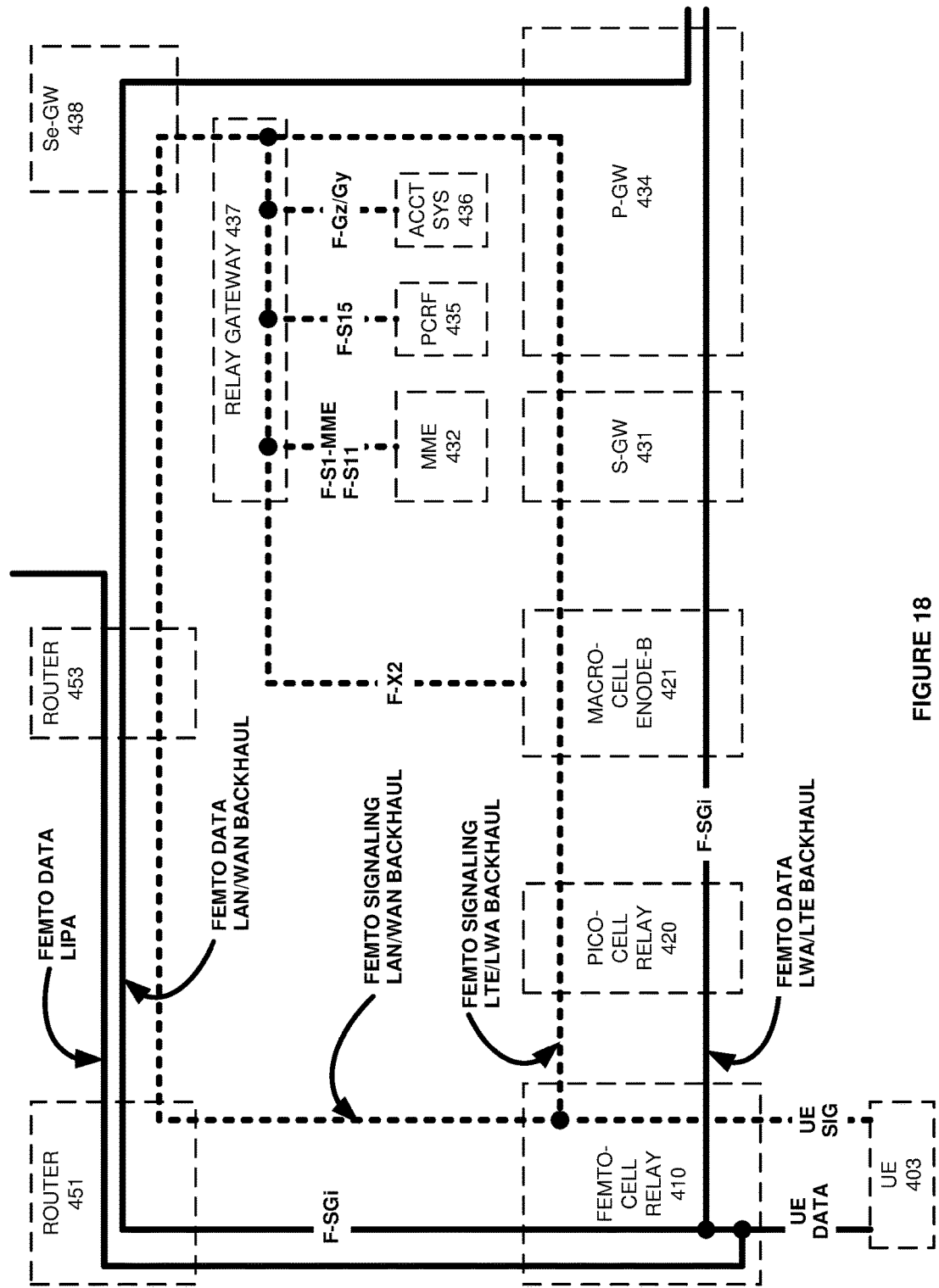
FIGS. 18-28 illustrate a variant of the LTE data communication system that uses SGi tunnels between Local Packet Data Network Gateways (L-PGWs) in the relays and macro P-GWs.

FIGS. 18-28 illustrate a variant of LTE data communication system 400 that uses SGi tunnels between L-PGWs in relays 410 and 420 and macro P-GW 434. Referring to FIG. 18, UE 403 has a UE data bearer and a UE signaling bearer with femtocell relay 410. The L-SGW in femtocell relay 410 may exchange some of the UE data with the Internet over routers 451 and 453 in a LIPA data service. The L-SGW in femtocell relay 410 may exchange some of the UE data with P-GW 434 over an SGi tunnel through picocell relay 420, eNodeB 421, and S-GW 431. The L-SGW in femtocell relay 410 may also exchange some of the UE data with P-GW 434 over an SGi tunnel through router 451, router 453, and Se-GW 438.

Femtocell relay 410 terminates the UE signaling and transfers Non-Access Stratum (NAS) messages between UE 403 and MME 432 in its own LTE Femtocell (F) signaling. Femtocell relay 410 may exchange its F-signaling with R-GW 437 in a signaling tunnel through picocell relay 420, eNodeB 421, S-GW 431, and P-GW 434. Femtocell relay 410 may also exchange its F-signaling with R-GW 437 in a signaling tunnel through router 451, router 453, and Se-GW 438. R-GW 437 exchanges the femtocell LTE signaling with eNodeB 421 (F-X2), MME 432 (F-S1-MME and F-S11), PCRF 435 (F-S15), and ACCT 436 (F-Gz/Gy).

Femtocell relay 410 has associated LTE Access Point Names (APNs) to establish its user data and signaling bearers. A femto APN DATA supports the F-SGi user data bearer between the femtocell relay 410 and P-GW 434 through picocell relay 420, eNodeB 421, and S-GW 431. A femto APN SIG supports the signaling tunnel (F-X2, F-S1-MME, F-S11, F-S15, and F-Gz/Gy) between femtocell relay 410 and R-GW 437 through picocell relay 420, eNodeB 421, S-GW 431, and P-GW 434. R-GW 437 supports the femto SIG APN by exchanging LTE signaling with eNodeB 421 (F-X2), MME 432 (F-S1-MME and F-S11), PCRF 435 (F-S15), and ACCT 436 (F-Gz/Gy).

Figure 19:
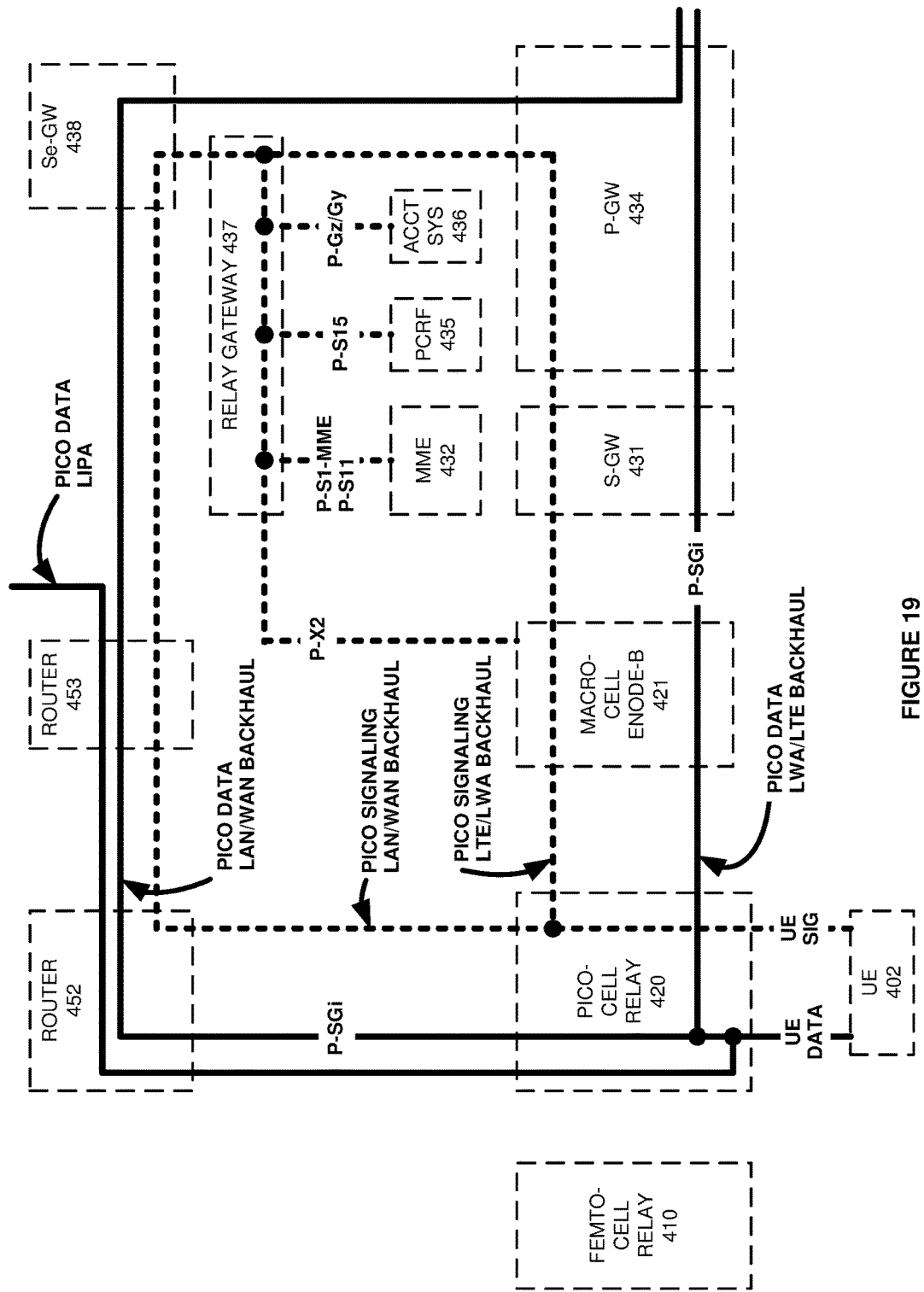

Referring to FIG. 19, UE 402 has a UE data bearer and a UE signaling bearer with picocell relay 420. The L-SGW in picocell relay 420 may exchange some of the UE data with the Internet over routers 452-453 in a LIPA data service. The L-SGW in picocell relay 420 may exchange some of the UE data with P-GW 434 over an SGi tunnel through eNodeB 421 and S-GW 431. The L-SGW in picocell relay 420 may also exchange some of the UE data with P-GW 434 over an SGi tunnel through routers 452-453 and Se-GW 438.

Picocell relay 420 terminates the UE signaling and transfers NAS messages between UE 402 and MME 432 in its own LTE Picocell (P) signaling. Picocell relay 420 may exchange its P-signaling with R-GW 437 in a signaling tunnel through eNodeB 421, S-GW 431, and P-GW 434. Picocell relay 420 may also exchange its P-signaling with R-GW 437 in a signaling tunnel through routers 452-453 and Se-GW 438. R-GW 437 exchanges the picocell LTE signaling with eNodeB 421 (P-X2), MME 432 (P-S1-MME and P-S11), PCRF 435 (P-S15), and ACCT 436 (F-Gz/Gy).

Picocell relay 420 has associated LTE APNs to establish its user data and signaling bearers. A pico APN DATA supports the F-SGi user data tunnel between the L-SGW picocell relay 420 and P-GW 434 through eNodeB 421 and S-GW 431. A pico APN SIG supports the signaling tunnel (P-X2, P-S1-MME, P-S11, P-S15, and P-Gz/Gy) between picocell relay 420 and R-GW 437 through eNodeB 421, S-GW 431, and P-GW 434. R-GW 437 supports the pico SIG APN by exchanging picocell LTE signaling with eNodeB 421 (P-X2), MME 432 (P-S1-MME, P-S11), PCRF 435 (P-S15), and ACCT 436 (F-Gz/Gy).

Figure 20:
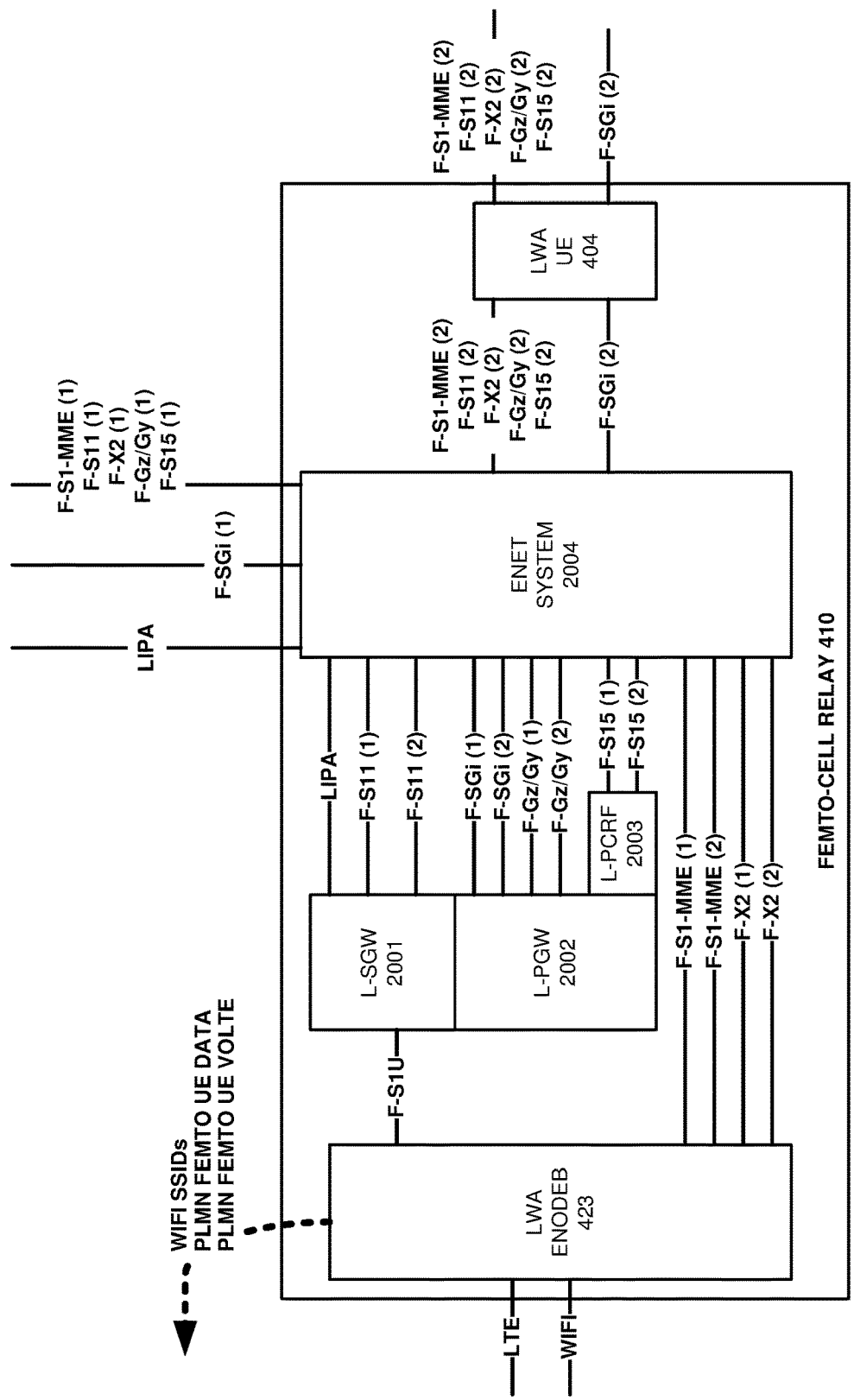

FIG. 20 illustrates femtocell relay 410. Femtocell relay 410 comprises LWA eNodeB 423, L-SGW 2001, Local Packet Data Network Gateway (L-PGW) 2002, Local Policy and Charging Rules Function (L-PCRF) 2003, Ethernet system 2004, and LWA UE 404. LWA eNodeB 423 exposes LTE and WiFi interfaces to UEs and broadcasts WiFi SSIDs and LTE PLMN IDs for FEMTO UE DATA and FEMTO UE VOLTE. LWA eNodeB 423 applies RoHC compression/decompression to the user data exchanged with UEs over the LTE and WiFi links. LWA eNodeB 423 applies general compression/decompression to the LTE signaling exchanged with the UEs over the WiFi and LTE links. LWA UE 404 applies RoHC compression/decompression to the F-SGi user data exchanged over the LWA/LTE links. UE 404 applies general compression/decompression to the LTE signaling exchanged over the LWA/LTE links.

For user data, eNodeB 423 exchanges the user data over the F-S1U with L-SGW 2001. L-SGW 2001 terminates the F-S1U user data from eNodeB 423. L-SGW 2001 performs bridging, formatting, and filtering on the user data. L-SGW 2001 and Ethernet system 2004 may exchange some of the user data with the Internet over the LAN/WAN for the LIPA service. L-SGW 2001 and L-PGW 2002 exchange the other user data. L-PGW 2002 forms an endpoint for SGi data tunnels to macro P-GW 434 and LTE signaling tunnels to R-GW 437. L-PGW 2002 and Ethernet system 2004 exchange some user data over the F-SGi (1) tunnel that traverses the LAN/WAN. L-PGW 2002 and Ethernet system 2004 exchange other user data over the F-SGi (2) tunnel that traverses LWA/LTE.

Advantageously, L-PGW 2002 has multiple backhaul options for its signaling and user data through Ethernet system 2004. Ethernet system 2004 obtains network access over the LAN/WAN. LWA UE 404 obtains network access over LWA/LTE for Ethernet system 2004. Ethernet system 2004 aggregates and routes femtocell signaling and user data. Like eNodeB 423, L-SGW 2001, L-PGW 2002, and UE 404, Ethernet system 2004 applies LTE Quality-of-Service (QoS) to its bearers as indicated by the specified LTE QoS Class Identifiers (QCIs).

To translate between LTE and Ethernet QoS, Ethernet system 2004 applies Differentiated Services (DS) to its bearers to match its QoS to the corresponding LTE QCI metrics. Thus, Ethernet system 2004 exchanges LTE signaling using DS Point Codes (DSCPs) that correspond to QCI 5. Ethernet system 2004 exchanges F-SGi user data using DSCPs that correspond to QCI 1, QCI 5, QCI 9, or some other QoS. For VoLTE, L-SGW 2001 maps between QCI 1 (voice) and QCI 5 (signaling) on the F-S1U interface and corresponding DSCPs for voice and signaling in the F-SGi tunnels. The other elements of femtocell relay 410 (423, 2002, 2003, 2004) may also use DSCP in a similar manner for their traffic and QCIs.

For femtocell signaling, eNodeB 423 and Ethernet system 2004 exchange some LTE signaling (F-S1-MME(1) and F-X2(1)) for LAN/WAN backhaul and exchange other signaling (F-S1-MME(2) and F-X2(2)) for LWA/LTE backhaul. L-SGW 2001 and Ethernet system 2004 exchange some LTE signaling (F-S11(1)) for LAN/WAN backhaul and exchange other signaling (F-S11(2)) for LWA/LTE backhaul. Likewise, L-PGW 2003 and Ethernet system 704 exchange some LTE signaling (F-Gz/Gy(1)) for LAN/WAN backhaul and exchange other signaling (F-Gz/Gy(2)) for LWA/LTE backhaul. L-PCRF 2003 and Ethernet system 2004 exchange some LTE signaling (F-S15(1)) for LAN/WAN backhaul and exchange other signaling (F-S15 (2)) for LWA/LTE backhaul.

L-SGW 2001 has a Children's Internet Protection Act (CIPA) filter application to filter user data. Macrocell PCRF 435 has a CIPA pitcher that transfers CIPA filter flags and configuration data to L-PCRF 2003 over the F-S15 links. L-PCRF 2003 transfers the CIPA filter flags and configuration data to the CIPA application in L-SGW 2001. L-SGW 2001 filters the F-S1U user data using in the CIPA filter application as configured by macro PCRF 435.

Figure 21:
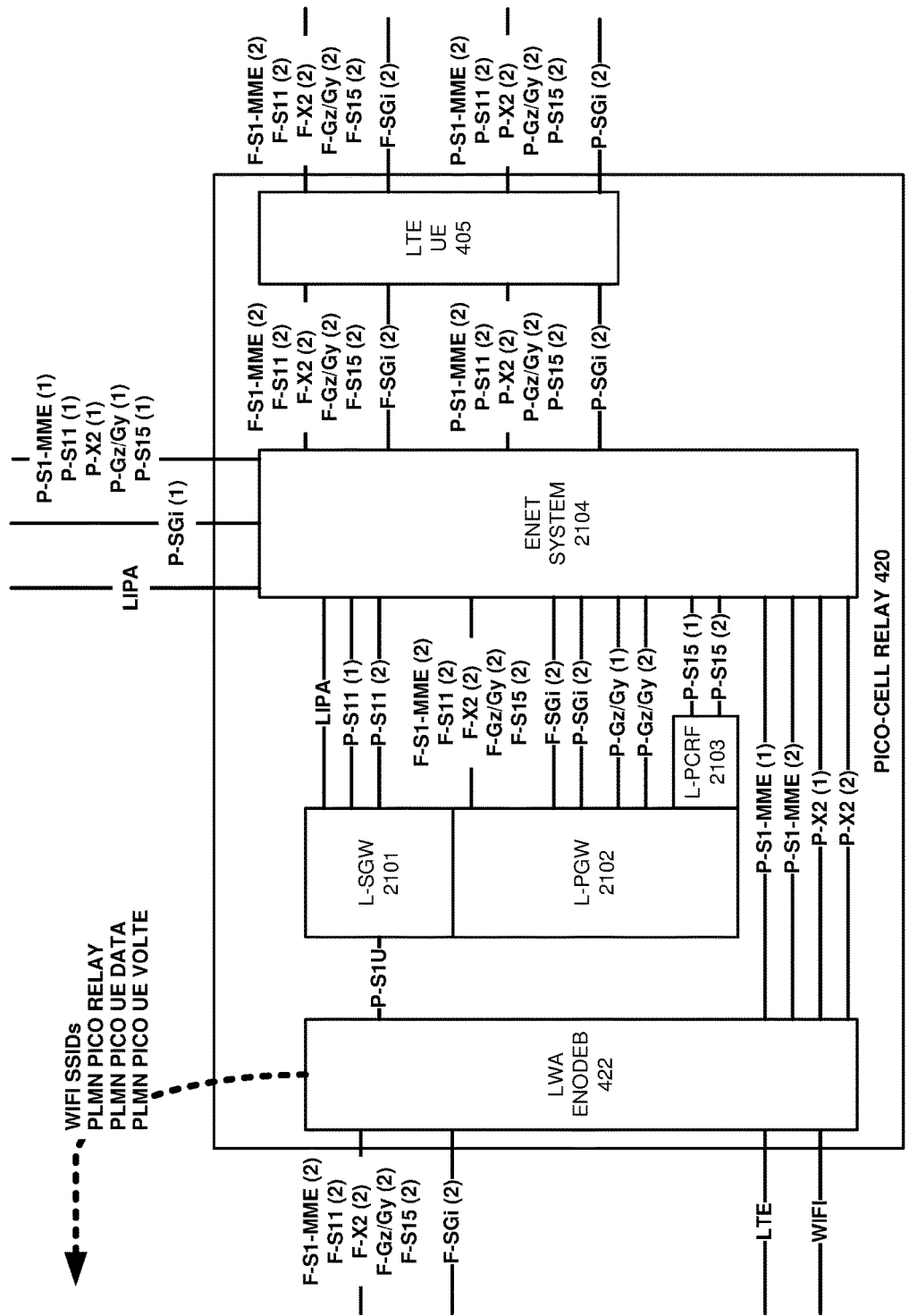

FIG. 21 illustrates picocell relay 420. Picocell relay 420 comprises LWA eNodeB 422, L-SGW 2101, L-PGW 2102, L-PCRF 2103, Ethernet system 2104, and LTE UE 405. LWA eNodeB 422 exposes LTE and WiFi interfaces to UEs and broadcasts WiFi SSIDs and LTE PLMN IDs for PICO RELAY, PICO UE DATA, and PICO UE VOLTE. LWA eNodeB 422 applies RoHC compression/decompression to the user data exchanged over the LTE and WiFi links. LWA eNodeB 422 applies general compression/decompression to the LTE signaling exchanged over the LTE and WiFi links. LTE UE 405 applies RoHC compression/decompression to the P-SGi user data exchanged over the LWA/LTE links. UE 405 applies general compression/decompression to the LTE signaling exchanged over the LWA/LTE links.

For user data, eNodeB 422 exchanges the user data over the P-S1U with L-SGW 2101. L-SGW 2101 terminates the F-S1U user data from eNodeB 422. L-SGW 2101 performs bridging, formatting, and filtering on the user data. L-SGW 2101 and Ethernet system 2104 may exchange some of the user data with the Internet over the LAN/WAN for the LIPA service. L-SGW 2101 and L-PGW 2102 exchange the other user data. L-PGW 2102 forms an endpoint for SGi data tunnels to macro P-GW 434 and LTE signaling tunnels to R-GW 437. L-PGW 2102 and Ethernet system 2104 exchange some user data over the P-SGi (1) tunnel that traverses the LAN/WAN. L-PGW 2102 and Ethernet system 2104 exchange other user data over the P-SGi (2) tunnel that traverses LWA/LTE.

Advantageously, L-PGW 2102 has multiple backhaul options for its signaling and user data through Ethernet system 2104. Ethernet system 2104 obtains network access over the LAN/WAN. LTE UE 405 obtains network access over LTE for Ethernet system 2104. Ethernet system 2104 aggregates and routes femtocell signaling and user data. Like eNodeB 422, L-SGW 2101, L-PGW 2102, and UE 405, Ethernet system 2104 applies LTE QoS to its bearers as indicated by the specified LTE QCIs.

To translate between LTE and Ethernet QoS, Ethernet system 2104 applies Differentiated Services (DS) to its bearers to match its QoS to the corresponding LTE QCI metrics. Thus, Ethernet system 2104 exchanges LTE signaling using DSCPs that correspond to QCI 5. Ethernet system 2104 exchanges F-SGi user data using DSCPs that correspond to QCI 1, QCI 5, QCI 9, or some other QoS. For VoLTE, L-SGW 2101 maps between QCI 1 (voice) and QCI 5 (signaling) on the F-S1U interface and corresponding DSCPs for voice and signaling in the F-5/S2a PMIP GRE tunnels. The other elements of picocell relay 420 (423, 2102, 2103, 404) may also use DSCP in a similar manner for their traffic and QCIs.

For picocell signaling, eNodeB 422 and Ethernet system 2104 exchange some LTE signaling (P-S1-MME(1) and P-X2(1)) for LAN/WAN backhaul and exchange other signaling (P-S1-MME(2) and P-X2(2)) for LWA/LTE backhaul. L-SGW 2101 and Ethernet system 2104 exchange some LTE signaling (P-S11(1)) for LAN/WAN backhaul and exchange other signaling (P-S11(2)) for LWA/LTE backhaul. Likewise, L-PGW 2103 and Ethernet system 2104 exchange some LTE signaling (P-Gz/Gy(1)) for LAN/WAN backhaul and exchange other signaling (P-Gz/Gy(2)) for LWA/LTE backhaul. L-PCRF 2103 and Ethernet system 2104 exchange some LTE signaling (P-S15(1)) for LAN/WAN backhaul and exchange other signaling (P-S15 (2)) for LWA/LTE backhaul.

For the femtocell signaling and user data, LWA eNodeB 422 applies RoHC compression/decompression to the user data (F-SGi(2)) that traverses the femtocell's SGi tunnels. LWA eNodeB 422 applies general compression/decompression to the femtocell LTE signaling (F-S1-MME(2), F-X2 (2), F-S11(2), F-S15(2), and F-Gz/Gy(2)) that traverses the signaling tunnel. L-SGW/MAG 2101 terminates the P-S1U having picocell user data, femtocell user data, and femtocell signaling. L-SGW 2101, L-PGW 2102, Ethernet system 2104, and LTE UE 405 exchange the femtocell data over the F-SGi tunnels using the requisite QCI/DSCP QoS. L-SGW 2101, L-PGW 2102, Ethernet system 2104, and LTE UE 405 exchange the femtocell signaling over the femto signaling tunnel using the requisite QCI/DSCP QoS.

L-SGW 2101 has a Children's Internet Protection Act (CIPA) filter application to filter user data. Macrocell PCRF 435 has a CIPA pitcher that transfers CIPA filter flags and configuration data to L-PCRF 2103 over the P-S15 links. L-PCRF 2103 transfers the CIPA filter flags and configuration data to the CIPA application in L-SGW 2101. L-SGW 2101 filters the P-S1U user data using in the CIPA filter application as configured by macro PCRF 435.

Figure 22:
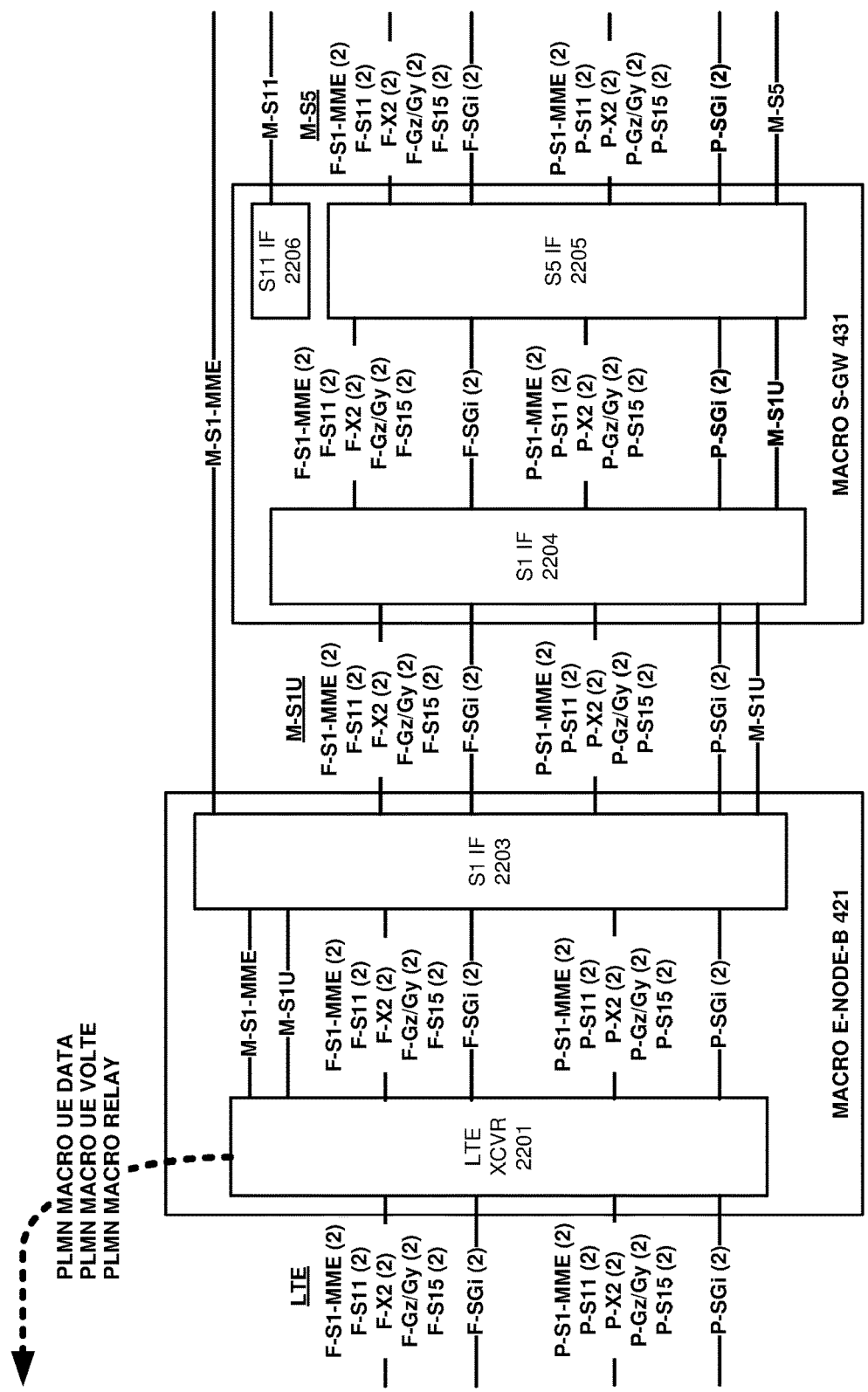

FIG. 22 illustrates macrocell eNodeB 421 and S-GW 431. Macrocell eNodeB 421 comprises LTE transceiver 2201 and S1 interface 2203. S-GW 431 comprises S1 interface 2204, S5 interface 2205, and S11 interface 2206. LTE transceiver 2201 exposes LTE interfaces to UEs, femtocell relays, and picocell relays. LTE transceiver 2201 broadcasts LTE PLMN IDs for MACRO UE DATA, MACRO UE VOLTE, and MACRO RELAY.

For the typical UE, LTE transceiver 2201 exchanges its LTE signaling and user data (M-S1-MME and M-S1U) with S1 interface 2203. For femtocell and picocell relays, LTE transceiver 901 applies RoHC compression/decompression to the user data that traverses F-SGi (2) and P-SGi (2) tunnels. LTE transceiver 2201 applies general compression/ decompression to the femtocell and picocell signaling (F-S1-MME(2), F-S11(2), F-X2(2), F-Gz/Gy(2), F-S15(2), P-S1-MME(2), P-S11(2), P-X2(2), P-Gz/Gy(2), and P-S15 (2)) exchanged over the LTE signaling tunnels. LTE transceiver 2201 and S1 interface 2203 exchange the femtocell and picocell signaling and user data.

S1 interface 2203 exchanges macro signaling (M-S1-MME) with MME 432. S1 interface 2203 exchanges user data (M-S1U) with S1 interface 2204 of S-GW 431. The M-S1U interface transports the femtocell and picocell signaling and user data (F-S1-MME(2), F-S11(2), F-X2(2), F-Gz/Gy(2), F-S15(2), P-S1-MME(2), P-S11(2), P-X2(2), P-Gz/Gy(2), P-S15(2), F-S5(2), F-S2a(2), P-S5(2), and P-S2a(2)). S1 interface 2204 exchanges the femtocell and picocell signaling and user data with S5 interface 2205. S5 interface 2205 exchanges user data (M-S5) with P-GW 434. The M-S5 interface transports the femtocell and picocell signaling and user data. S11 interface 906 exchanges macro signaling (M-S11) with MME 432.

Macro eNodeB 421 and S-GW 431 apply LTE QoS to the bearers as indicated by the specified QCIs. Macro eNodeB 421 and S-GW 431 exchange the LTE signaling using QCI 5. Macro eNodeB 421 and S-GW 431 exchange the F-SGi user data using QCI 1, QCI 5, QCI 9, or some other data QCI.

Figure 23:
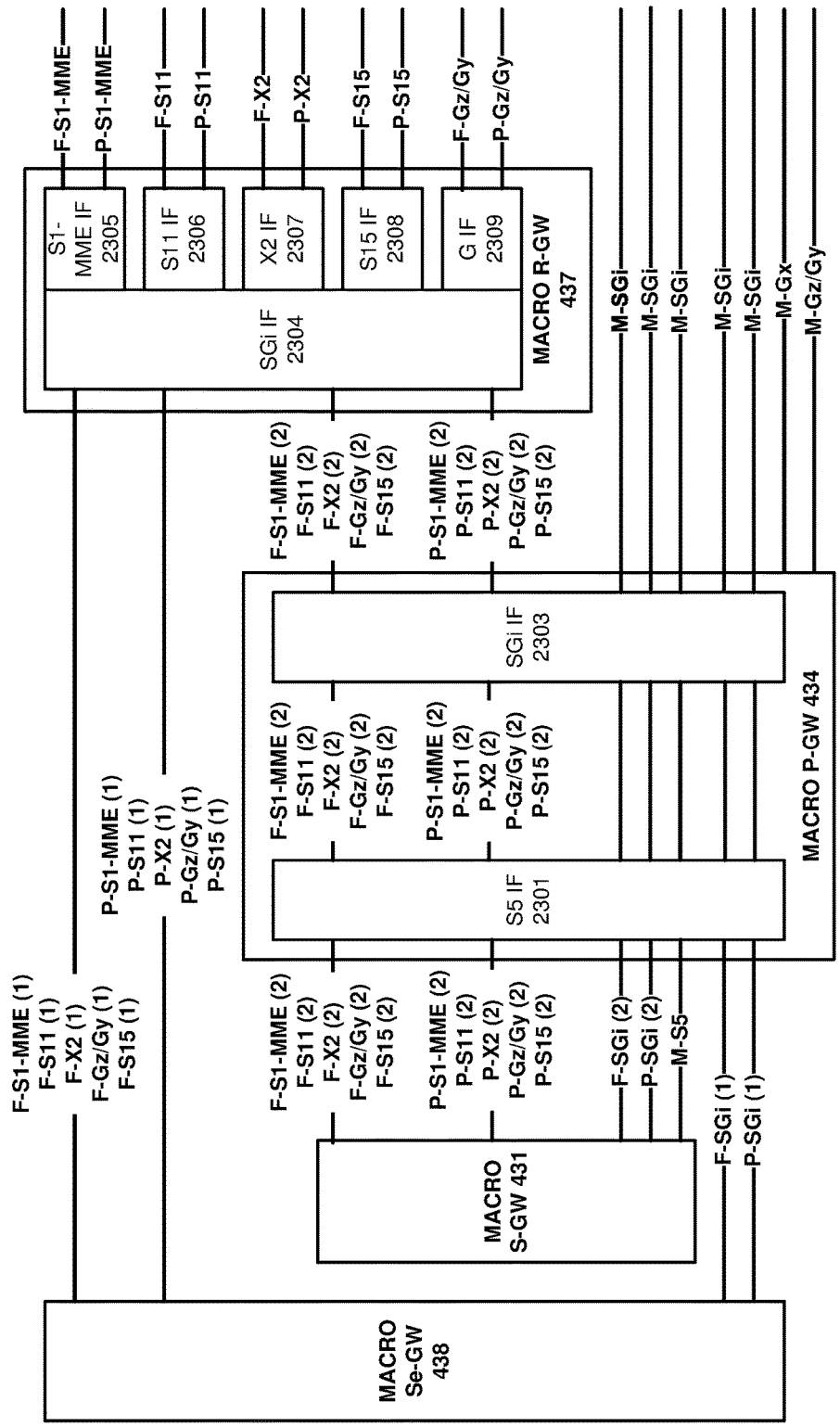

FIG. 23 illustrates macrocell P-GW 434 and R-GW 437. Macro S-GW 431 and Se-GW 438 are shown again for reference. Macrocell P-GW 434 comprises S5 interface 2301 and SGi interface 2303. R-GW 437 comprises SGi interface 2304, S1-MME interface 2305, S11 interface 2306, X2 interface 2307, S15 interface 2308, and G interface 2309. Macrocell P-GW 434 exchanges its M-Gx data with PCRF 435 and exchanges its M-Gz/Gy data with ACCT 436.

In P-GW 434, S5 interface 2301 exchanges the user data (F-SGi (1)(2) and P-SGi(1)(2)) with SGi interface 2303. SGi interface 2303 performs functions like routing and filtering on the user data for exchange with the Internet, IMS, or some other system over the SGi links. S5 interface 2301 exchanges LTE signaling (F-S1-MME(2), F-S11(2), F-X2 (2), F-Gz/Gy(2), F-S15(2), P-S1-MME(2), P-S11(2), P-X2 (2), P-Gz/Gy(2), and P-S15(2)) with SGi interface 2303. SGi interface 2303 exchanges the LTE signaling with SGi interface 2304 in R-GW 437. In R-GW 437, SGi interface 2304 also receives LTE signaling (F-S1-MME(1), F-S11(1), F-X2(1), F-Gz/Gy(1), F-S15(1), P-S1-MME(1), P-S11(2), P-X2(1), P-Gz/Gy(1), and P-S15(1)) from Se-GW 438. SGi interface 2304 performs functions like routing and filtering on the LTE signaling.

SGi interface 2304 exchanges the LTE signaling with proxy interfaces 2305-2309, and proxy interfaces 2305-2309 exchange the LTE signaling with various systems. Proxy interfaces 2305-2309 aggregate the LTE signaling that was exchanged over the LAN/WAN backhaul and over the LWA/LTE backhaul. S1-MME interface 2305 exchanges the F-S1-MME and P-S1-MME signaling with MME 432. S11 interface 2306 exchanges F-S11 and P-S11 signaling with MME 432. X2 interface 2307 exchanges F-X2 and P-X2 signaling with macrocell eNodeB 421. S15 interface 2308 exchanges F-S15 and P-S15 signaling with PCRF 435. G interface 2309 exchanges F-Gz/Gy and P-Gz/Gy signaling with ACCT 436.

Macro P-GW 434 applies LTE QoS to the bearers as indicated by the specified QCIs. Macro P-GW 434 exchanges the LTE signaling using QCI 5. P-GW 434 exchanges the user data using a QCI 1, QCI 5, QCI 9, or some other data QoS. R-GW 437 applies at least a QCI 5 type QoS to its signaling data.

Figure 24:
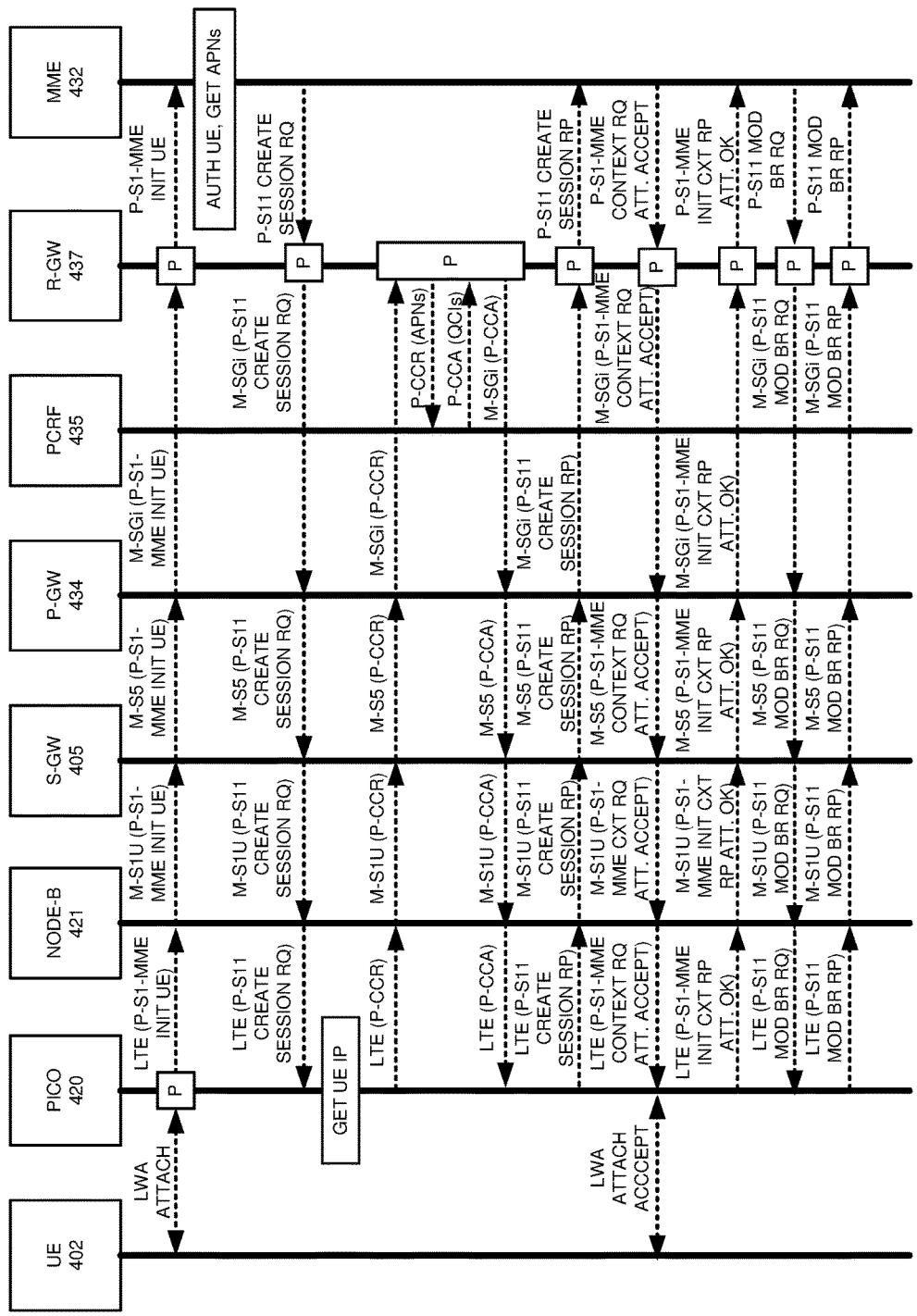

FIG. 24 illustrates UE 402 attachment to picocell 420 to use the P-SGi data bearer. The prior attachment of picocell relay 420 to macrocell eNodeB 421 to establish the P-SGi data bearer is like that shown in FIG. 11 and is omitted for brevity. UE 402 responds to the SSIDs or PLMN IDs of PICO UE DATA and PICO UE VOLTE from picocell relay 420 (eNodeB 422) during an LWA attachment session using LTE or WiFi. UE 402 transfers information for MME 432 in a NAS message during LWA attachment. In response to the UE 402 attachment, picocell relay 420 selects R-GW 437 and transfers a Picocell (P) S1-MME initial UE message containing the NAS message to R-GW 437. The P-S1-MME message uses the signaling bearer that traverses the LTE/S1-MME/S5/SGi interfaces of eNodeB 421, S-GW 431, and P-GW 434. The P-S1-MME initial UE message indicates the IP address for picocell relay 420. R-GW 437 transfers the P-S1-MME initial UE message to MME 432.

MME 432 authorizes UE 402 and retrieves UE APNs DATA and VOLTE from HSS 433. In some examples, additional UE APNs are implemented like VIDEO. MME 432 responds to R-GW 437 with the UE APNs in a P-S11 create session request. R-GW 437 transfers the compressed P-S11 create session request with the UE 402 APNs to picocell relay 420 (L-SGW 2101) over the signaling bearer that traverses the SGi/S5/S1U/LTE interfaces of P-GW 434, S-GW 431, and eNodeB 421.

Responsive to the P-S11 create session request in picocell relay 420, L-SGW 2101 passes an internal P-S5 create session request to L-PGW 2102, and L-PGW 2102 selects IP addresses for UE 402. L-PGW 2102 may subnet one of its own IPv6 addresses or perform Network Address Port Translation (NAPT) on one of its IPv4 addresses. L-PGW 2102 transfers a P-CCR to L-PCRF 2103. The P-CCR indicates the IP address and ID of UE 402 and indicates the IP address of picocell relay 420. L-PCRF 2103 adds QCIs 1, 5, and 9 to serve the UE APN VOLTE and DATA over the picocell LWA access link. Picocell relay 420 (L-PCRF 2103) transfers the P-CCR to R-GW 437 over the signaling bearer that traverses the LTE/S1U/S5/SGi interfaces of eNodeB 421, S-GW 431, and P-GW 434. R-GW 437 transfers the P-CCR to PCRF 435.

PCRF 435 returns a P-CCA to R-GW 437 which transfers the P-CCA to picocell relay 420 (L-PCRF 2103) over the signaling bearer that traverses the SGi/S5/S1U/LTE interfaces of P-GW 434, S-GW 431, and eNodeB 421. The P-CCA indicates the QCI 1, QCI 5, and QCI 9 bearers for the UE APNs over the LWA access link and the picocell data and signaling bearers. In picocell relay 420, L-PCRF 2103 transfers the P-CCA to L-PGW 2002 which transfers a P-S5 create bearer request to L-SGW 2101. In response to the P-S5 create bearer request, picocell relay 420 (L-SGW 2001) transfers a P-S11 create session response to R-GW 437 over the signaling bearer that traverses the LTE/S1U/S5/SGi interfaces of eNodeB 421, S-GW 431, and P-GW 434. R-GW 437 transfers the P-S11 create session response to MME 432.

In response to the P-S11 create session response for the UE APNs and QCIs, MME 432 returns a P-S1-MME message to R-GW 437. The P-S1-MME message has an initial context request and attach acceptance and indicates the IP addresses, APNs, and QCIs for UE 402. R-GW 437 transfers the P-S1-MME message to picocell relay 420 (eNodeB 422) over the signaling bearer that traverses the SGi/S5/S1U/LTE interfaces of P-GW 434, S-GW 431, and eNodeB 421.

In response to the P-S1-MME message, UE 402 and picocell 420 (eNodeB 422) perform an LWA attach acceptance session over LTE or WiFi that delivers the IP addresses, APNs, and QCIs for UE 402 to UE 402. In response to the UE 402 attach acceptance, picocell relay 420 (eNodeB 422) transfers a P-S1-MME initial context response and attach complete (OK) message to R-GW 437 over the signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 (L-SGW 2101) over the signaling bearer that traverses the SGi/S5/S1U/LTE interfaces through P-GW 434, S-GW 431, and eNodeB 421. Responsive to the P-S11 modify bearer request, picocell relay 420 (L-SGW 2101) transfers a P-S11 modify bearer response to R-GW 437 over the signaling bearer that traverses the LTE/S1U/S5/SGi interfaces of eNodeB 421, S-GW 431, and P-GW 434. R-GW 437 transfers the P-S11 modify bearer response to MME 432.

Although not shown for clarity, UE 402 may exchange user data with picocell relay 420 over LWA based on the specified APNs and QCIs. Picocell relay 420 may exchange the user data with P-GW 434 over the P-SGi data bearer that traverses the LTE/S1U/S5 interfaces of eNodeB 421 and S-GW 431.

Figure 25:
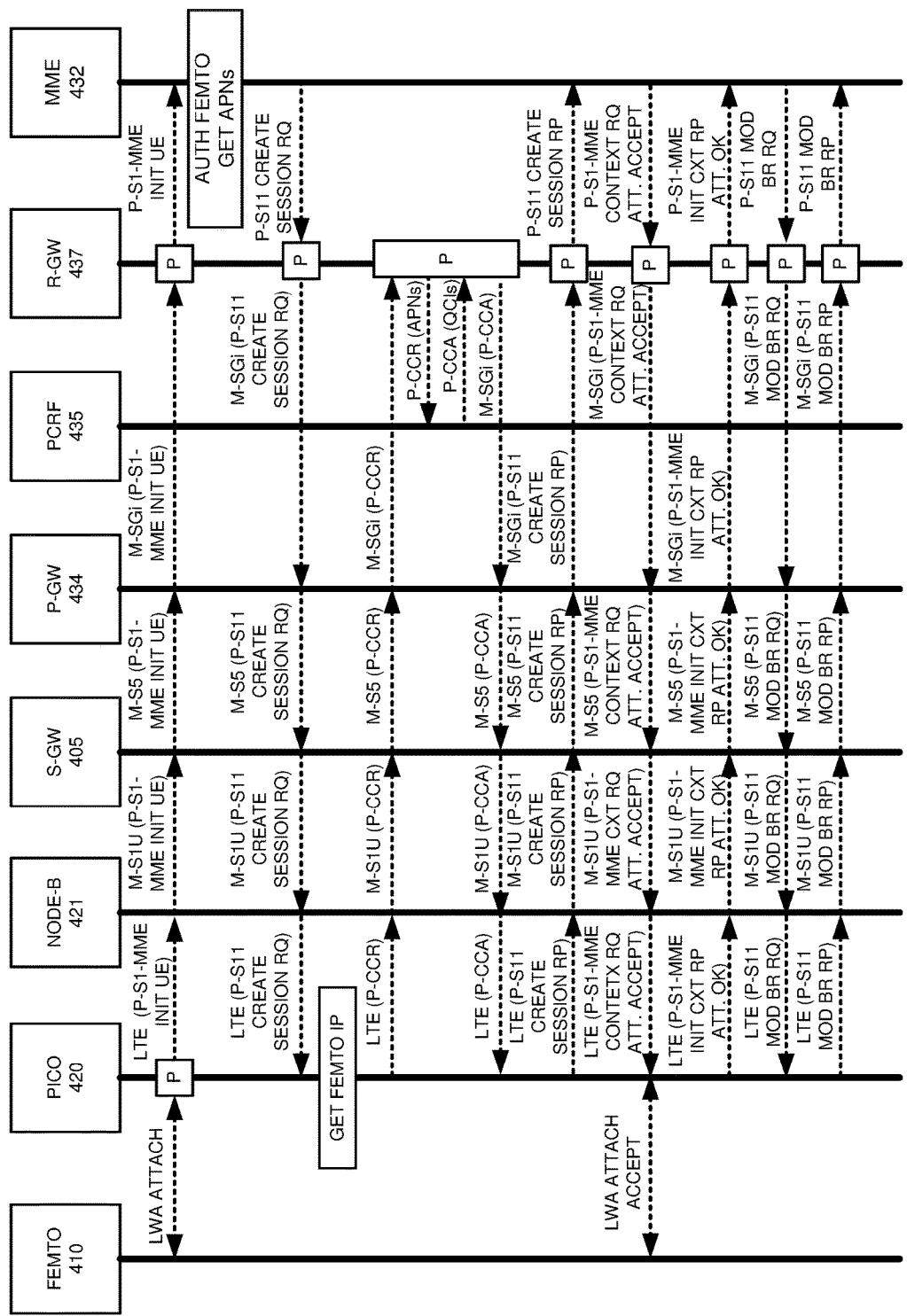

FIG. 25 illustrates femtocell relay 410 attachment to picocell relay 420 to establish the femtocell F-SGi user data bearer and the femtocell signaling bearer. Femtocell relay 410 also attaches to the LAN/WAN and Se-GW 437. These attachments could be standard and are not shown for clarity. Femtocell relay 410 responds to the SSIDs or PLMN IDs of PICO RELAY from picocell relay 420 (eNodeB 422) during an LWA attachment session using LTE or WiFi. Femtocell relay 410 transfers information for MME 432 in a NAS message during LWA attachment. In response to femtocell relay 410 attachment, picocell relay 420 selects R-GW 437 and transfers an P-S1-MME initial UE message containing the NAS message to R-GW 437. The P-S1-MME message uses the signaling bearer that traverses the LTE/S1-MME/S5/SGi interfaces of eNodeB 421, S-GW 431, and P-GW 434. The P-S1-MME initial UE message indicates the IP address for picocell relay 420. R-GW 437 transfers the P-S1-MME initial UE message to MME 432.

MME 432 authorizes femtocell relay 410 and retrieves femtocell APNs for DATA and SIG from HSS 433. MME 432 responds to R-GW 437 with the femtocell APNs in a P-S11 create session request. R-GW 437 transfers the P-S11 create session request with the femtocell APNs to picocell relay 420 (L-SGW 2101) over the signaling bearer that traverses the SGi/S5/S1U/LTE interfaces of P-GW 434, S-GW 431, and eNodeB 421.

Responsive to the P-S11 create session message in picocell relay 420, L-SGW 2101 passes an internal P-S5 create session message to L-PGW 2102 with the femtocell APNs. In response, L-PGW 2102 selects IP addresses for femtocell relay 410. L-PGW 2102 may subnet one of its own IPv6 addresses or NAPT one of its IPv4 addresses. L-PGW 2102 transfers a P-CCR to L-PCRF 2103 indicating the femtocell ID, IP addresses, and APNs. L-PCRF 2003 adds QCIs 5 and 9 to service the femtocell APNs over the picocell LWA access links. The P-CCR also indicates the IP address of picocell relay 420. Picocell relay 420 (L-PCRF 2103) transfers the P-CCR to R-GW 437 over the signaling bearer that traverses the LTE/S1U/S5/SGi interfaces of eNodeB 421, S-GW 431, and P-GW 434. R-GW 437 transfers the P-CCR to PCRF 435. PCRF 435 returns a P-CCA to R-GW 437 that has QCI 9 for data bearer and QCI 5 for the signaling bearer.

R-GW 437 transfers the P-CCA to picocell relay 420 (L-PCRF 2003) over the signaling bearer that traverses the SGi/S5/S1U/LTE interfaces of P-GW 434, S-GW 431, and eNodeB 421.

In picocell relay 420, L-PCRF 2103 transfers the P-CCA with the femtocell QCIs to L-PGW 2102 which transfers a P-S5 create session response to L-SGW 2101. In response to the P-S5 create session response, picocell relay 420 (L-SGW 2101) transfers a P-S11 create session response for the femtocell APNs and QCIs to R-GW 437 over the signaling bearer that traverses the LTE/S1U/S5/SGi interfaces of eNodeB 421, S-GW 431, and P-GW 434. R-GW 437 transfers the P-S11 create session response to MME 432. In response to the P-S11 create session response for the femtocell QCIs, MME 432 returns a P-S1-MME message to R-GW 437. The P-S1-MME message has an initial context request and attach acceptance and indicates the IP addresses, APNs, and QCIs for femtocell relay 410. R-GW 437 transfers the P-S1-MME message to picocell relay 420 (eNodeB 422) over the signaling bearer that traverses the SGi/S5/S1U/LTE interfaces of P-GW 434, S-GW 431, and eNodeB 421.

In response to the P-S1-MME message, femtocell relay 410 (UE 404) and picocell 420 relay (eNodeB 422) perform an LWA attach acceptance session over LTE or WiFi that delivers the IP addresses, APNs, and QCIs for femtocell relay 410 to relay 410. In response to the femtocell attach acceptance, picocell relay 420 (eNodeB 422) transfers a P-S1-MME initial context response and attach complete (OK) message to R-GW 437 over the signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 (L-SGW 2101) over the signaling bearer that traverses the SGi/S5/S1U/LTE interfaces through P-GW 434, S-GW 431, and eNodeB 421. Responsive to the P-S11 modify bearer request, picocell relay 420 (L-SGW 2101) transfers a P-S11 modify bearer response to R-GW 437 over the signaling bearer that traverses the LTE/S1U/S5/SGi interfaces of eNodeB 421, S-GW 431, and P-GW 434. R-GW 437 transfers the P-S11 modify bearer response to MME 432.

Although not shown for clarity, femtocell relay 410 may exchange user data with picocell relay 420 over LWA based on the femtocell APNs and QCIs. Femtocell relay 410 may exchange user data with P-GW 434 over the F-SGi user data bearer that traverses the LWA/LTE/S1U/S5 interfaces of picocell relay 420, eNodeB 421 and S-GW 431. Femtocell relay 410 may exchange LTE signaling with R-GW 437 over the signaling bearer that traverses the LWA/LTE/S1U/S5/SGi interfaces of picocell relay 420, eNodeB 421, S-GW 431, and P-GW.

Figure 26:
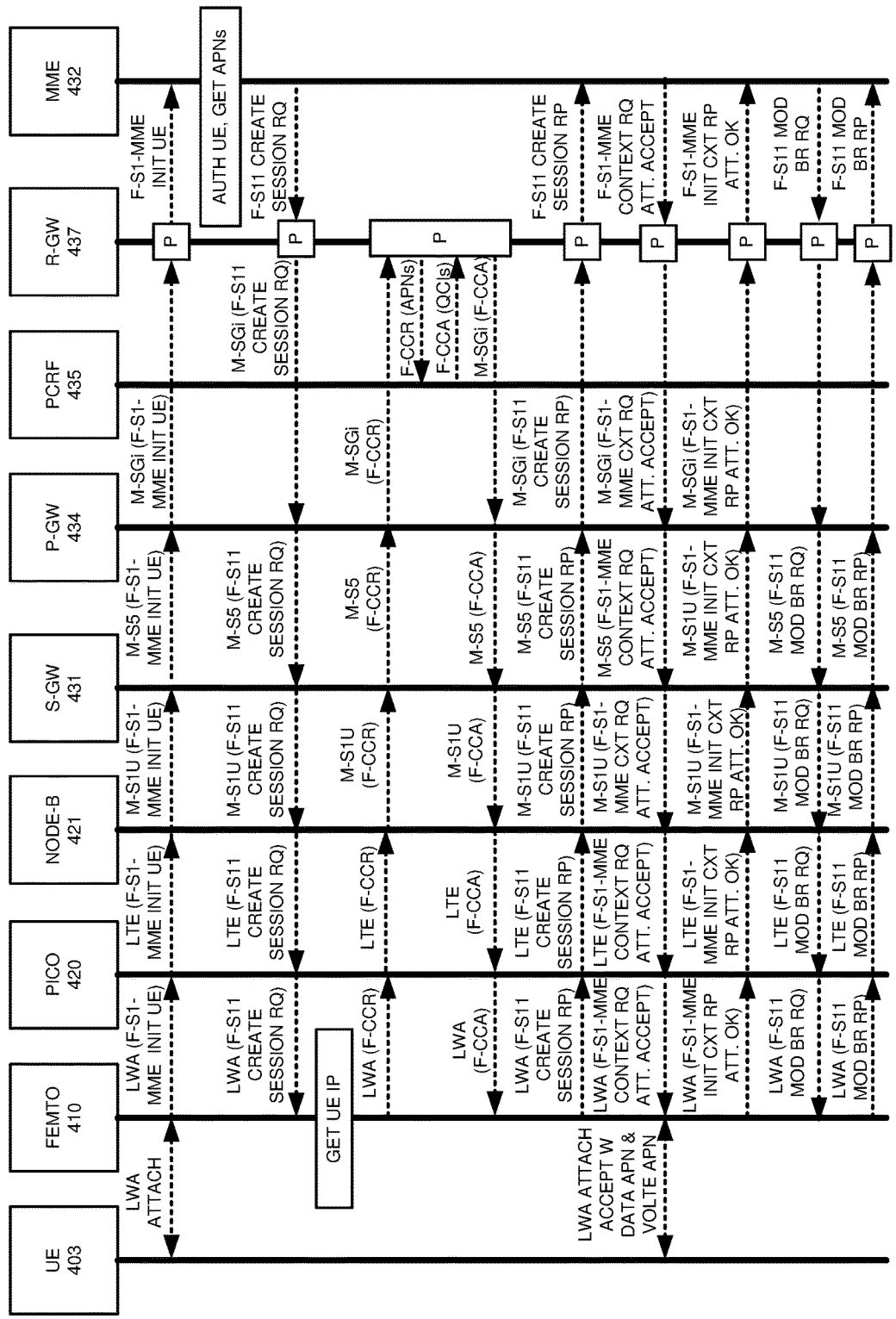

FIG. 26 illustrates UE 403 attachment to femtocell 420 to use the F-SGi user data bearer. UE 403 responds to the SSIDs or PLMN IDs of FEMTO UE DATA and FEMTO UE VOLTE from femtocell relay 410 (eNodeB 423) during an LWA attachment session using LTE or WiFi. UE 403 transfers information for MME 432 in a NAS message during LWA attachment. In response to the UE 402 attachment, femtocell relay 410 selects R-GW 437 and transfers an F-S1-MME initial UE message containing the NAS message to R-GW 437. The F-S1-MME message uses the signaling bearer that traverses the LWA/LTE/S1-MME/S5/SGi interfaces of picocell 420, eNodeB 421, S-GW 431, and P-GW 434. The P-S1-MME initial UE message indicates the IP address for femtocell relay 410. R-GW 437 transfers the P-S1-MME initial UE message to MME 432.

MME 432 authorizes UE 403 and retrieves UE APNs like DATA and VOLTE from HSS 433. In some examples, additional UE APNs are implemented like VIDEO. MME 432 responds to R-GW 437 with the UE APNs in an F-S11 create session request. R-GW 437 transfers the F-S11 create session request with the UE 403 APNs to femtocell relay 410 (L-SGW 2001) over the signaling bearer that traverses the SGi/S5/S1U/LTE/LWA interfaces of P-GW 434, S-GW 431, eNodeB 421, and picocell 420.

Responsive to the F-S11 create session message in femtocell relay 410, L-SGW 2001 passes an internal F-S5 create session message to L-PGW 2002 with the UE APNs DATA and VOLTE. In response, L-PGW 2002 selects IP addresses for UE 403. L-PGW 2002 may subnet one of its IPv6 addresses or NAPT on one of its IPv4 addresses. L-PGW 2002 transfers an F-CCR with the UE ID and UE APNs to L-PCRF 2003. L-PCRF 2003 adds QCIs 9 and 5 to serve the UE APNs over the femtocell LWA access link. The F-CCR also indicates the IP address of femtocell relay 410. Femtocell relay 410 (L-PCRF 2003) transfers the F-CCR to R-GW 437 over the signaling bearer that traverses the LWA/LTE/S1U/S5/SGi interfaces of picocell relay 420, eNodeB 421, S-GW 431, and P-GW 434. R-GW 437 transfers the P-CCR to PCRF 435.

PCRF 435 returns an F-CCA having the UE QCIs 5 and 9 to R-GW 437 which proxies the F-CCA to femtocell relay 410 (L-PCRF 2003) over the signaling bearer that traverses the SGi/S5/S1U/LTE/LWA interfaces of P-GW 434, S-GW 431, eNodeB 421, and picocell relay 420. In femtocell relay 410, L-PCRF 2003 transfers the F-CCA to L-PGW 2002 which transfers an F-S5 create session response to L-SGW 2001, In response to the F-S5 create session response, femtocell relay 410 (L-SGW 2001) transfers an F-S11 create session response to R-GW 437 over the signaling bearer that traverses the LWA/LTE/S1U/S5/SGi interfaces of picocell 420, eNodeB 421, S-GW 431, and P-GW 434. R-GW 437 transfers the F-S11 create session response to MME 432.

In response to the F-S11 create session response with the UE QCIs, MME 432 returns an F-S1-MME message to R-GW 437. The F-S1-MME message has an initial context request and attach acceptance and indicates the IP addresses, APNs, and QCIs for UE 403. R-GW 437 transfers the F-S1-MME message to femtocell relay 410 (eNodeB 423) over the signaling bearer that traverses the SGi/S5/S1U/LTE/LWA interfaces of P-GW 434, S-GW 431, eNodeB 421, and picocell 420.

In response to the P-S1-MME message, UE 403 and femtocell relay 410 (eNodeB 423) perform an LWA attach acceptance session over LTE or WiFi that delivers the IP addresses, APNs, and QCIs for UE 403 to UE 403. In response to the UE 403 attach acceptance, femtocell relay 410 (eNodeB 423) transfers an F-S1-MME initial context response and attach complete (OK) message to R-GW 437 over the signaling bearer that traverses the LWA/LTE/S1U/S5/SGi interfaces of picocell 420, eNodeB 421, S-GW 431, and P-GW 434. R-GW 437 transfers the F-S1-MME initial context response and attach complete to MME 432.

In response to the F-S1-MME initial context response and attach complete, MME 432 transfers an F-S11 modify bearer request to R-GW 437. R-GW 437 transfers the F-S11 modify bearer request to femtocell relay 410 (L-SGW 2001) over the signaling bearer that traverses the SGi/S5/S1U/LTE/LWA interfaces of P-GW 434, S-GW 431, eNodeB 421, and picocell 420. Responsive to the F-S11 modify bearer request, femtocell relay 410 (L-SGW 2001) transfers an F-S11 modify bearer response to R-GW 437 over the signaling bearer that traverses the LWA/LTE/S1U/S5/SGi interfaces of picocell 420, eNodeB 421, S-GW 431, and P-GW 434. R-GW 437 transfers the F-S11 modify bearer response to MME 432.

Although not shown for clarity, UE 403 may exchange user data with femtocell relay 410 over LWA based on the specified APNs and QCIs. Femtocell relay 410 may exchange the user data with P-GW 434 over the F-SGi data bearer that traverses the LWA/LTE/S1U/S5 interfaces of picocell 420, eNodeB 421, and S-GW 431.

Figure 27:
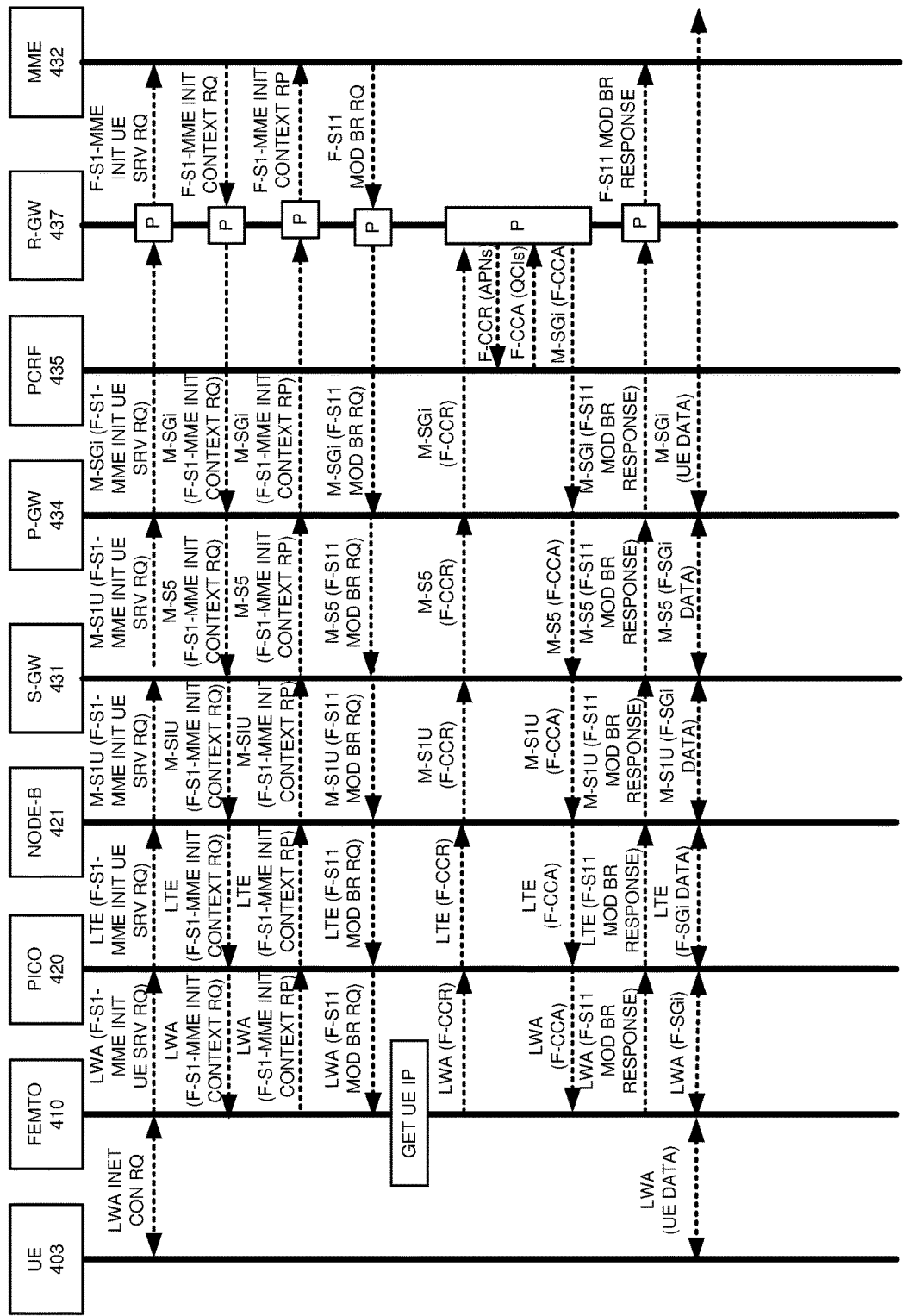

FIG. 27 illustrates Internet service from femtocell relay 420. UE 403 transfers an LWA internet connection request to femtocell relay 410 (eNodeB 423). In response to the LWA internet connection request, femtocell relay 410 transfers an F-S1-MME initial UE service request containing a NAS message with the internet request to R-GW 437. The F-S1-MME message uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE service request to MME 432.

In response to the F-S1-MME initial UE service request with the internet request, MME 432 returns an F-S1-MME initial context request to R-GW 437. R-GW 437 transfers the F-S1-MME initial context request to femtocell relay 410 (eNodeB 423) over the femtocell signaling bearer that traverses the SGi/S5/S1U/LTE/LWA interfaces of P-GW 434, S-GW 431, eNodeB 421, and picocell relay 420.

In response to the F-S1-MME initial context request, femtocell relay 410 (eNodeB 423) returns an F-S1-MME initial context response to R-GW 437 over the femtocell signaling bearer that traverses the LWA/LTE/S1U/S5/M-SGi interfaces of picocell relay 420, eNodeB 421, S-GW 431, and P-GW 434. R-GW 437 transfers the F-S1-MME initial context response to MME 432. In response to the F-S1-MME initial context response, MME 432 transfers an F-S11 modify bearer request to R-GW 437. R-GW 437 proxies the F-S11 modify bearer request to femtocell relay 410 (L-SGW 2001) over the femtocell signaling bearer that traverses the SGi/S5/S1U/LTE/LWA interfaces of P-GW 434, S-GW 431, eNodeB 421, and picocell relay 420.

Responsive to the F-S11 modify bearer request in femtocell relay 410, L-SGW 2001 passes an internal F-S5 modify bearer request to L-PGW 2002, and L-PGW 2002 selects IP addresses for UE 403. L-PGW 2002 may subnet one of its own IPv6 addresses or NAPT one of its IPv4 addresses. L-PGW 2002 transfers an F-CCR to L-PCRF 2003 with the UE APN DATA and the IP address of the signaling bearer for femtocell relay 410. L-PCRF 2003 adds QCI 9 (or another QCI based on the service request) for the femtocell LWA access link. Femtocell relay 410 (L-PCRF 2003) transfers the F-CCR to R-GW 437 over the signaling bearer that traverses the LWA/LTE/S1U/S5/SGi interfaces of picocell relay 420, eNodeB 421, S-GW 431, and P-GW 434. R-GW 437 transfers the F-CCR to PCRF 435.

PCRF 435 returns an F-CCA to R-GW 437 with QCI 9 for the F-SGi data bearer for UE 403. R-GW 437 transfers the F-CCA to femtocell relay 410 (L-PCRF 2003) over the signaling bearer that traverses the SGi/S5/S1U/LTE/LWA interfaces of P-GW 434, S-GW 431, eNodeB 421, and picocell relay 420. In femtocell relay 410, L-PCRF 2003 transfers the F-CCA to L-PGW 2002 which transfers an F-S5 modify bearer response to L-SGW 2001, In response to the F-S5 modify bearer response, femtocell relay 410 (L-SGW 2001) transfers an F-S11 modify bearer response to R-GW 437 over the signaling bearer that traverses the LWA/LTE/S1U/S5/SGi interfaces of picocell 420, eNodeB 421, S-GW 431, and P-GW 434. R-GW 437 transfers the F-S11 modify bearer response to MME 432.

Although not shown for clarity, UE 403 may exchange user data with femtocell relay 410 over LWA based on the specified DATA APN and QCI 9 or some other QCI as requested. Femtocell relay 410 may exchange the user data with P-GW 434 over the F-SGI data bearer that traverses the LWA/LTE/S1U/S5 interfaces of picocell 420, eNodeB 421, and S-GW 431.

Figure 28:
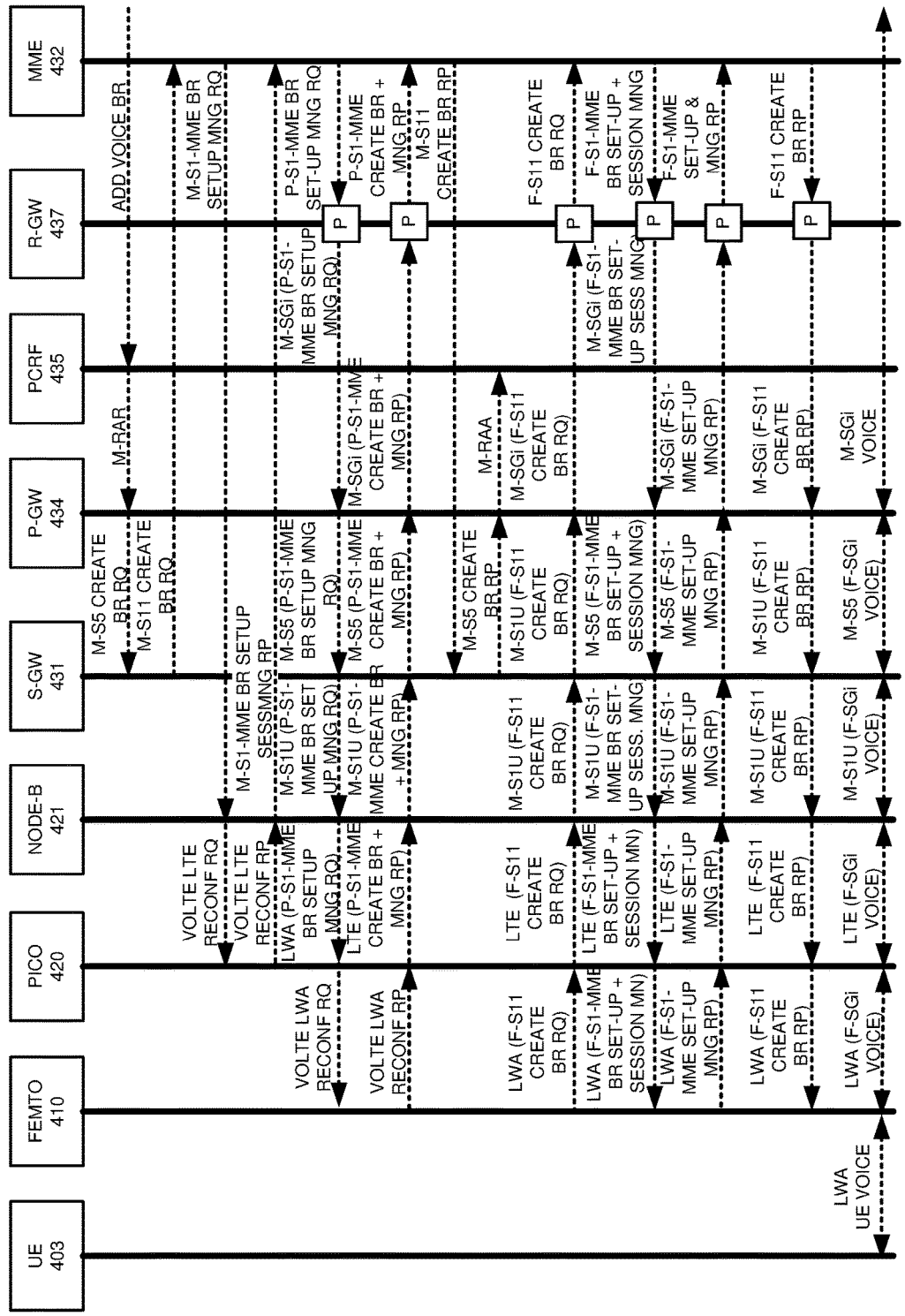

FIG. 28 illustrates UE VoLTE service from femtocell relay 420 for UE 403. Macro PCRF 435 receives an add VoLTE bearer request from IMS for UE 403. In response to the VoLTE bearer request, macro PCRF 435 transfers a Re-Authorization Request (RAR) for VoLTE/QCI 1 to P-GW 434. In response to the RAR, P-GW 434 transfers an M-S5 create bearer request for QCI 1 to S-GW 431 which transfers an M-S11 create bearer request for QCI 1 to MME 432.

In response to the M-S11 create bearer request for QCI 1, MME 432 transfers an M-S1-MME VoLTE create bearer/session management request macrocell eNodeB 421. In response to the M-S1-MME VoLTE bearer set-up/session management request, eNodeB 421 sends an LTE VoLTE reconfiguration request to picocell relay 420 (UE 405) and picocell relay 420 (UE 405) reconfigures itself for QCI 1 on the F-SGi data bearer and responds back to eNodeB 421. Macrocell eNodeB 421 transfers an M-S1-MME create bearer/session management response for VoLTE to MME 432.

Also in response to the M-S11 create bearer request for VoLTE through a picocell, MME 432 transfers a P-S1-MME VoLTE create bearer/session management request to picocell relay 420 (eNodeB 422) over the signaling bearer that traverses the SGi/S5/S1U/LTE/LWA interfaces of R-GW 437, P-GW 434, S-GW 431, and eNodeB 421. In response to the P-S1-MME VoLTE create bearer/session management request, picocell relay 420 (eNodeB 422) sends a VoLTE LWA reconfiguration request to femtocell relay 410 (UE 404) and femtocell relay 410 (UE 404) reconfigures itself for QCI 1 on the F-SGi data bearer and responds back to picocell relay 420 (eNodeB 422). In picocell relay 420, eNodeB 422 transfers a P-S1-MME create bearer/session management response for VoLTE to MME 432 over the signaling bearer that traverses the LTE/S1U/S5/SGi interfaces of picocell relay 420, eNodeB 421, S-GW 431, P-GW 434, and R-GW 437.

In response to the M-S1-MME and the P-S1-MME create bearer/session management responses for VoLTE, MME 432 transfers an M-S11 create bearer response for VoLTE to S-GW 431. S-GW 431 forwards an M-S5 create bearer response to P-GW 434, and P-GW 434 returns an M-RAA to PCRF 435.

In femtocell relay 410 responsive to the VoLTE reconfiguration, UE 404 transfers a VoLTE F-RAR to L-PCRF 2003, and L-PCRF 2003 transfers the F-RAR to L-PGW 2002. In response, L-PGW 2002 transfers an F-S5 add bearer request to L-SGW 2001. In femtocell relay 410, L-SGW 2001 responsively transfers an F-S11 add bearer request to MME 432 over the signaling bearer that traverses the LWA/LTE/S1U/S5/SGi interfaces of picocell relay 420 eNodeB 421, S-GW 431, P-GW 434, and R-GW 437.

In response to the F-S11 create bearer request for the VoLTE, MME 432 transfers an F-S1-MME bearer set-up/session management request for VoLTE to femtocell relay 410 (eNodeB 423). The F-S1-MME bearer set-up/session management request traverses the SGi/S5/S1U/LTE/LWA interfaces of R-GW 437, P-GW 434, S-GW 431, eNodeB 421, and picocell relay 420. In response to the F-S1-MME bearer set-up/session management request for the VoLTE, femtocell relay 410 (eNodeB 423) reconfigures itself and UE 403 for QCI 1 over the LWA access link. Femtocell relay 410 (eNodeB 423) transfers an F-S1-MME bearer set-up/session management response to MME 432 over the signaling bearer that traverses the LWA/LTE/S1U/S5/SGi interfaces of picocell relay 420, eNodeB 421, S-GW 431, P-GW 434, and R-GW 437.

In response to the F-S1-MME bearer set-up/session management response, MME 432 transfers an F-S11 create bearer response to femtocell relay 410 over the SGi/S5/S1U/LTE/LWA interfaces of R-GW 437, P-GW 434, S-GW 431, eNodeB 421, and picocell relay 410. In femtocell relay 410, L-SGW 2001 responsively transfers an F-S5 create bearer response to L-PGW 2002, and L-PGW 2002 transfers an F-RAA to L-PCRF 2003.

UE 403 may now exchange user voice with femtocell relay 410 over LTE or WiFi based on QCI 1. Femtocell relay 410 and the P-GW 434 exchange the user voice over the QCI 1 F-SGi data bearer. P-GW 434 performs formatting and filtering on the user voice data and exchanges the user voice data with external systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication network to control wireless relay backhaul, the method comprising:
    a wireless base station exchanging wireless attachment signaling with a wireless relay to establish a wireless backhaul link for the wireless relay to a data network core;
    a network gateway exchanging wireline attachment signaling with the wireless relay to establish a wireline backhaul link for the wireless relay to the data network core;
    the data network core determining backhaul status data for the wireless backhaul link and for the wireline backhaul link and transferring the backhaul status data to the wireless relay, wherein the wireless relay uses the backhaul status data to select the wireless backhaul link or the wireline backhaul link for user data communications;
    the wireless base station exchanging wireless user data with the wireless relay when the wireless relay selects the wireless backhaul link based on the backhaul status data;
    the network gateway exchanging wireline user data with the wireless relay when the wireless relay selects the wireline backhaul link based on the backhaul status data; and
    the data network core exchanging the wireless user data with the wireless base station and exchanging the wireline user data with the network gateway.

2. The method of claim 1 wherein the data network core transferring the backhaul status data to the wireless relay comprises the data network core transferring the backhaul status data to the wireless relay over Long Term Evolution (LTE) S1-Mobility Management Entity (MME) signaling that traverses the wireless backhaul link.

3. The method of claim 1 wherein the data network core transferring the backhaul status data to the wireless relay comprises the data network core transferring the backhaul status data to the wireless relay over Long Term Evolution (LTE) S1-Mobility Management Entity (MME) signaling that traverses the wireline backhaul link.

4. The method of claim 1 wherein the data network core transferring the backhaul status data to the wireless relay comprises the data network core transferring the backhaul status data to the wireless relay over Long Term Evolution (LTE) Non-Access Stratum (NAS) signaling that traverses the wireless backhaul link.

5. The method of claim 1 wherein the data network core transferring the backhaul status data to the wireless relay comprises the data network core transferring the backhaul status data to the wireless relay over Long Term Evolution (LTE) Non-Access Stratum (NAS) signaling that traverses the wireline backhaul link.

6. The method of claim 1 wherein the backhaul status data comprises wireless backhaul capacity data.

7. The method of claim 1 wherein the backhaul status data comprises wireline backhaul capacity data.

8. The method of claim 1 wherein the backhaul status data comprises wireless backhaul usage credit data.

9. The method of claim 1 wherein the backhaul status data comprises wireline backhaul usage credit data.

10. The method of claim 1 wherein the data network core comprises a Long Term Evolution (LTE) network core.

11. A operating a data communication network to control wireless relay backhaul, the data communication network comprising:
    a wireless base station configured to exchange wireless attachment signaling with a wireless relay to establish a wireless backhaul link for the wireless relay to a data network core;
    a network gateway configured to exchange wireline attachment signaling with the wireless relay to establish a wireline backhaul link for the wireless relay to the data network core;
    the data network core configured to determine backhaul status data for the wireless backhaul link and for the wireline backhaul link and to transfer the backhaul status data to the wireless relay, wherein the wireless relay is configured to use the backhaul status data to select the wireless backhaul link or the wireline backhaul link for user data communications;
    the wireless base station configured to exchange wireless user data with the wireless relay when the wireless relay selects the wireless backhaul link based on the backhaul status data;
    the network gateway configured to exchange wireline user data with the wireless relay when the wireless relay selects the wireline backhaul link based on the backhaul status data; and
    the data network core configured to exchange the wireless user data with the wireless base station and exchange the wireline user data with the network gateway.

12. The data communication network of claim 11 wherein the data network core is configured to transfer the backhaul status data to the wireless relay over Long Term Evolution (LTE) S1-Mobility Management Entity (MME) signaling that traverses the wireless backhaul link.

13. The data communication network of claim 11 wherein the data network core is configured to transfer the backhaul status data to the wireless relay over Long Term Evolution (LTE) S1-Mobility Management Entity (MME) signaling that traverses the wireline backhaul link.

14. The data communication network of claim 11 wherein the data network core wherein the data network core is configured to transfer the backhaul status data to the wireless relay over Long Term Evolution (LTE) Non-Access Stratum (NAS) signaling that traverses the wireless backhaul link.

15. The data communication network of claim 11 wherein the data network core is configured to transfer the backhaul status data to the wireless relay over Long Term Evolution (LTE) Non-Access Stratum (NAS) signaling that traverses the wireline backhaul link.

16. The data communication network of claim 11 wherein the backhaul status data comprises wireless backhaul capacity data.

17. The data communication network of claim 11 wherein the backhaul status data comprises wireline backhaul capacity data.

18. The data communication network of claim 11 wherein the backhaul status data comprises wireless backhaul usage credit data.

19. The data communication network of claim 11 wherein the backhaul status data comprises wireline backhaul usage credit data.

20. The data communication network of claim 11 wherein the data network core comprises a Long Term Evolution (LTE) network core.

* * * * *